(12) United States Patent
Ikarashi et al.

(10) Patent No.: US 12,009,751 B2
(45) Date of Patent: Jun. 11, 2024

(54) POWER CONVERSION DEVICE

(71) Applicant: TDK CORPORATION, Tokyo (JP)

(72) Inventors: Tomokazu Ikarashi, Tokyo (JP); Kimihiro Nishijima, Kumamoto (JP)

(73) Assignee: TDK CORPORATION, Tokyo (JP)

(*) Notice: Subject to any disclaimer, the term of this patent is extended or adjusted under 35 U.S.C. 154(b) by 288 days.

(21) Appl. No.: 17/707,427

(22) Filed: Mar. 29, 2022

(65) Prior Publication Data
US 2022/0329166 A1 Oct. 13, 2022

(30) Foreign Application Priority Data

Mar. 31, 2021 (JP) ................... 2021-062106
Mar. 11, 2022 (JP) ................... 2022-038058

(51) Int. Cl.
*H02M 3/335* (2006.01)
*H02M 1/34* (2007.01)
*H02M 3/158* (2006.01)

(52) U.S. Cl.
CPC ......... *H02M 3/33569* (2013.01); *H02M 1/34* (2013.01); *H02M 3/158* (2013.01); *H02M 3/33507* (2013.01)

(58) Field of Classification Search
CPC .... H02M 3/33569; H02M 1/34; H02M 3/158; H02M 3/33507; H02M 3/335
See application file for complete search history.

(56) References Cited

U.S. PATENT DOCUMENTS

| | | | |
|---|---|---|---|
| 5,880,940 A | 3/1999 | Poon | |
| 6,061,253 A * | 5/2000 | Igarashi | H02M 1/34 |
| | | | 363/19 |
| 11,108,329 B1* | 8/2021 | Sigamani | H02M 3/01 |
| 11,652,424 B2* | 5/2023 | Sigamani | H02M 3/33571 |
| | | | 323/282 |
| 2001/0019490 A1* | 9/2001 | Igarashi | H02M 3/335 |
| | | | 363/19 |
| 2018/0337610 A1* | 11/2018 | Leong | H02M 1/083 |

FOREIGN PATENT DOCUMENTS

JP H11-127575 A 5/1999

* cited by examiner

*Primary Examiner* — Adolf D Berhane
(74) *Attorney, Agent, or Firm* — Oliff PLC

(57) ABSTRACT

The power conversion device includes a converter including a main switch element, a main rectifying element, an output capacitor, and a primary winding of a coupled inductor and a resonance assist circuit based on a closed-loop circuit including a first series circuit having a secondary winding of the coupled inductor, a first rectifying element, and an auxiliary switch element, a second series circuit having a tertiary winding of the coupled inductor and a second rectifying element, and an auxiliary capacitor to which the first series circuit and the second series circuit are connected. The secondary winding and the tertiary winding are separate bodies and the first series circuit and the second series circuit are connected in parallel to the auxiliary capacitor, or the tertiary winding is integrated with the secondary winding.

21 Claims, 33 Drawing Sheets

POWER CONVERSION DEVICE

BACKGROUND OF THE INVENTION

Field of the Invention

The present disclosure relates to a power conversion device.

Description of Related Art

A zero voltage switching (ZVS) circuit is known.

The ZVS circuit switches an ON/OFF state of a switch element using a soft switching method when an applied voltage of the switch element becomes 0 V.

Patent Document 1 describes a boost converter and a buck converter including a ZVS assist circuit (see Patent Document 1).

PATENT DOCUMENTS

[Patent Document 1] Japanese Unexamined Patent Application, First Publication No. H11-127575

SUMMARY OF THE INVENTION

However, in the ZVS assist circuit described in the patent document, because a reset period of a resonance current is long, the turn-off loss of a main switch (for example, switches 101 and 102 described in Patent Document 1) may increase.

The present disclosure has been made in consideration of such circumstances and an objective of the present disclosure is to provide a power conversion device capable of reducing the turn-off loss of a main switch by increasing a degree of freedom in device selection of a ZVS assist circuit and shortening a reset period of a resonance current in the ZVS assist circuit.

Also, the present disclosure has been made in consideration of such circumstances and an objective of the present disclosure is to provide a power conversion device capable of reducing the turn-off loss of a main switch by increasing a degree of freedom in device selection of a quasi-ZVS assist circuit and shortening a reset period of a resonance current in the quasi-ZVS assist circuit.

Furthermore, the present disclosure has been made in consideration of such circumstances and an objective of the present disclosure is to provide a power conversion device including a ZVS assist circuit and an effective control circuit.

Furthermore, the present disclosure has been made in consideration of such circumstances and an objective of the present disclosure is to provide a power conversion device including a quasi-ZVS assist circuit and an effective control circuit.

According to an aspect of the present disclosure, there is provided a power conversion device including: a converter including a main switch element, a main rectifying element, an output capacitor, and a primary winding of a coupled inductor; and a resonance assist circuit based on a closed-loop circuit including a first series circuit having a secondary winding of the coupled inductor, a first rectifying element, and an auxiliary switch element, a second series circuit having a tertiary winding of the coupled inductor and a second rectifying element, and an auxiliary capacitor to which the first series circuit and the second series circuit are connected, wherein the secondary winding and the tertiary winding are separate bodies and the first series circuit and the second series circuit are connected in parallel to the auxiliary capacitor, or the tertiary winding is integrated with the secondary winding.

According to an aspect of the present disclosure, there is provided a power conversion device including: a converter including a main switch element, a main rectifying element, an output capacitor, and a primary winding of a coupled inductor; and a resonance assist circuit based on a closed-loop circuit including a first series circuit having a first rectifying element and a first auxiliary capacitor, a second series circuit having a second auxiliary capacitor and a second rectifying element, a third series circuit having a secondary winding of the coupled inductor and an auxiliary switch element and connected in parallel to the first series circuit and the second series circuit, and a third rectifying element arranged between an anode of the first rectifying element and a cathode of the second rectifying element.

According to an aspect of the present disclosure, there is provided a power conversion device including: a converter including a main switch element, a main rectifying element, an output capacitor, and a primary winding of a coupled inductor; and a resonance assist circuit based on a closed-loop circuit including a first series circuit having a first rectifying element and a first auxiliary capacitor, a second series circuit having a second auxiliary capacitor and a second rectifying element, a third series circuit having a third rectifying element, a third auxiliary capacitor, and a fourth rectifying element, a fourth series circuit having a secondary winding of the coupled inductor and an auxiliary switch element and connected in parallel to the first series circuit, the second series circuit, and the third series circuit, a fifth rectifying element arranged between an anode of the first rectifying element and a cathode of the fourth rectifying element, and a sixth rectifying element arranged between a cathode of the second rectifying element and an anode of the third rectifying element.

According to an aspect of the present disclosure, there is provided a power conversion device including: a converter including a main switch element, a main rectifying element, an output capacitor, and a primary winding of a coupled inductor, the polarity of a current of the primary winding switching between positive and negative states; and a resonance assist circuit based on a closed-loop circuit, wherein the closed-loop circuit includes a first series circuit having a secondary winding of the coupled inductor, a first rectifying element, and a first auxiliary switch that is driven when the polarity of the current of the primary winding is positive; a second series circuit having a tertiary winding of the coupled inductor and a second rectifying element; and a first auxiliary capacitor connected to the first series circuit and the second series circuit, wherein the secondary winding and the tertiary winding are separate bodies and the first series circuit and the second series circuit are connected in parallel to the first auxiliary capacitor or the tertiary winding is integrated with the secondary winding, wherein the closed-loop circuit further includes a third series circuit having a third rectifying element, a second auxiliary switch that is driven when the polarity of the current of the primary winding is negative, and the secondary winding; a fourth series circuit having the tertiary winding and a fourth rectifying element; and a second auxiliary capacitor connected to the third series circuit and the fourth series circuit and connected to the first auxiliary capacitor, and wherein the secondary winding and the tertiary winding are separate bodies and the third series circuit and the fourth series circuit are connected in parallel to the second auxiliary capacitor or the tertiary winding is integrated with the secondary winding.

According to an aspect of the present disclosure, there is provided a power conversion device including: a converter including a main switch element, a main rectifying element, an output capacitor, and a primary winding of a coupled inductor; a resonance assist circuit based on a closed-loop circuit including a series circuit having a secondary winding of the coupled inductor, a first rectifying element, and an auxiliary switch element; and a controller configured to determine an ON timing of the main switch element using a voltage of an auxiliary winding.

According to an aspect of the present disclosure, there is provided a power conversion device including: a converter including a main switch element, a main rectifying element, an output capacitor, and a primary winding of a coupled inductor; and a resonance assist circuit based on a closed-loop circuit including a series circuit having a secondary winding of the coupled inductor, a first rectifying element, and an auxiliary switch element, wherein the converter is any one of a boost-buck converter, a flyback converter, and a buck converter, and wherein the converter is configured to obtain a constant voltage source from a voltage of the secondary winding via a rectifier diode.

According to an aspect of the present disclosure, there is provided a power conversion device including: a converter including a main switch element, a main rectifying element, an output capacitor, and a primary winding of a coupled inductor, the polarity of a current of the primary winding switching between positive and negative states; and a resonance assist circuit based on a first closed-loop circuit including a positive-side secondary winding of the coupled inductor, a first rectifying element, and a first auxiliary switch that is driven when the polarity of a current of the primary winding is positive and a second closed-loop circuit including a negative-side secondary winding of the coupled inductor, a second rectifying element, and a second auxiliary switch that is driven when the polarity of the current of the primary winding is negative; and a controller configured to determine an ON timing of the main switch element using a voltage of an auxiliary winding.

According to an aspect of the present disclosure, there is provided a power conversion device including: a converter including a main switch element, a main rectifying element, an output capacitor, and a primary winding of a coupled inductor, the polarity of a current of the primary winding switching between positive and negative states; a resonance assist circuit based on a closed-loop circuit including a secondary winding of the coupled inductor, a first rectifying element connected in parallel to a first auxiliary switch that is driven when the polarity of the current of the primary winding is positive, and a second rectifying element connected in parallel to a second auxiliary switch that is driven when the polarity of the current of the primary winding is negative; and a controller configured to determine an ON timing of the main switch element using a voltage of an auxiliary winding.

According to an aspect of the present disclosure, there is provided a power conversion device including: a converter including a main switch element, a main rectifying element, an output capacitor, and a primary winding of a coupled inductor, the polarity of a current of the primary winding switching between positive and negative states; and a resonance assist circuit based on a first closed-loop circuit including a secondary winding of the coupled inductor, a first rectifying element, and a first auxiliary switch that is driven when the polarity of the current of the primary winding is positive and a second closed-loop circuit including a secondary winding of the coupled inductor, a second rectifying element, and a second auxiliary switch that is driven when the polarity of the current of the primary winding is negative.

According to an aspect of the present disclosure, there is provided a power conversion device including a converter including a main switch element, a main rectifying element, an output capacitor, and a primary winding of a coupled inductor and a resonance assist circuit based on a closed-loop circuit including a series circuit having a secondary winding of the coupled inductor, a first rectifying element, and an auxiliary switch element, the power conversion device including: two boost circuits including the main switch element and the main rectifying element applied to a dual-boost power factor correction (PFC) circuit connected to a single-phase AC input, wherein the resonance assist circuit corresponds to the two boost circuits, and wherein the auxiliary switch element is shared in the resonance assist circuit.

According to the present disclosure, a power conversion device can reduce the turn-off loss of a main switch by increasing a degree of freedom in device selection of a ZVS assist circuit and shortening a reset period of a resonance current in the ZVS assist circuit.

Also, according to the present disclosure, a power conversion device can reduce the turn-off loss of a main switch by increasing a degree of freedom in device selection of a quasi-ZVS assist circuit and shortening a reset period of a resonance current in the quasi-ZVS assist circuit.

Furthermore, according to the present disclosure, it is possible to provide a power conversion device including a ZVS assist circuit and an effective control circuit.

Furthermore, according to the present disclosure, it is possible to provide a power conversion device including a quasi-ZVS assist circuit and an effective control circuit.

DETAILED DESCRIPTION OF THE INVENTION

Hereinafter, embodiments of the present disclosure will be described with reference to the drawings.

In the following embodiments, it is assumed that a switch element is in a conductive state when the switch element is in an ON state and that the switch element is in an open state when the switch element is in an OFF state.

Example of Basic Configuration of Power Conversion Device Including ZVS Assist Circuit An example of a basic configuration of a power conversion device including a ZVS assist circuit (a ZVS resonance assist circuit) will be described with reference to FIGS. 1 to 5.

In FIGS. 1 to 5, a case where the power conversion device includes a boost converter is shown.

Figure 1:
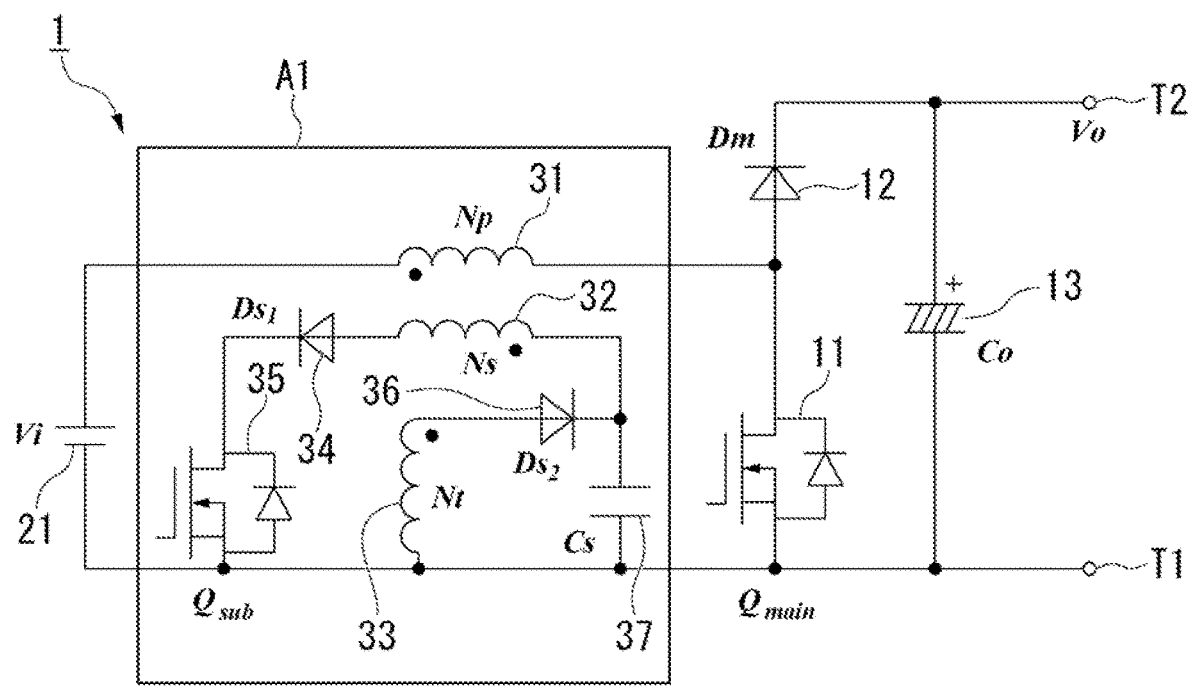
FIG. 1 is a diagram showing an example of a circuit configuration of a power conversion device including a ZVS assist circuit according to an embodiment.

Power Conversion Device According to Example of FIG. 1

FIG. 1 is a diagram showing an example of a circuit configuration of a power conversion device 1 including a ZVS assist circuit A1 according to an embodiment.

In the example of FIG. 1, a control circuit is not shown.

The power conversion device 1 includes a main circuit and a ZVS assist circuit A1.

The main circuit includes a main switch element 11 ($Q_{main}$) having a metal-oxide-semiconductor (MOS) type field effect transistor (FET), a main diode 12 (Dm), a capacitor 13 (Co), which is an output capacitor, and a primary winding 31 (Np) of a coupled inductor.

Also, in FIG. 1, a direct current (DC) power supply 21 (Vi) is shown. Here, the power supply 21 may be, for example, a power supply that provides a DC obtained by converting an AC from a commercial AC power supply using a rectifier circuit (for example, a diode bridge or the like).

Also, in general, in a coupled inductor, two or more windings, which are components, are magnetically coupled to each other. The windings include, for example, a primary winding and a secondary winding, and may further include a tertiary winding, an auxiliary winding, and the like.

For the convenience of description, in the power conversion device 1, two output terminals on a side to which a load (not shown) is connected will be referred to as a first output terminal T1 and a second output terminal T2. In the example of FIG. 1, the first output terminal T1 is on a ground (GND) side and the second output terminal T2 is on a positive (+) side.

Here, in the main circuit, the power supply 21 and the switch element 11 are connected to both ends of the primary winding 31 of the coupled inductor. The switch element 11 and the diode 12 are connected in series. A series circuit of the switch element 11 and the diode 12 and the capacitor 13 are provided in parallel.

The ZVS assist circuit A1 includes a primary winding 31 (Np), a secondary winding 32 (Ns), and a tertiary winding 33 (Nt) of a coupled inductor, a diode 34 ($Ds_1$), a switch element 35 ($Q_{sub}$) having a MOS type FET, a diode 36 ($Ds_2$), and a capacitor 37 (Cs), which is an auxiliary capacitor.

Here, a case where the primary winding 31 (Np) of the coupled inductor is not included in the ZVS assist circuit A1 may be considered.

The first output terminal T1, one end of the capacitor 13, a source of the switch element 11, and one end of the power supply 21 (a negative (−) terminal in the example of FIG. 1) are connected.

The second output terminal T2, the other end of the capacitor 13, and a cathode of the diode 12 are connected.

The other end of the power supply 21 (a positive (+) terminal in the example of FIG. 1) and one end of the primary winding 31 of the ZVS assist circuit A1 are connected.

The other end of the primary winding 31, a drain of the switch element 11 and an anode of the diode 12 are connected.

The first output terminal T1, one end of the capacitor 37, one end of the tertiary winding 33, and a source of the switch element 35 are connected.

A drain of the switch element 35 and a cathode of the diode 34 are connected.

An anode of the diode 34 and one end of the secondary winding 32 are connected.

The other end of the secondary winding 32, the other end of the capacitor 37, and a cathode of the diode 36 are connected.

The other end of the tertiary winding 33 and an anode of the diode 36 are connected.

Figure 2:
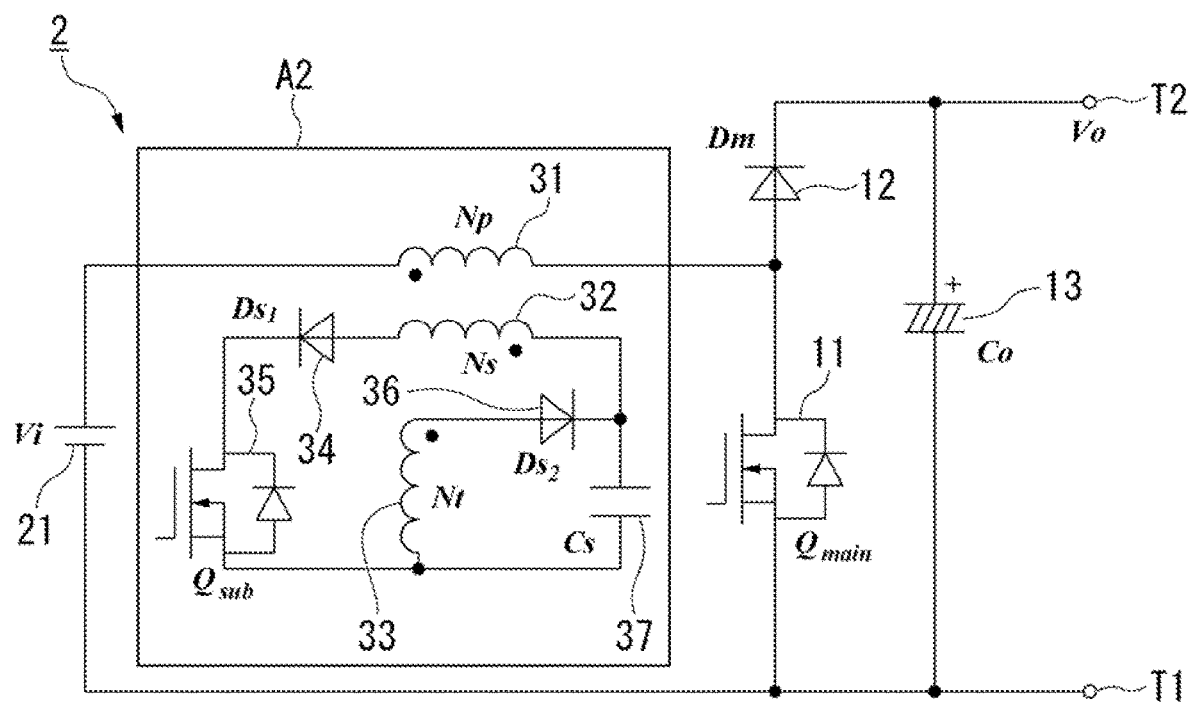
FIG. 2 is a diagram showing an example of a circuit configuration of a power conversion device including a ZVS assist circuit according to an embodiment.

Power Conversion Device According to Example of FIG. 2

FIG. 2 is a diagram showing an example of a circuit configuration of a power conversion device 2 including a ZVS assist circuit A2 according to an embodiment.

In the example of FIG. 2, a control circuit is not shown.

The power conversion device 2 includes a main circuit and the ZVS assist circuit A2.

The main circuit is similar to the main circuit according to the example of FIG. 1, and circuit elements of the main circuit are shown using reference signs that are the same as those of FIG. 1.

Also, a power supply 21 (Vi) similar to that shown in FIG. 1 is shown in FIG. 2.

The ZVS assist circuit A2 includes circuit elements similar to those of the ZVS assist circuit A1 according to the example of FIG. 1 and the circuit elements are shown using reference signs that are the same as those of FIG. 1.

The ZVS assist circuit A2 is different from the ZVS assist circuit A1 according to the example of FIG. 1 in that one end of a capacitor 37, one end of the tertiary winding 33, and a source of a switch element 35 are not connected to a first output terminal T1.

Here, a negative (−) potential of the ZVS assist circuit A2 is generally a ground potential that is the same as that of a main switch element 11, but may be any potential.

In the example of FIG. 2, the one end of the capacitor 37, the one end of the tertiary winding 33, and the source of the switch element 35 may be connected to a terminal having any potential.

Figure 3:
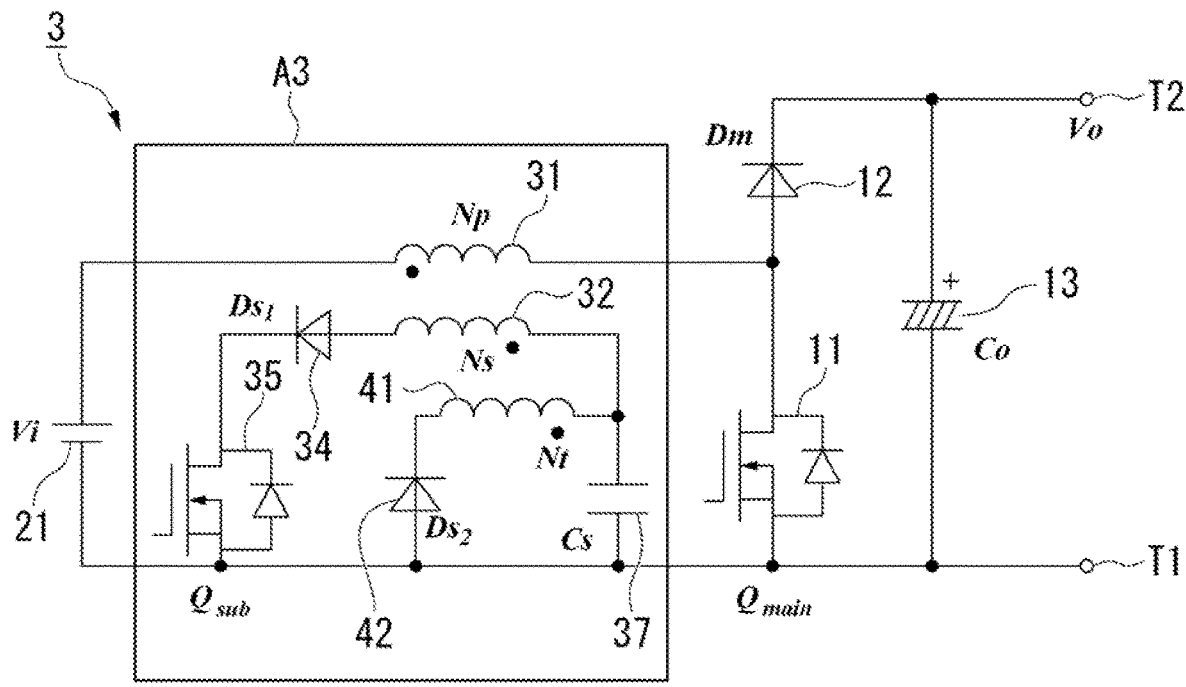
FIG. 3 is a diagram showing an example of a circuit configuration of a power conversion device including a ZVS assist circuit according to an embodiment.

Power Conversion Device According to Example of FIG. 3

FIG. 3 is a diagram showing an example of a circuit configuration of a power conversion device 3 including a ZVS assist circuit A3 according to an embodiment.

In the example of FIG. 3, a control circuit is not shown.

The power conversion device 3 includes a main circuit and the ZVS assist circuit A3.

The main circuit is similar to the main circuit according to the example of FIG. 1, and circuit elements of the main circuit are shown using reference signs that are the same as those of FIG. 1.

Also, a power supply 21 (Vi) similar to that shown in FIG. 1 is shown in FIG. 3.

In the ZVS assist circuit A3, circuit elements similar to those of the ZVS assist circuit A1 according to the example of FIG. 1 are shown using reference signs that are the same as those of FIG. 1.

Compared with the ZVS assist circuit A1 according to the example of FIG. 1, the ZVS assist circuit A3 includes a tertiary winding 41(Nt) and a diode 42 ($Ds_2$) on the basis of a state in which the order in which a tertiary winding and a diode are connected is reversed instead of the tertiary winding 33 and the diode 36 shown in FIG. 1.

An anode of the diode 42 is connected to a first output terminal T1.

A cathode of the diode 42 and one end of the tertiary winding 41 are connected.

The other end of the tertiary winding 41 is connected to the other end of a secondary winding 32 and the other end of a capacitor 37.

Figure 4:
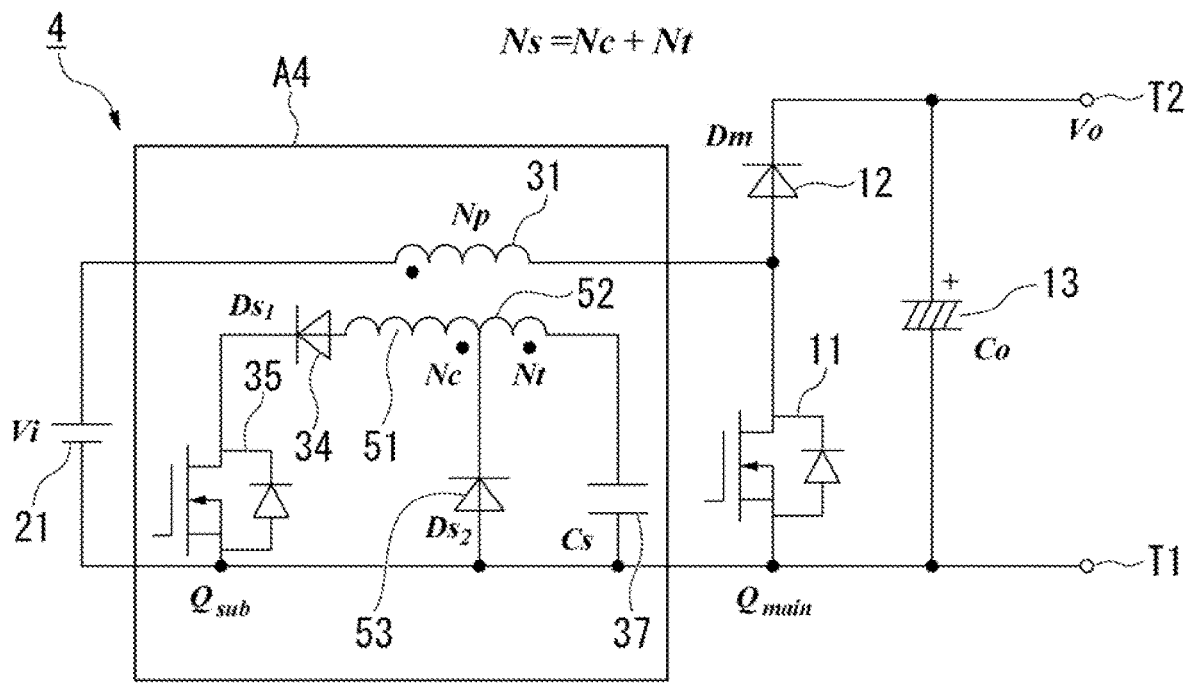
FIG. 4 is a diagram showing an example of a circuit configuration of a power conversion device including a ZVS assist circuit according to an embodiment.

Power Conversion Device According to Example of FIG. 4

FIG. 4 is a diagram showing an example of a circuit configuration of a power conversion device 4 including a ZVS assist circuit A4 according to the embodiment.

In the example of FIG. 4, a control circuit is not shown.

The power conversion device 4 includes a main circuit and the ZVS assist circuit A4.

The main circuit is similar to the main circuit according to the example of FIG. 1, and circuit elements of the main circuit are shown using reference signs that are the same as those of FIG. 1.

Also, a power supply 21 (Vi) similar to that shown in FIG. 1 is shown in FIG. 4.

In the ZVS assist circuit A4, circuit elements similar to those of the ZVS assist circuit A1 according to the example of FIG. 1 are shown using reference signs that are the same as those of FIG. 1.

Compared with the ZVS assist circuit A1 according to the example of FIG. 1, the ZVS assist circuit A4 includes a winding 51 (Nc=Ns−Nt), a tertiary winding 52 (Nt), and a diode 53 ($Ds_2$) instead of the secondary winding 32, the tertiary winding 33, and the diode 36 shown in FIG. 1.

One end of the winding 51 is connected to an anode of a diode 34.

The other end of the winding 51 and one end of the tertiary winding 52 are connected.

The other end of the tertiary winding 52 is connected to the other end of a capacitor 37.

A cathode of the diode 53 is connected to a first output terminal T1.

The other end of the diode 53, the other end of the winding 51, and one end of the tertiary winding 52 are connected.

The secondary winding (Ns) includes the winding 51 and the tertiary winding 52.

Although a tapped winding including two windings (the winding 51 and the tertiary winding 52 in the example of FIG. 4) will be described For the convenience of description in the present embodiment, the two windings may be described as one tapped winding.

Figure 5:
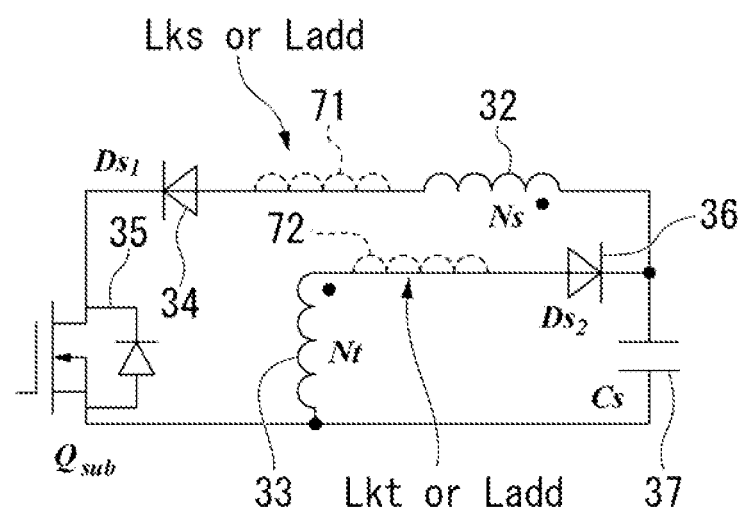
FIG. 5 is a diagram showing a leakage inductor or an additional inductor according to an embodiment.

FIG. 5 is a diagram showing a leakage inductor or an additional inductor according to an embodiment.

The additional inductor is used, for example, when adjustment is required.

A partial circuit (a circuit related to the secondary winding 32 and the tertiary winding 33) in the ZVS assist circuit A1 shown in FIG. 1 is shown in FIG. 5.

For example, an inductor 71 located between the secondary winding 32 and the diode 34 corresponds to a leakage inductor (Lks) of the secondary winding 32. Alternatively, an inductor 71, which is an additional inductor (Ladd), may be provided (at an insertion location) between the secondary winding 32 and the diode 34.

For example, an inductor 72 located between the tertiary winding 33 and a diode 36 corresponds to a leakage inductor (Lkt) of the tertiary winding 33. Alternatively, an inductor 72, which is the additional inductor (Ladd), may be provided (at an insertion location) between the tertiary winding 33 and the diode 36.

In the present embodiment, the ZVS assist circuit A1 (similar to the ZVS assist circuits A2 to A4) generates a resonance operation associated with a resonance capacitance component (Cr) parallel to a leakage inductor in one or both of the secondary winding 32 and the tertiary winding 33 of the tapped inductor or an inductor (the additional inductor) added thereto, the main switch (the switch element 11 in the examples of FIGS. 1 to 4), and the main rectifying element (the diode 12 in the examples of FIGS. 1 to 4).

Here, the resonance capacitance component (Cr) parallel to the switch corresponds to a sum of a parasitic capacitance component of the switch and a capacitance component of the capacitor connected in parallel to the switch.

Example of Operation of Power Conversion Device

An example of an operation performed in the power conversion device 1 shown in FIG. 1 will be described with reference to FIG. 6.

Also, the same is true for examples of operations performed in the power conversion devices 2 to 4 shown in FIGS. 2 to 4.

Figure 6:
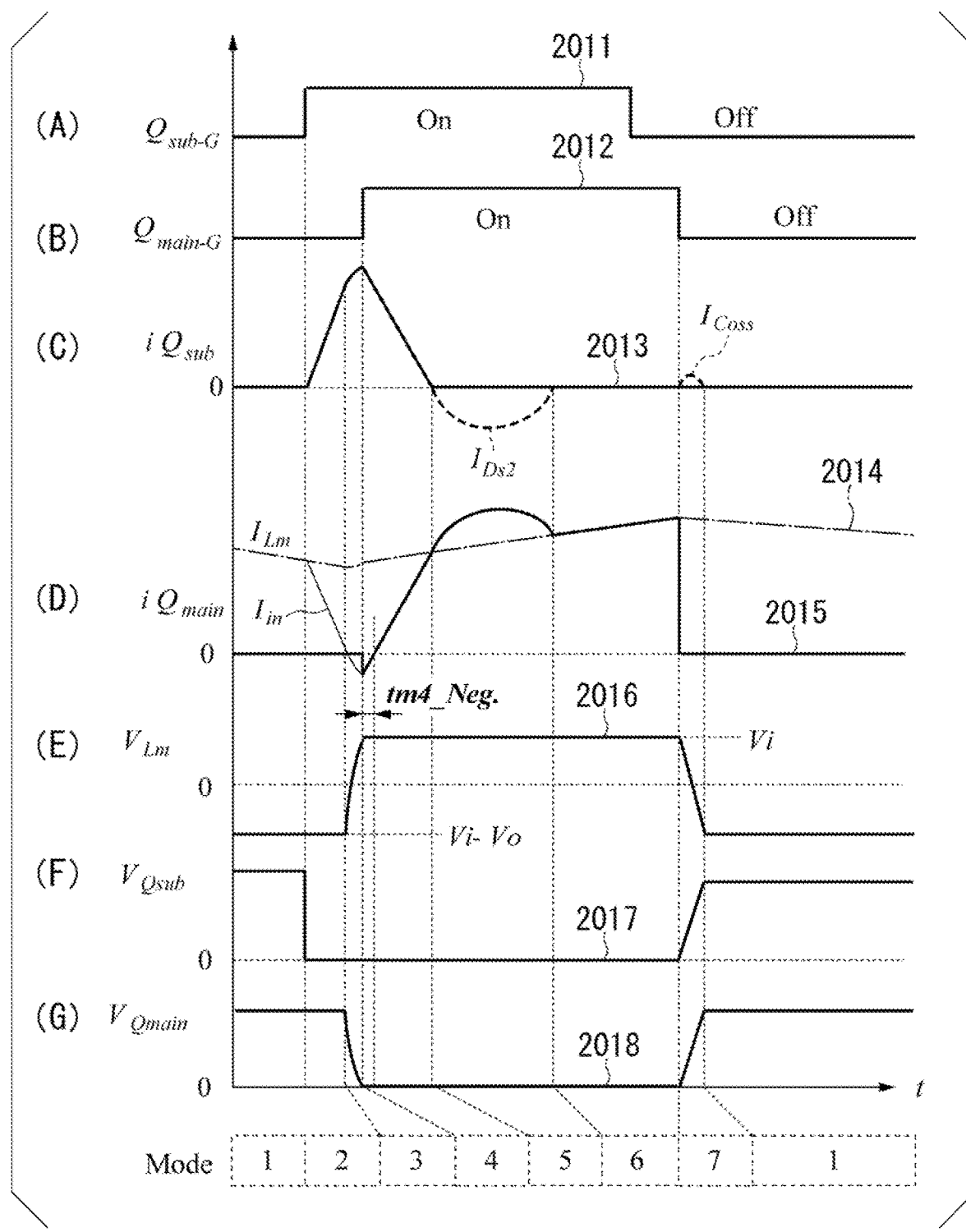
FIG. 6 is a diagram showing an example of a waveform in the power conversion device including the ZVS assist circuit according to the embodiment.

FIG. 6 is a diagram showing an example of a waveform in the power conversion device 1 including the ZVS assist circuit A1 according to the embodiment.

In the present embodiment, the switch element 11 ($Q_{main}$) is turned on after the switch element 35 ($Q_{sub}$) is turned on in a control process performed by a controller. Also, in the control process, the switch element 11 ($Q_{main}$) is turned off after the switch element 35 ($Q_{sub}$) is turned off or simultaneously when the switch element 35 ($Q_{sub}$) is turned off.

In a graph shown in FIG. 6, the horizontal axis represents time (t) and the vertical axis represents a level of each waveform.

In FIG. 6(A), a waveform 2011 showing an ON state and an OFF state of the gate of the switch element 35 ($Q_{Sub}$) is shown.

In FIG. 6(B), a waveform 2012 representing an ON state and an OFF state of the gate of the switch element 11 ($Q_{main}$) is shown.

In FIG. 6(C), a waveform 2013 of a current flowing through the switch element 35 ($Q_{sub}$) is shown.

Also, in FIG. 6(C), a current ($I_{Ds2}$) flowing through the diode 36 with respect to mode 5 is shown.

In FIG. 6(D), a waveform 2014 of a current flowing through an exciting inductor $L_m$ in an equivalent circuit of the primary winding 31 (Np) side when the secondary winding 32 (Ns) side is changed is shown.

Also, in FIG. 6(D), a waveform 2015 of a current flowing through the switch element 11 ($Q_{main}$) is shown.

Also, in FIG. 6(D), a waveform of an input current $I_{in}$ is shown with respect to mode 2 and mode 3.

In FIG. 6(E), a waveform 2016 of a voltage applied to the exciting inductor $L_m$ in an equivalent circuit of the primary winding 31 (Np) side when the secondary winding 32 (Ns) side is changed is shown.

In FIG. 6(F), a waveform 2017 of a voltage applied to the switch element 35 ($Q_{sub}$) is shown.

In FIG. 6(G), a waveform 2018 of a voltage applied to the switch element 11 ($Q_{main}$) is shown.

In FIG. 6, the transition of a mode which is an operation mode is shown.

The power conversion device 1 sequentially transitions from the state of mode 1 to the state of mode 7 according to a flow of time and returns to the state of mode 1 again after the state of mode 7.

Here, the outline of modes 1 to 7 shown in FIG. 6 is shown.

Here, assuming an ideal device, the input voltage Vi is assumed to be constant during a switching period Tsw.

(Mode 1)

The period of mode 1 is an OFF-duty period of the converter in which the inductor exciting current $I_{Lm}$ is applied to the diode 12 (Dm).

(Mode 2)

During the period of mode 2, the switch element 35 ($Q_{sub}$) is turned on. The current flowing through the switch element 35 ($Q_{sub}$) increases with a prescribed current slope and the input current $I_{in}$ decreases.

(Mode 3) During the period of mode 3, the current flowing through the diode 12 (Dm) becomes 0 [A] and the diode 12 (Dm) is turned off. At this time, a soft recovery operation with a prescribed current slope can be obtained and the recovery loss of the diode 12 (Dm) can be reduced.

Here, assuming that the minimum value of the voltage applied to the switch element 11 ($Q_{main}$) is 0 or less as a ZVS ON condition, the ZVS condition of Inequality (1) can be obtained.

In Inequality (1), $N_t/N_s$ that is adjustable is added to (Vo>Vi/2), which is the ZVS condition of a current critical mode (CRM) of a general boost circuit. By designing a turn ratio of Ns and Nt satisfying Inequality (1), ZVS can be performed in a range of a total input voltage. Assuming Vo=Vi, which is a lower limit of a boost ratio, $N_t/N_s \leq \frac{1}{2}$, which is an upper limit of the turn ratio, can be obtained.

(Mode 4)

During the period of mode 4, when the voltage applied to the switch element 11 ($Q_{main}$) becomes 0 [V] due to the resonance operation, a body diode of the switch element 11 ($Q_{main}$) becomes conductive. By turning on the switch element 11 ($Q_{main}$) during this diode conduction period tm4_Neg., ZVS is turned on.

Here, a prescribed voltage is applied to the leakage inductor (Lks) and a current flowing through the switch element 35 ($Q_{sub}$) decreases with a prescribed current slope. The input current $I_{in}$ increases to the exciting current $I_{Lm}$ with a prescribed current slope.

(Mode 5)

During the period of mode 5, the input current $I_{in}$ reaches the exciting current $I_{Lm}$ and the converter shifts to the ON-duty period. The current flowing through the auxiliary diode ($Ds_1$) becomes 0 [A] and the current is turned off by the soft recovery operation due to the prescribed current slope.

Also, because the voltage of the auxiliary capacitor (Cs) is reduced according to the assist current in modes 2 to 4, a charging current flows from the tertiary winding via the leakage inductor (Lkt) and the diode ($Ds_2$). This charging current is superimposed on the input current $I_{in}$ via a transformer and flows through the switch element 11 ($Q_{main}$).

(Mode 6)

During the period of mode 6, when the charging of the auxiliary capacitor (Cs) is completed, only the exciting current $I_{Lm}$ is applied to the switch element 11 ($Q_{main}$).

Also, if the switch element 35 ($Q_{sub}$) is turned off between modes 4 and 6, no turn-off loss of the switch element 35 ($Q_{sub}$) occurs.

(Mode 7)

During the period of mode 7, the switch element 11 ($Q_{main}$) is turned off. At this time, ZVS is turned off by a capacitor parallel to each of the diode 12 and the switch element 11 ($Q_{main}$).

Here, when the exciting inductor ($L_m$) is sufficiently large and a current source is approximated, a voltage applied to the switch element 11 ($Q_{main}$) increases and reaches the output voltage Vo and mode 1 is resumed.

Although the switch element 35 ($Q_{sub}$) has already been turned off, a parasitic capacitance charging current $I_{Coss}$ flows due to the voltage application.

As described above, in the power conversion devices 1 to 4 according to the present embodiment, it is possible to reduce the turn-off loss of the main switch ($Q_{main}$) by increasing a degree of freedom in device selection of the ZVS assist circuit and shortening a reset period of the resonance current in the ZVS assist circuits A1 to A4.

In the power conversion devices 1 to 4 according to the present embodiment, the bias voltage of the auxiliary capacitors (Cs) is lowered to shorten the reset period of the resonance current in the ZVS assist circuits A1 to A4 and therefore the turn-off loss of the main switch ($Q_{main}$) can be reduced.

In the power conversion devices 1 to 4 according to the present embodiment, the voltage of the ZVS assist circuit can be configured so that it does not depend on the voltage of the main circuit and it is possible to limit an increase in the cost of the device or the like.

In the power conversion devices 1 to 4 according to the present embodiment, the soft recovery effect by a low ratio of dI/dt and ZVS or valley switching according to the resonance operation can be implemented with a small number of parts due to the tapped inductor and loss reduction and noise reduction are possible. Also, in the power conversion devices 1 to 4 according to the present embodiment, the voltage of each of the ZVS assist circuits A1 to A4 can be arbitrarily designed according to the turn ratio and the degree of freedom in device selection can be increased.

In the power conversion devices 1 to 4 according to the present embodiment, ZVS can be implemented with a small number of parts using the coupled inductor and a desired element-specific withstand voltage can be selected according to a turn ratio of the coupled inductor. Thus, the selection of a power semiconductor having excellent recovery characteristics and less ringing of parasitic capacitance charge can be expected. Also, in the power conversion devices 1 to 4 according to the present embodiment, a ZVS operation is possible at a wide input/output voltage ratio due to the auxiliary capacitor (Cs).

Also, because a sub-switch element ($Q_{sub}$) turns on zero current switching (ZCS), the parasitic capacitance charge is discharged and consumed by the ON-resistance of the switch, but a decrease in the parasitic capacitance loss can also be expected by lowering the voltage.

Although a case where the FET is used as the switch element is shown in the power conversion devices 1 to 4 according to the present embodiment, other switch elements may be used.

Although a case where the diode is used as the rectifying element is shown in the power conversion devices 1 to 4 according to the present embodiment, other rectifying elements may be used.

For example, a switch element such as a MOS type FET may be used instead of the main diode 12 (Dm).

The ZVS assist circuit according to the present embodiment can be applied to, for example, a boost converter, a buck converter, a boost-buck converter, or a flyback converter connected to smooth, step-up, or step-down a voltage associated with the primary winding (Np) of the coupled inductor.

Although the case where the DC power supply 21 is used is shown in the examples of FIGS. 1 to 4, this power supply may be a full-wave rectified voltage or a half-wave rectified voltage including a pulsating current as an example of another configuration and can also be applied to a general power factor correction (PFC) circuit.

Example of Application Configuration of Power Conversion Device Including ZVS Assist Circuit An example of an application configuration of a power conversion device including a ZVS assist circuit (a ZVS resonance assist circuit) will be described with reference to FIGS. 7 to 10.

Figure 7:
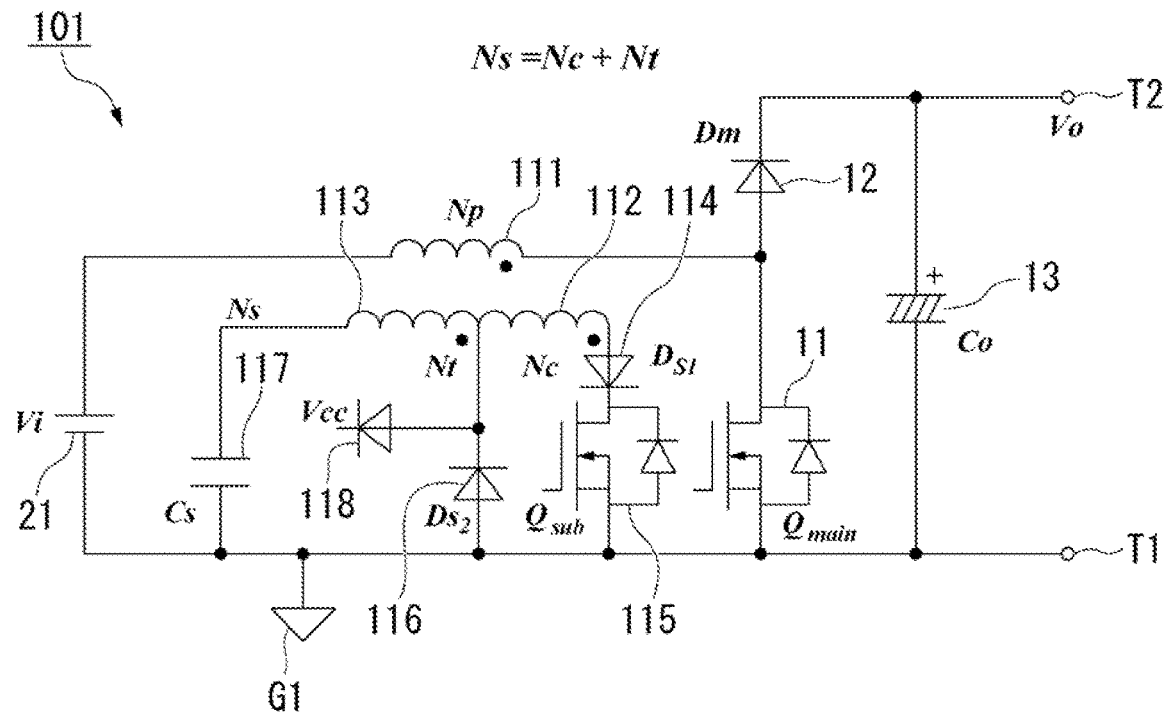
FIG. 7 is a diagram showing an example of a circuit configuration of a power conversion device according to an example in which a ZVS assist circuit is applied according to an embodiment.

Power Conversion Device According to Example of FIG. 7

FIG. 7 is a diagram showing an example of a circuit configuration of a power conversion device 101 according to an example of the application of a ZVS assist circuit according to an embodiment.

In the example of FIG. 7, a control circuit is not shown.

The power conversion device 101 includes a main circuit, a ZVS assist circuit, and a diode 118.

The main circuit is similar to the main circuit according to the example of FIG. 1 and circuit elements of the main circuit are shown using reference signs that are the same as those of FIG. 1, except for a primary winding 111 (Np) of a coupled inductor.

Also, a power supply 21 (Vi) similar to that shown in FIG. 1 is shown in FIG. 7.

Also, a ground terminal G1 connected to a first output terminal T1 is shown in FIG. 7.

The ZVS assist circuit according to the example of FIG. 7 includes circuit elements similar to those of the ZVS assist circuit A4 according to the example of FIG. 4.

Specifically, the ZVS assist circuit according to the example of FIG. 7 includes the primary winding 111 (Np), a winding 112 (Nc), and a tertiary winding 113 (Nt) of the coupled inductor, a diode 114 (Ds₁), a switch element 115 (Q$_{sub}$) having a MOS type FET, a diode 116 (Ds₂), and a capacitor 117 (Cs), which is an auxiliary capacitor.

Here, a case where the primary winding 111 (Np) of the coupled inductor is not included in the ZVS assist circuit may be considered.

A secondary winding (Ns=Nc+Nt) includes the winding 112 and the tertiary winding 113.

Here, the ZVS assist circuit according to the example of FIG. 7 has a circuit configuration similar to that of the ZVS assist circuit A4 according to the example of FIG. 4. Also, in the example of FIG. 7, the circuit configuration of the ZVS assist circuit is reversed left and right (the polarity of the primary winding 111 is reversed left and right) in the drawing as compared with the example of FIG. 4.

Compared with the power conversion device 4 shown in FIG. 4, the power conversion device 101 further includes a diode 118.

An anode of the diode 118 is connected to a cathode of the diode 116.

In the power conversion device 101 according to the example of FIG. 7, a voltage source (Vcc) can be obtained from the cathode of the diode 116.

The voltage source (Vcc) may be used for any purpose or may be used, for example, for controlling a gate voltage of a switch element 11 or the switch element 115.

Here, in the power conversion device 101 shown in FIG. 7, the turn ratio that satisfies the ZVS condition is represented by Inequality (1). In Inequality (1), $N_t$ denotes the number of turns of the tertiary winding 113, $N_s$ denotes the number of turns of the secondary winding, Vo denotes an output voltage of the main circuit (a voltage applied between the first output terminal T1 and a second output terminal T2), and Vi denotes a voltage of the power supply 21.

$$\frac{N_t}{N_s} \geq 1 - \frac{Vo}{2Vi} \qquad (1)$$

Also, the operating principle of the ZVS assist circuit in the power conversion device 101 is similar to those of the ZVS assist circuits A1 to A4 shown in FIGS. 1 to 4.

Figure 8:
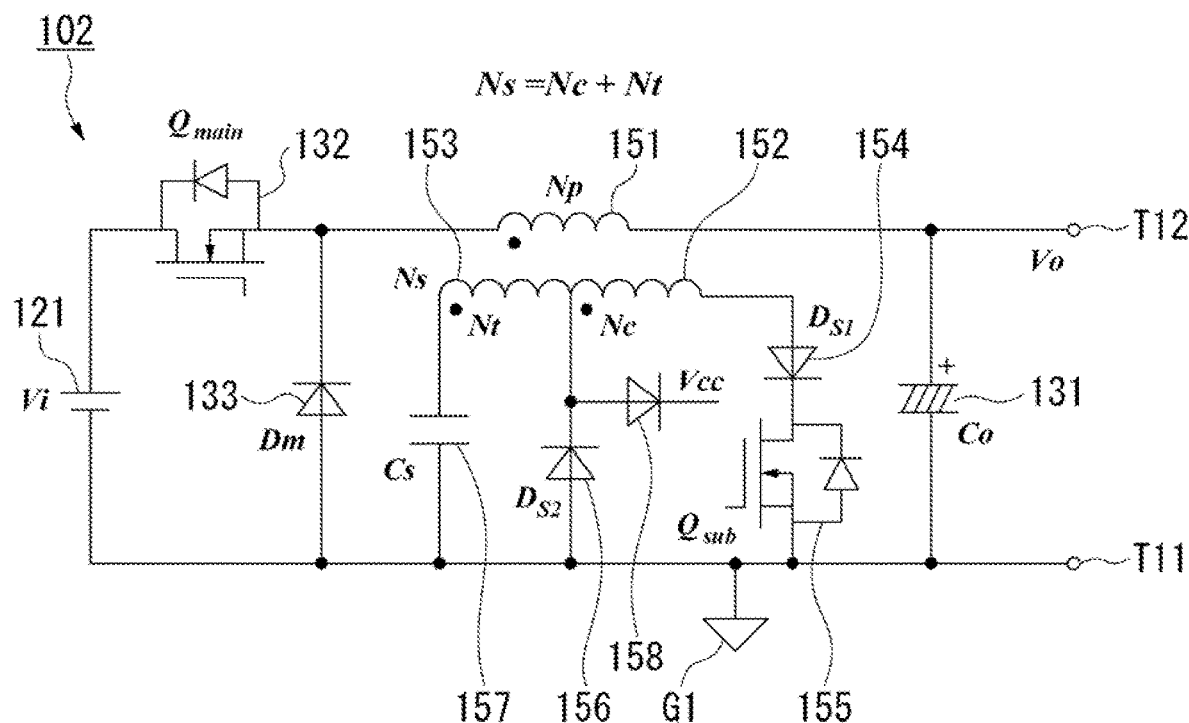
FIG. 8 is a diagram showing an example of a circuit configuration of a power conversion device according to an example in which a ZVS assist circuit is applied according to an embodiment.

Power Conversion Device According to Example of FIG. 8

FIG. 8 is a diagram showing an example of a circuit configuration of a power conversion device 102 according to an example of the application of a ZVS assist circuit according to an embodiment.

The power conversion device 102 includes a buck converter.

In the example of FIG. 8, a control circuit is not shown.

The power conversion device 102 includes a main circuit, a ZVS assist circuit, and a diode 158.

The main circuit includes a capacitor 131 (Co), which is an output capacitor, a main switch element 132 (Q$_{main}$) having a MOS type FET, a main diode 133 (Dm), and a primary winding 151 (Np) of a coupled inductor.

Also, a DC power supply 121 (Vi) is shown in FIG. 8. Here, the power supply 121 is similar to the power supply 21 shown in FIG. 7.

For the convenience of description, in the power conversion device 102, two output terminals on a side to which a load (not shown) is connected will be referred to as a first output terminal T11 and a second output terminal T12. In the example of FIG. 8, the first output terminal T11 is on a ground (GND) side and the second output terminal T12 is on a positive (+) side.

A ground terminal G1 connected to the first output terminal T11 is shown in FIG. 8.

Here, in the main circuit, a series circuit of the power supply 121 and the switch element 132, the diode 133, and the capacitor 131 are connected in parallel to one end of the primary winding 151 of the coupled inductor.

The first output terminal T11, one end of the capacitor 131, an anode of the diode 156, and one end of the power supply 121 (a negative (−) terminal in the example of FIG. 8) are connected.

The other end of the power supply 121 (a positive (+) terminal in the example of FIG. 8) and a drain of the switch element 132 are connected.

The second output terminal T12 and the other end of the capacitor 131 are connected.

A cathode of the diode 133 and a source of the switch element 132 are connected to the second output terminal T12 via the primary winding 111 of the ZVS assist circuit.

The ZVS assist circuit includes the primary winding 151 (Np), a winding 152 (Nc), and a tertiary winding 153 (Nt) of a coupled inductor, a diode 154 (Ds$_1$), a switch element 155 having a MOS type FET (Q$_{sub}$), a diode 156 (Ds$_2$), and a capacitor 157 (Cs), which is an auxiliary capacitor.

Here, a case where the primary winding 151 (Np) of the coupled inductor is not included in the ZVS assist circuit may be considered.

A secondary winding (Ns=Nc+Nt) includes the winding 152 and the tertiary winding 153.

The circuit configuration of the ZVS assist circuit according to the example of FIG. 8 is similar to that of the ZVS assist circuit shown in FIG. 7.

The ZVS assist circuit according to the example of FIG. 8 is arranged between the capacitor 131 and the diode 133 of the main circuit.

The power conversion device 102 further includes a diode 158.

An anode of the diode 158 is connected to a cathode of the diode 156.

In the power conversion device 102 according to the example of FIG. 8, a voltage source (Vcc) can be obtained from the cathode of the diode 156.

The voltage source (Vcc) may be used for any purpose or may be used, for example, for controlling a gate voltage of the switch element 132 or the switch element 155.

Here, in the power conversion device 102 shown in FIG. 8, a turn ratio that satisfies the ZVS condition is represented by Inequality (2). In Inequality (2), N$_t$ denotes the number of turns of the tertiary winding 153, N$_s$ denotes the number of turns of the secondary winding, Vo denotes an output voltage of the main circuit (a voltage applied between the first output terminal T11 and the second output terminal T12), and Vi denotes a voltage of the power supply 121.

$$\frac{N_t}{N_s} \geq \frac{Vi}{2Vo} - 1 \qquad (2)$$

The operating principle of the ZVS assist circuit in the power conversion device 102 is similar to those of the ZVS assist circuits A1 to A4 shown in FIGS. 1 to 4.

Figure 9:
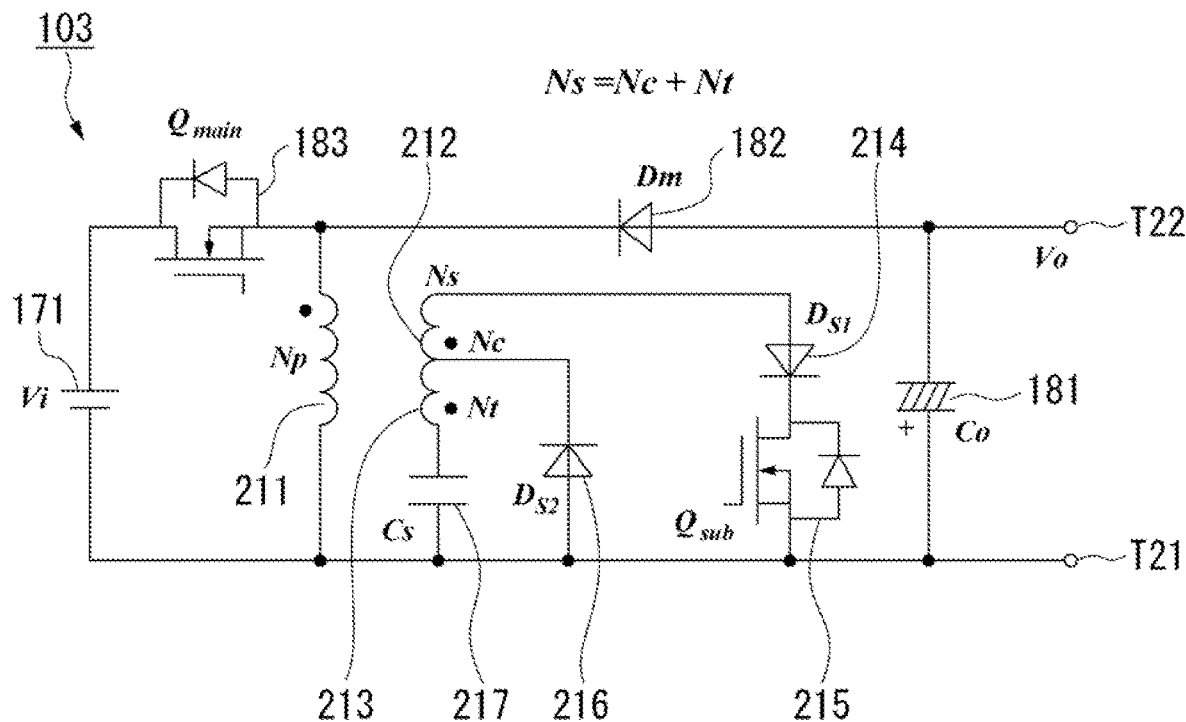
FIG. 9 is a diagram showing an example of a circuit configuration of a power conversion device according to an example in which a ZVS assist circuit is applied according to an embodiment.

Power Conversion Device According to Example of FIG. 9

FIG. 9 is a diagram showing an example of a circuit configuration of a power conversion device 103 according to an example of the application of a ZVS assist circuit according to an embodiment.

The power conversion device 103 includes a boost-buck converter.

In the example of FIG. 9, a control circuit is not shown.

The power conversion device 103 includes a main circuit and a ZVS assist circuit.

The main circuit includes a capacitor 181 (Co), which is an output capacitor, a main diode 182 (Dm), a main switch element 183 (Q$_{main}$) having a MOS type FET, and a primary winding 211 (Np) of a coupled inductor.

Also, a DC power supply 171 (Vi) is shown in FIG. 9. Here, the power supply 171 is similar to the power supply 21 shown in FIG. 7.

For the convenience of description, in the power conversion device 103, two output terminals on a side to which a load (not shown) is connected will be referred to as a first output terminal T21 and a second output terminal T22. In the example of FIG. 9, the first output terminal T21 is on a ground (GND) side and the second output terminal T22 is on a positive (+) side.

Here, in the main circuit, a series circuit of the power supply 171 and the switch element 183 and a connection circuit of the diode 182 and the capacitor 181 are connected in parallel to the primary winding 211 of the coupled inductor.

The first output terminal T21, one end of the capacitor 181, and one end of the power supply 171 (a negative (−) terminal in the example of FIG. 9) are connected.

The other end of the power supply 171 (a positive (+) terminal in the example of FIG. 9) and a drain of the switch element 183 are connected.

The second output terminal T22, the other end of the capacitor 181, and an anode of the diode 182 are connected.

A cathode of the diode 182 and a source of the switch element 183 are connected.

The ZVS assist circuit includes the primary winding 211 (Np), a winding 212 (Nc), and a tertiary winding 213 (Nt) of the coupled inductor, a diode 214 (Ds$_1$), a switch element 215 (Q$_{sub}$) having a MOS type FET, a diode 216 (Ds$_2$), and a capacitor 217 (Cs), which is an auxiliary capacitor.

Here, a case where the primary winding 211 (Np) of the coupled inductor is not included in the ZVS assist circuit may be considered.

A secondary winding (Ns=Nc+Nt) includes the winding 212 and the tertiary winding 213.

One end of the primary winding 211 is connected to the first output terminal T21.

The other end of the primary winding 211 is connected to a cathode of the diode 182 and a source of the switch element 183.

Also, the circuit configuration of the ZVS assist circuit according to the example of FIG. 9 is similar to that of the ZVS assist circuit shown in FIG. 7, except for the arrangement of the primary winding 211.

The ZVS assist circuit according to the example of FIG. 9 is arranged between the capacitor 181 of the main circuit and the primary winding 211.

Here, in the power conversion device 103 shown in FIG. 9, a turn ratio that satisfies the ZVS condition is represented by Inequality (3). In Inequality (3), N$_t$ denotes the number of turns of the tertiary winding 213, N$_s$ denotes the number of turns of the secondary winding, Vo denotes an output voltage of the main circuit (a voltage applied between the first output terminal T21 and the second output terminal T22), and Vi denotes a voltage of the power supply 171.

$$\frac{N_t}{N_s} \geq \frac{1}{2}\left(\frac{Vi}{Vo} - 1\right) \qquad (3)$$

The operating principle of the ZVS assist circuit in the power conversion device 103 is similar to those of the ZVS assist circuits A1 to A4 shown in FIGS. 1 to 4.

Although the case where the diode is used as the rectifying element is shown in the power conversion device 103 according to the present embodiment, another rectifying element may be used.

For example, a switch element such as a MOS type FET may be used instead of the main diode 182 (Dm).

Figure 10:
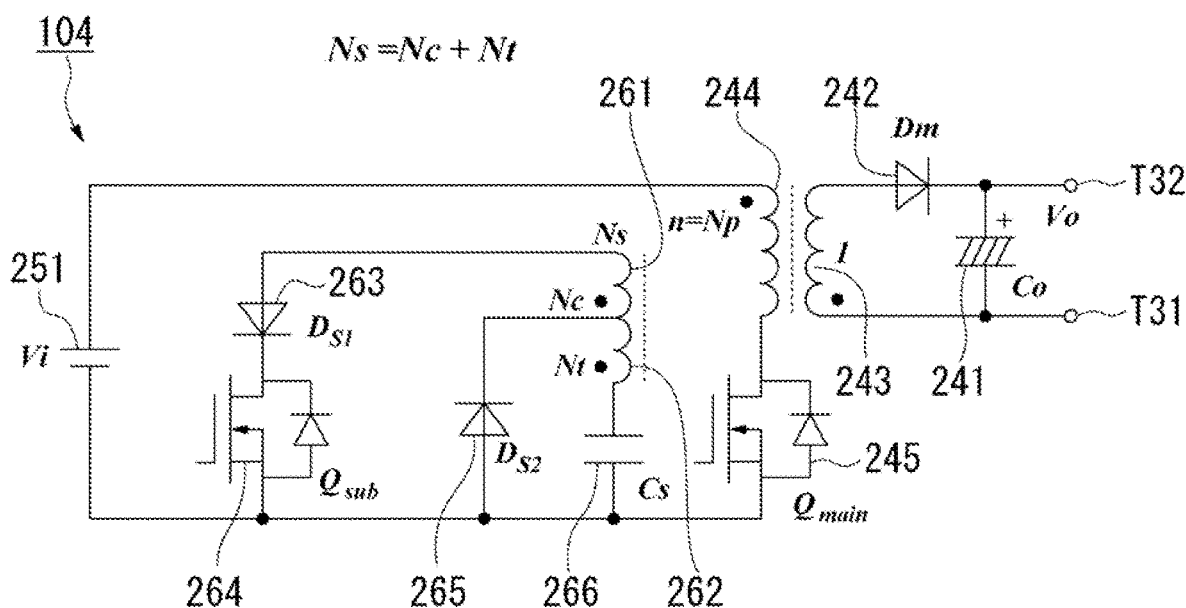
FIG. 10 is a diagram showing an example of a circuit configuration of a power conversion device according to an example in which a ZVS assist circuit is applied according to an embodiment.

Power Conversion Device According to Example of FIG. 10

FIG. 10 is a diagram showing an example of a circuit configuration of a power conversion device 104 according to an example of the application of a ZVS assist circuit according to an embodiment.

The power conversion device 104 includes a flyback converter.

In the example of FIG. 10, a control circuit is not shown.

The power conversion device 104 includes a main circuit and a ZVS assist circuit.

The main circuit includes a capacitor 241 (Co), which is an output capacitor, a main diode 242 (Dm), two windings (which are referred to as a winding 243 and a primary winding 244 (Np) constituting a switching transformer), and a main switch element 245 ($Q_{main}$) having a MOS type FET.

The turn ratio between the winding 243 and the primary winding 244 is 1:n.

Also, a DC power supply 251 (Vi) is shown in FIG. 10. Here, the power supply 251 is similar to the power supply 21 shown in FIG. 7.

For the convenience of description, in the power conversion device 104, two output terminals on a side to which a load (not shown) is connected will be referred to as a first output terminal T31 and a second output terminal T32. In the example of FIG. 10, the first output terminal T31 is on a ground (GND) side and the second output terminal T32 is on a positive (+) side.

Here, in the main circuit, the power supply 251 and the switch element 245 are connected to both ends of the primary winding 244 of the coupled inductor. A series circuit of the winding 243 paired with the primary winding 244 and the diode 242 is connected in parallel to the capacitor 241.

The first output terminal T31, one end of the capacitor 241, and one end of the winding 243 are connected.

The other end of the winding 243 and an anode of the diode 242 are connected.

The second output terminal T32, the other end of the capacitor 241, and a cathode of the diode 242 are connected.

One end of the power supply 251 (a negative (−) terminal in the example of FIG. 10) and a source of the switch element 245 are connected.

A drain of the switch element 183 and one end of the primary winding 244 are connected.

The other end of the primary winding 244 and the other end of the power supply 251 (a positive (+) terminal in the example of FIG. 10) are connected.

The ZVS assist circuit includes the primary winding 244 (Np), a winding 261 (Nc), and a tertiary winding 262 (Nt) of a coupled inductor, a diode 263 ($Ds_1$), a switch element 264 ($Q_{sub}$) having a MOS type FET, a diode 265 ($Ds_2$), and a capacitor 266 (Cs), which is an auxiliary capacitor.

Here, a case where the primary winding 244 (Np) of the coupled inductor is not included in the ZVS assist circuit may be considered.

A secondary winding (Ns=Nc+Nt) includes the winding 261 and the tertiary winding 262.

Except for the arrangement of the primary winding 244, the circuit configuration of the ZVS assist circuit according to the example of FIG. 10 is similar to that of the ZVS assist circuit A4 shown in FIG. 4.

The ZVS assist circuit according to the example of FIG. 10 is arranged between the switch element 245 of the main circuit and the power supply 251.

Here, in the power conversion device 104 shown in FIG. 10, a turn ratio that satisfies the ZVS condition is represented by Inequality (4). In Inequality (4), $N_t$ denotes the number of turns of the tertiary winding 262, $N_s$ denotes the number of turns of the secondary winding, Vo denotes an output voltage of the main circuit (a voltage applied between the first output terminal T31 and the second output terminal T32), Vi denotes a voltage of the power supply 251, and n denotes a turn ratio of the transformer including the winding 243 and the primary winding 244.

$$\frac{N_t}{N_s} \geq \frac{1}{2}\left(\frac{Vi}{n \cdot Vo} - 1\right) \quad (4)$$

Also, the operating principle of the ZVS assist circuit in the power conversion device 104 is similar to those of the ZVS assist circuits A1 to A4 shown in FIGS. 1 to 4.

Although the case where the diode is used as the rectifying element is shown in the power conversion device 104 according to the present embodiment, another rectifying element may be used.

For example, a switch element such as a MOS type FET may be used instead of the main diode 242 (Dm).

Although the case where the DC power supplies 21, 121, 171, and 251 are used is shown in the examples of FIGS. 7 to 10, the power supply may be a full-wave rectified voltage or a half-wave rectified voltage including a pulsating current as an example of another configuration and can be applied to a general PFC circuit.

Modified Example of ZVS Assist Circuit

A modified example of the ZVS assist circuit (the ZVS resonance assist circuit) will be described with reference to FIGS. 11 and 12.

Figure 11:
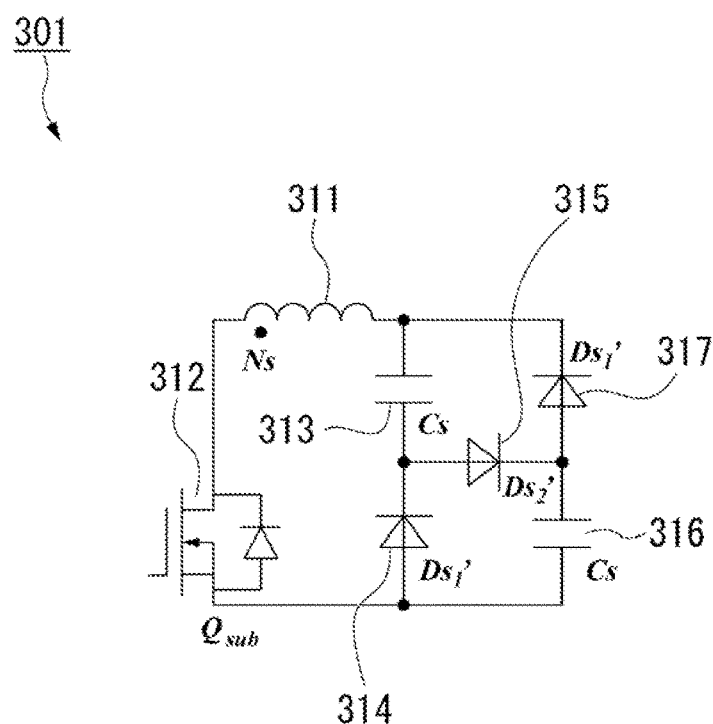
FIG. 11 is a diagram showing an example of a circuit configuration according to a modified example of the ZVS assist circuit according to an embodiment.

ZVS Assist Circuit According to Example of FIG. 11

FIG. 11 is a diagram showing an example of a circuit configuration according to a modified example of a ZVS assist circuit 301 according to an embodiment.

The ZVS assist circuit 301 is a modified example in which the turn ratio between the number of turns ($N_s$) of the secondary winding and the number of turns ($N_t$) of the tertiary winding is 2:1 ($N_s$:$N_t$=2:1) in the ZVS assist circuit A2 shown in FIG. 2.

In the example of FIG. 11, a primary winding (Np) of a coupled inductor is not shown.

The ZVS assist circuit 301 includes a secondary winding 311 (Ns), a sub-switch element 312 ($Q_{sub}$) having a MOS type FET, a capacitor 313 (Cs), which is an auxiliary capacitor, a diode 314 ($Ds_1'$), a diode 315 ($Ds_2'$), a capacitor 316 (Cs), which is an auxiliary capacitor, and a diode 317 ($Ds_1'$).

A source of the switch element 312, an anode of the diode 314, and one end of the capacitor 316 are connected.

A drain of the switch element 312 and one end of the secondary winding 311 are connected.

A cathode of the diode 314, one end of the capacitor 313, and an anode of the diode 315 are connected.

The other end of the capacitor 316, a cathode of the diode 315, and an anode of the diode 317 are connected.

The other end of the secondary winding 311, the other end of the capacitor 313, and a cathode of the diode 317 are connected.

Figure 12:
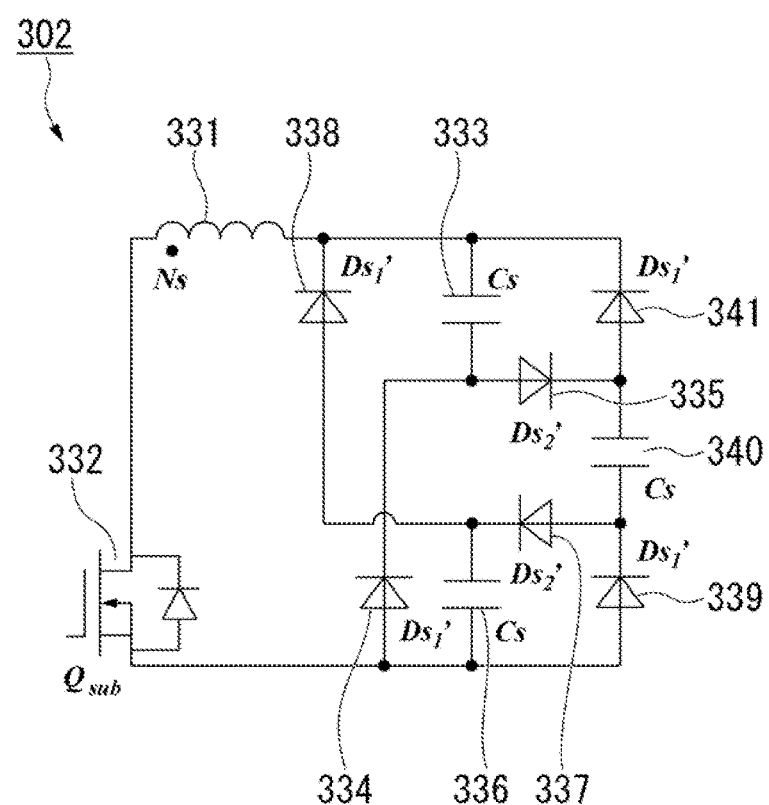
FIG. 12 is a diagram showing an example of a circuit configuration according to a modified example of the ZVS assist circuit according to an embodiment.

ZVS Assist Circuit According to Example of FIG. 12

FIG. 12 is a diagram showing an example of a circuit configuration according to a modified example of a ZVS assist circuit 302 according to an embodiment.

The ZVS assist circuit 302 is a modified example in which the turn ratio between the number of turns ($N_s$) of the secondary winding and the number of turns ($N_t$) of the tertiary winding is 3:1 ($N_s$:$N_t$=3:1) in the ZVS assist circuit A2 shown in FIG. 2.

In the example of FIG. 12, a primary winding (Np) of a coupled inductor is not shown.

The ZVS assist circuit 302 includes a secondary winding 331 (Ns), a sub-switch element 332 ($Q_{sub}$) having a MOS type FET, a capacitor 333 (Cs), which is an auxiliary capacitor, a diode 334 ($Ds_1$'), a diode 335 ($Ds_2$'), a capacitor 336 (Cs), which is an auxiliary capacitor, a diode 337 ($Ds_2$'), a diode 338 ($Ds_1$'), a diode 339 ($Ds_1$'), a capacitor 340 (Cs), which is an auxiliary capacitor, and a diode 341 ($Ds_1$').

A source of the switch element 332, an anode of the diode 334, one end of the capacitor 336, and an anode of the diode 339 are connected.

A drain of the switch element 332 and one end of the secondary winding 331 are connected.

A cathode of the diode 334, one end of the capacitor 333, and an anode of the diode 335 are connected.

A cathode of the diode 339, one end of the capacitor 340, and an anode of the diode 337 are connected.

A cathode of the diode 335, the other end of the capacitor 340, and an anode of the diode 341 are connected.

A cathode of the diode 337, the other end of the capacitor 336, and an anode of the diode 338 are connected.

The other end of the secondary winding 331, a cathode of the diode 338, the other end of the capacitor 333, and a cathode of the diode 341 are connected.

Although the case of ($N_s$:$N_t$=2:1) is shown in the example of FIG. 11 and the case of ($N_s$:$N_t$=3:1) is shown in the example of FIG. 12, a modified circuit can be similarly configured even if q is 4 or more in the case of ($N_s$:$N_t$=q:1).

As shown in the examples of FIGS. 11 and 12, the assist winding and the number of terminals (the number of pins) can be simplified using a non-linear capacitor. Although the number of parts is disadvantageously set as the number of non-linear capacitors m in series increases, the number of pins of the tapped inductor can be reduced. In this case, $N_t/N_s$=1/m.

Although the case where the modified example of the ZVS assist circuit is applied to the boost converter is shown in the examples of FIGS. 11 to 12, the modified example of the ZVS assist circuit may be applied to a buck converter, a buck-boost converter, or a flyback converter.

As in the examples of FIGS. 11 and 12, in the case of ($N_s$:$N_t$=q:1), a circuit in which one or more rectifying elements ($Ds_1$'), one or more rectifying elements ($Ds_2$'), q auxiliary capacitors (Cs), a switch element ($Q_{sub}$), and a secondary winding (Ns) are combined can be configured, an equivalent circuit in which q auxiliary capacitors (Cs) are connected in series when one of the rectifying element ($Ds_1$') and the rectifying element ($Ds_2$') is turned on and the other thereof is turned off can be provided, and an equivalent circuit in which q auxiliary capacitors (Cs) are connected in parallel when the other of the rectifying element ($Ds_1$') and the rectifying element ($Ds_2$') is turned on and the one thereof is turned off can be provided.

In the circuit according to the example of FIG. 11, a closed-loop circuit connected to the secondary winding (Ns) of the coupled inductor, the auxiliary capacitor (Cs), a cathode via an anode of the rectifying element ($Ds_2$'), the auxiliary capacitor (Cs), and the auxiliary switch element ($Q_{sub}$) and a closed-loop circuit connected to the auxiliary capacitor (Cs), the secondary winding (Ns), the auxiliary switch element ($Q_{sub}$), and the rectifying element ($Ds_1$') are provided.

The circuit according to the example of FIG. 12 includes the auxiliary capacitor (Cs), the rectifying element ($Ds_1$'), and the rectifying element ($Ds_2$') having a connection rule similar to that of the example of FIG. 11, and has, for example, a cascade connection circuit including the rectifying element ($Ds_1$'), the auxiliary capacitor (Cs), and the rectifying element ($Ds_1$').

Example of Configuration of Multiphase Power Conversion Device Including ZVS Assist Circuit An example of a configuration of a multiphase power conversion device including a ZVS assist circuit (a ZVS resonance assist circuit) will be described with reference to FIG. 13.

Figure 13:
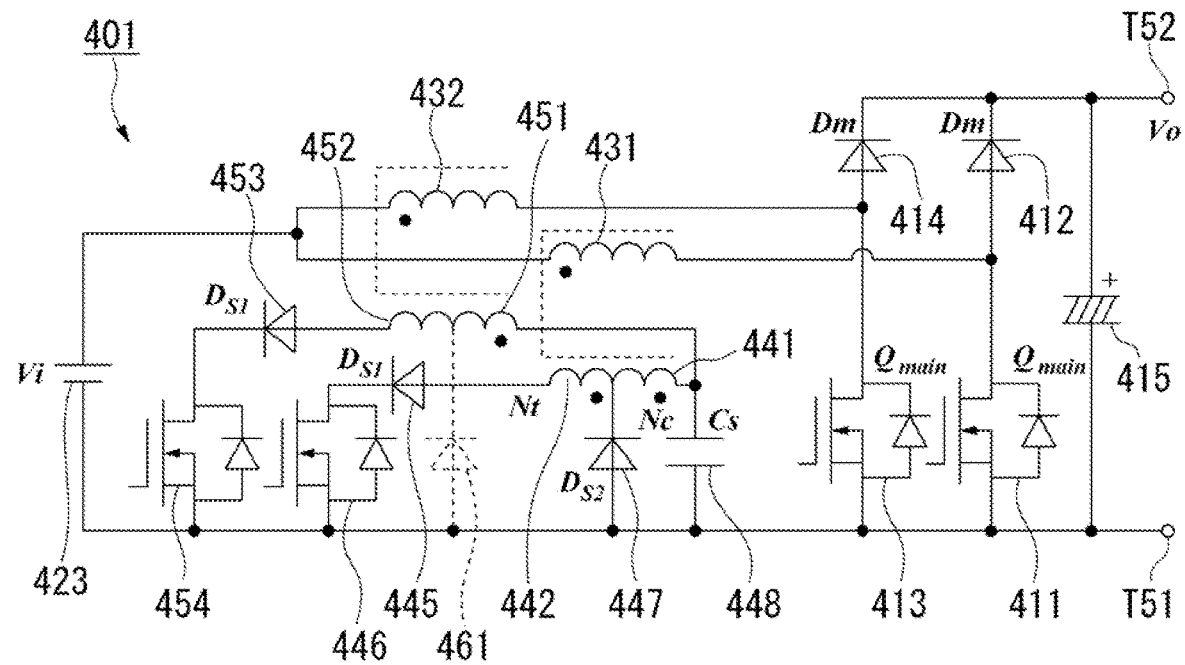
FIG. 13 is a diagram showing an example of a circuit configuration of a multiphase power conversion device including a ZVS assist circuit according to an embodiment.

FIG. 13 shows a case where a power conversion device includes a boost converter.

ZVS Assist Circuit According to Example of FIG. 13

FIG. 13 is a diagram showing an example of a circuit configuration of a multiphase power conversion device 401 including a ZVS assist circuit according to an embodiment.

In the example of FIG. 13, an example of a configuration of a two-phase power conversion device 401 is shown.

In the example of FIG. 13, a control circuit is not shown.

The power conversion device 401 includes a main circuit and a ZVS assist circuit.

The main circuit includes a main switch element 411 ($Q_{main}$) having a MOS type FET and a main diode 412 (Dm) in a first phase, a main switch element 413 ($Q_{main}$) having a MOS type FET and a main diode 414 (Dm) in a second phase, a capacitor 415 (Co), which is an output capacitor, a primary winding 431 (Np) of the coupled inductor corresponding to the first phase, and a primary winding 432 (Np) of the coupled inductor corresponding to the second phase.

A power supply 423 is shown in FIG. 13.

For the convenience of description, in the power conversion device 401, two output terminals on a side to which a load (not shown) is connected will be referred to as a first output terminal T51 and a second output terminal T52. In the example of FIG. 13, the first output terminal T51 is on a ground (GND) side and the second output terminal T52 is on a positive (+) side.

The ZVS assist circuit includes the primary winding 431 (Np) of the coupled inductor corresponding to the first phase and the primary winding 432 (Np) of the coupled inductor corresponding to the second phase.

Also, the ZVS assist circuit includes a winding 441 (Nt), a tertiary winding 442, a diode 445 ($Ds_1$), a switch element 446 ($Q_{sub}$) having a MOS type FET, a diode 447 ($Ds_2$), and a capacitor 448 (Cs), which is an auxiliary capacitor, as a circuit unit corresponding to the primary winding 431 of the first phase.

A secondary winding (Ns=Nc+Nt) includes the winding 441 and the tertiary winding 442.

Also, the ZVS assist circuit includes a winding 451 (Nt), a tertiary winding 452, a diode 453 ($Ds_1$), and a switch element 454 ($Q_{sub}$) having a MOS type FET as a circuit unit corresponding to the primary winding 432 of the second phase.

Here, a case where the primary winding 431 (Np) of the coupled inductor and the primary winding 432 (Np) of the coupled inductor are not included in the ZVS assist circuit may be considered.

A secondary winding (Ns=Nc+Nt) includes the winding 451 and the tertiary winding 452.

Although the winding 451 (Nt) and the tertiary winding 452 will be described separately to describe the case where the diode 461 is provided together, the winding 451 (Nt) and the tertiary winding 452 will be described as one winding without taps when the diode 461 is not provided.

The first output terminal T51, one end of the capacitor 415, a source of the switch element 411, a source of the switch element 413, and one end of the power supply 423 (a negative (−) terminal in the example of FIG. 1) are connected.

The second output terminal T52, the other end of the capacitor 415, a cathode of the diode 412, and a cathode of the diode 414 are connected.

The other end of the power supply 423 (a positive (+) terminal in the example of FIG. 1) is connected to one end of the primary winding 431 and one end of the primary winding 432 of the ZVS assist circuit.

The other end of the primary winding 431, a drain of the switch element 411, and an anode of the diode 412 are connected.

The other end of the primary winding 432, a drain of the switch element 413, and an anode of the diode 414 are connected.

Here, the circuit unit of the first phase of the ZVS assist circuit has a circuit configuration similar to that of the ZVS assist circuit A4 according to the example of FIG. 4.

Also, the circuit unit of the second phase of the ZVS assist circuit shares the capacitor 448 of the first phase.

Also, the circuit unit of the second phase of the ZVS assist circuit may or may not include the diode 461. When the diode 461 is provided, an anode of the diode 461 is connected to the first output terminal T51 and a cathode of the diode 461 is connected to a point between the winding 451 and the tertiary winding 452.

Although an example of a configuration of the two-phase power conversion device 401 is shown in the example of FIG. 13, it is also possible to provide a circuit unit of a ZVS assist circuit in correspondence with each phase in a power conversion device having three or more phases.

Although an example of a configuration in which a partial circuit element (the capacitor 448 in the example of FIG. 13) is shared between the circuit unit of the first phase and the circuit unit of the second phase in the ZVS assist circuit is shown in the example of FIG. 13, the circuit unit of the ZVS assist circuit may be separately provided for each phase.

Although the case where the ZVS assist circuit is applied to the multiphase boost converter is shown in the example of FIG. 13, the ZVS assist circuit may be applied to a multiphase buck converter, a multiphase buck-boost converter, or a multiphase flyback converter.

Although the case where the DC power supply 423 is used is shown in the examples of FIG. 13, this power supply may be a full-wave rectified voltage or a half-wave rectified voltage including a pulsating current as an example of another configuration and can also be applied to a general power factor correction (PFC) circuit.

Although the case where the diode is used as the rectifying element is shown in the power conversion device 401 according to the present embodiment, another rectifying element may be used.

For example, a switch element such as a MOS type FET may be used instead of the main diode 412 (Dm) and the main diode 414 (Dm).

Example of Configuration of Power Conversion Device Including AC Converter Having ZVS Assist Circuit An example of a configuration of a power conversion device including an AC converter having a ZVS assist circuit will be described with reference to FIGS. 14 to 16.

Figure 14:
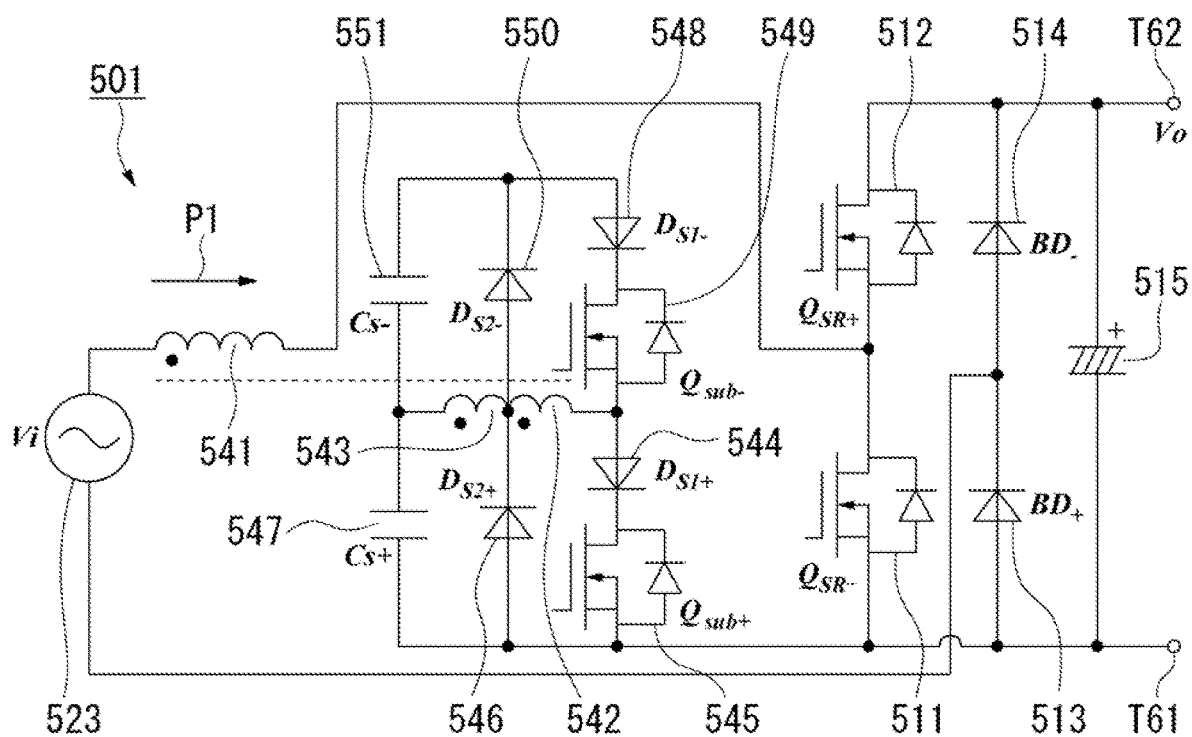
FIG. 14 is a diagram showing an example of a circuit configuration of a power conversion device including an alternating current (AC) converter having a ZVS assist circuit according to an embodiment.
Figure 15:
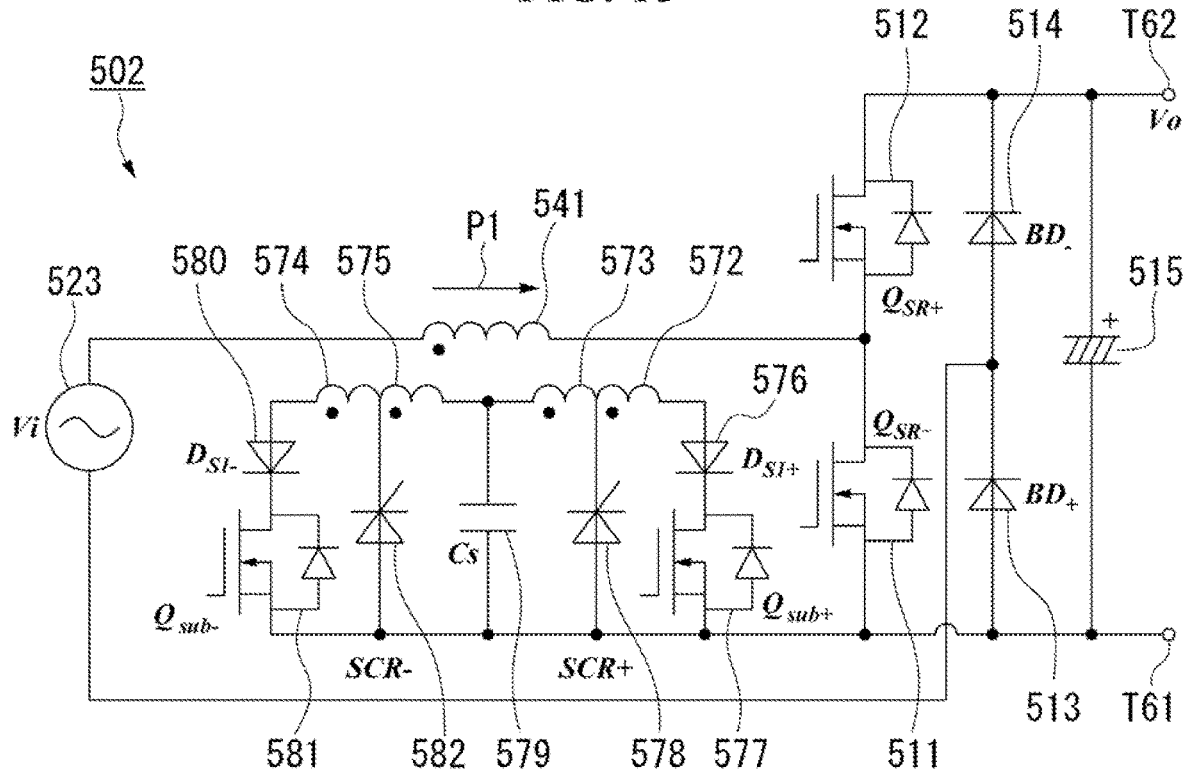
FIG. 15 is a diagram showing an example of a circuit configuration of a power conversion device including an AC converter having a ZVS assist circuit according to an embodiment.
Figure 16:
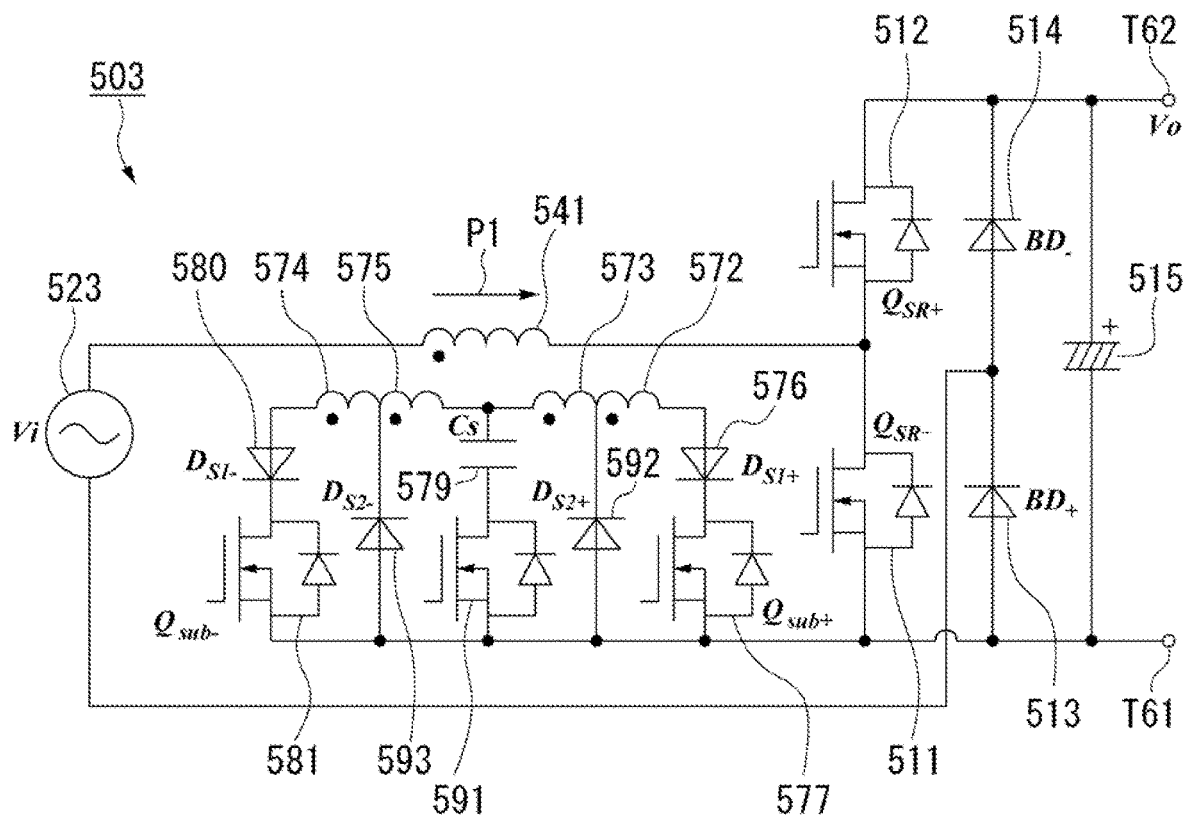
FIG. 16 is a diagram showing an example of a circuit configuration of a power conversion device including an AC converter having a ZVS assist circuit according to an embodiment.

FIGS. 14 to 16 show a case where the power conversion device includes a boost converter.

Power Conversion Device According to Example of FIG. 14

FIG. 14 is a diagram showing an example of a circuit configuration of a power conversion device 501 including a ZVS assist circuit according to an embodiment.

In the example of FIG. 14, a control circuit is not shown.

The example of FIG. 14 is an example of an application circuit to a totem-pole PFC circuit. In the example of FIG. 14, in the ZVS assist circuit, the presence/absence of an assist operation of upper and lower arms is controlled according to the polarity of a current.

The power conversion device 501 includes a main circuit and a ZVS assist circuit.

The main circuit includes a main switch element 511 ($Q_{main}$) and a switch element 512 ($Q_{main}$) having MOS type FETs, a half-wave rectifier diode 513 ($BD_+$) and a half-wave rectifier diode 514 ($BD_-$), which are half-wave rectifier elements of the input voltage, a capacitor 515 (Co), which is an output capacitor, and a primary winding 541 (Np) of a coupled inductor.

Also, an AC power supply 523 (Vi) is shown in FIG. 14. Here, the power supply 523 may be, for example, a commercial AC power supply.

Here, in the switch element 511 and the switch element 512, which are the two main switch elements ($Q_{main}$), the switch element 512 becomes a main rectifying element ($Q_{SR+}$) responsible for a reflux operation of an exciting current of the primary winding 541 during a period in which the AC power supply 523 is positive and the switch element 511 becomes a main rectifying element ($Q_{SR-}$) responsible for a reflux operation of the exciting current of the primary winding 541 during a period in which the AC power supply 523 is negative.

In this way, one of the switch element 511 and the switch element 512, which are the two main switch elements ($Q_{main}$), becomes the main rectifying element ($Q_{SR}$) in accordance with a positive or negative level of the input voltage.

For the convenience of description, in the power conversion device 501, two output terminals on a side to which a load (not shown) is connected will be referred to as a first output terminal T61 and a second output terminal T62. In the example of FIG. 14, the first output terminal T61 is on a ground (GND) side and the second output terminal T62 is on a positive (+) side.

The ZVS assist circuit includes the primary winding 541 (Np), a winding 542 (Nc), and a tertiary winding 543 (Nt) of a coupled inductor, a switch element 545 ($Q_{sub+}$) having a MOS type FET, a diode 544 ($Ds_{1+}$), a diode 546 ($Ds_{2+}$), and a capacitor 547 (Cs+), which is an auxiliary capacitor.

Also, the ZVS assist circuit includes a diode 548 ($Ds_{1-}$), a switch element 549 ($Q_{sub-}$) having a MOS type FET, a diode 550 ($Ds_{2-}$), and a capacitor 551 (Cs−), which is an auxiliary capacitor.

Here, a case where the primary winding 541 (Np) of the coupled inductor is not included in the ZVS assist circuit may be considered.

A secondary winding (Ns=Nc+Nt) includes the winding 542 and the tertiary winding 543.

The first output terminal T61, one end of the capacitor 515, an anode of the half-wave rectifier diode 513, a source of the switch element 511, a source of the switch element 545, an anode of the diode 546, and one end of the capacitor 547 are connected.

The second output terminal T62, the other end of the capacitor 515, a cathode of the half-wave rectifier diode 514, and a drain of the switch element 512 are connected.

One end of the power supply 523 (a negative (−) terminal in the example of FIG. 1), a cathode of the half-wave rectifier diode 513, and an anode of the half-wave rectifier diode 514 are connected.

The other end of the power supply 523 (a positive (+) terminal in the example of FIG. 1) and one end of the primary winding 541 are connected.

The other end of the primary winding 541, a drain of the switch element 511, and a source of the switch element 512 are connected.

A drain of the switch element 545 and a cathode of the diode 544 are connected.

One end of the winding 542, an anode of the diode 544, and a source of the switch element 549 are connected.

The other end of the winding 542, one end of the tertiary winding 543, a cathode of the diode 546, and an anode of the diode 550 are connected.

The other end of the tertiary winding 543, the other end of the capacitor 547, and one end of the capacitor 551 are connected.

A drain of the switch element 549 and a cathode of the diode 548 are connected.

The other end of the capacitor 551, a cathode of the diode 550, and an anode of the diode 548 are connected.

In the example of FIG. 14, a direction P1 is shown.

In the example of FIG. 14, it is assumed that the direction P1 is a direction in which the polarity is positive (+).

Power Conversion Device According to Example of FIG. 15

FIG. 15 is a diagram showing an example of a circuit configuration of a power conversion device 502 including a ZVS assist circuit according to an embodiment.

The example of FIG. 15 is an example of an application circuit to a totem-pole PFC circuit.

In the example of FIG. 15, a control circuit is not shown.

The power conversion device 502 includes a main circuit and a ZVS assist circuit.

The main circuit is similar to the main circuit according to the example of FIG. 14 and circuit elements of the main circuit are shown using reference signs that are the same as those of FIG. 14.

Also, the primary winding 541 and the direction P1 are similar to those of the example of FIG. 14 and are shown using reference signs that are the same as those of FIG. 14.

Also, a power supply 523 similar to that shown in FIG. 14 is shown in FIG. 15.

The ZVS assist circuit includes a primary winding 541 (Np), a winding 572 (Nc), a tertiary winding 573 (Nt), a winding 574, and a tertiary winding 575 of a coupled inductor, a diode 576 ($Ds_{1+}$), a switch element 577 ($Q_{sub+}$) having a MOS type FET, a thyristor 578 (SCR+), and a capacitor 579 (Cs), which is an auxiliary capacitor.

Also, the ZVS assist circuit includes a diode 580 ($Ds_{1-}$), a switch element 581 ($Q_{sub-}$) having a MOS type FET, and a thyristor 582 (SCR−).

Here, a case where the primary winding 541 (Np) of the coupled inductor is not included in the ZVS assist circuit may be considered.

A secondary winding (Ns=Nc+Nt) includes the winding 572 and the tertiary winding 573.

A secondary winding (Ns=Nc+Nt) includes the winding 574 and the tertiary winding 575.

The capacitor 579 is shared by the tertiary winding 573 and the tertiary winding 575.

Here, a circuit unit including the primary winding 541, the winding 572 (Nc), the tertiary winding 573, the diode 576, the switch element 577, the thyristor 578, and the capacitor 579 is similar to that of the ZVS assist circuit A4 shown in FIG. 4, except that the thyristor 578 is provided instead of the diode 53 shown in FIG. 4. Also, in the example of FIG. 15, a case where the circuit configuration of the circuit unit is reversed left and right (the polarities of the winding 572 and the tertiary winding 573 are reversed left and right) in the drawing is shown as compared with the example of FIG. 4.

Also, the circuit unit including the primary winding 541, the winding 574 (Nc), the tertiary winding 575, the diode 580, the switch element 581, the thyristor 582, and the capacitor 579 is similar to that of the ZVS assist circuit A4 shown in FIG. 4, except that the thyristor 582 is provided instead of the diode 53 shown in FIG. 4.

The power conversion device 502 according to the example of FIG. 15 is implemented only by a low-side drive part and a process of driving the thyristor 578 and the thyristor 582 is controlled in accordance with the polarity of the current.

Power Conversion Device According to the Example of FIG. 16

FIG. 16 is a diagram showing an example of a circuit configuration of a power conversion device 503 including a ZVS assist circuit according to an embodiment.

Also, the example of FIG. 16 is an example of an application circuit to a totem-pole PFC circuit.

In the example of FIG. 16, a control circuit is not shown.

The power conversion device 503 includes a main circuit and a ZVS assist circuit.

The main circuit is similar to the main circuit according to the example of FIG. 14 and the circuit elements of the main circuit are shown using reference signs that are the same as those of FIG. 14.

Also, the primary winding 541 and the direction P1 are similar to those of the example of FIG. 14 and are shown using reference signs that are the same as those of FIG. 14.

Also, a power supply 523 similar to that shown in FIG. 14 is shown in FIG. 16.

The ZVS assist circuit is similar to the ZVS assist circuit according to the example of FIG. 15, except that diodes 592 and 593 are provided instead of the thyristors 578 and 582 shown in FIG. 15 and an FET 591, which is a switch element, is provided, and is illustrated using reference signs that are the same as those of FIG. 14.

The FET 591 is provided between the first output terminal T61 and the capacitor 579.

A source of the FET 591 is connected to the first output terminal T61. A drain of the FET 591 is connected to one end of the capacitor 579.

The FET 591 is an OR drive switch of the switch element 577 ($Q_{sub+}$) and the switch element 581 ($Q_{sub-}$).

Examples of operations performed in the power conversion device 502 shown in FIG. 16 and the power conversion device 503 shown in FIG. 17 will be described together with reference to FIG. 17.

Figure 17:
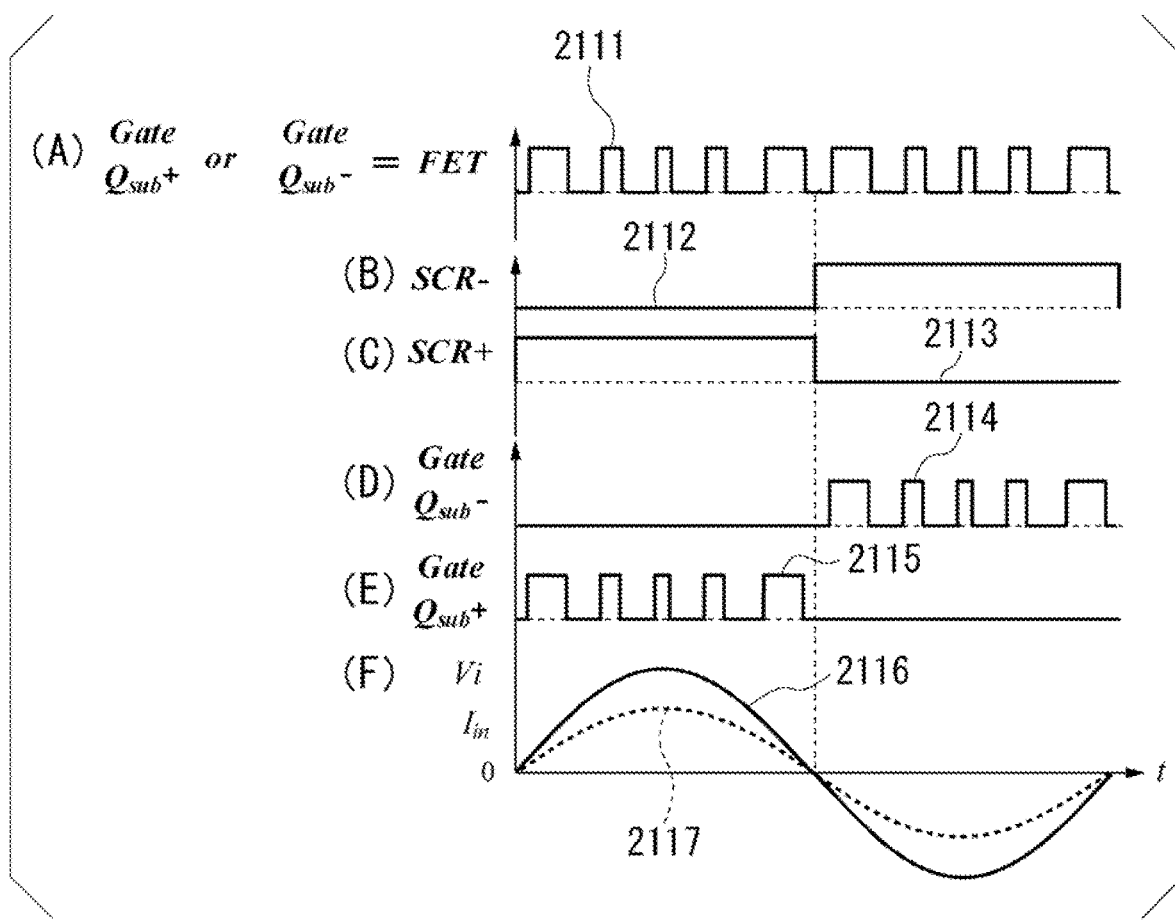
FIG. 17 is a diagram showing an example of a waveform in the power conversion device including the AC converter having the ZVS assist circuit according to the embodiment.

FIG. 17 is a diagram showing an example of waveforms in the power conversion devices 502 and 503 including the AC converter having the ZVS assist circuit according to the embodiment.

In the power conversion device 502, an ON/OFF state of the switch element 577 ($Q_{sub+}$), an ON/OFF state of the switch element 581 ($Q_{sub-}$), an ON/OFF state of the thyristor 578 (SCR+), and an ON/OFF state of the thyristor 582 (SCR−) can be switched in a control process performed by the controller.

In the power conversion device 503, an ON/OFF state of the switch element 577 ($Q_{sub+}$), an ON/OFF state of the switch element 581 ($Q_{sub-}$), and an ON/OFF state of the FET 591 can be switched in a control process performed by the controller.

In the graph shown in FIG. 17, the horizontal axis represents time (t) and the vertical axis represents a level of each waveform.

A waveform 2111 representing an ON state and an OFF state of the FET 591 is shown in FIG. 17(A).

A waveform 2112 representing an ON state and an OFF state of the thyristor 582 (SCR−) is shown in FIG. 17(B).

A waveform 2113 representing an ON state and an OFF state of the thyristor 578 (SCR+) is shown in FIG. 17(C).

A waveform 2114 representing an ON state and an OFF state of the switch element 581 ($Q_{sub-}$) is shown in FIG. 17(D).

A waveform 2115 representing an ON state and an OFF state of the switch element 577 ($Q_{sub+}$) is shown in FIG. 17(E).

A waveform 2116 representing a voltage (Vi) of the power supply 523 and a waveform 2117 representing a current ($I_{in}$) from the power supply 523 are shown in FIG. 17(F).

In the examples of FIGS. 14 to 16, each of the half-wave rectifier diode 513 and the half-wave rectifier diode 514 of the main circuit may be replaced with a switch element such as a MOS type FET, and, in this case, a bidirectional converter is implemented.

Although the case where the ZVS assist circuit is applied to a boost converter is shown in the examples of FIGS. 14 to 17, the ZVS assist circuit may be applied to a buck converter, a buck-boost converter, or a flyback converter.

When the half-wave rectifier diode (corresponding to the half-wave rectifier diodes 513 and 514 in the examples of FIGS. 14 to 16) is turned off by a reverse current in the totem-pole PFC circuit and the present resonance operation is interfered with, a process of interfering with the resonance operation can be prevented by connecting a capacitance component in parallel to the half-wave rectifier diode (corresponding to the half-wave rectifier diodes 513 and 514 in the examples of FIGS. 14 to 16). Alternatively, it is possible to prevent a process of interfering with the resonance operation even if the half-wave rectifier diodes 513 and 514 in the examples of FIGS. 14 to 16 are replaced with switch elements such as FETs so that a reverse current is allowed to flow through the half-wave rectifier diode (corresponding to the half-wave rectifier diodes 513 and 514 in the examples of FIGS. 14 to 16).

Example of Configuration of Controller (Drive Circuit) of ZVS Assist Circuit

An example of a configuration of a controller (a drive circuit) of the ZVS assist circuit (the ZVS resonance assist circuit) will be described with reference to FIGS. 18 to 20.

Figure 18:
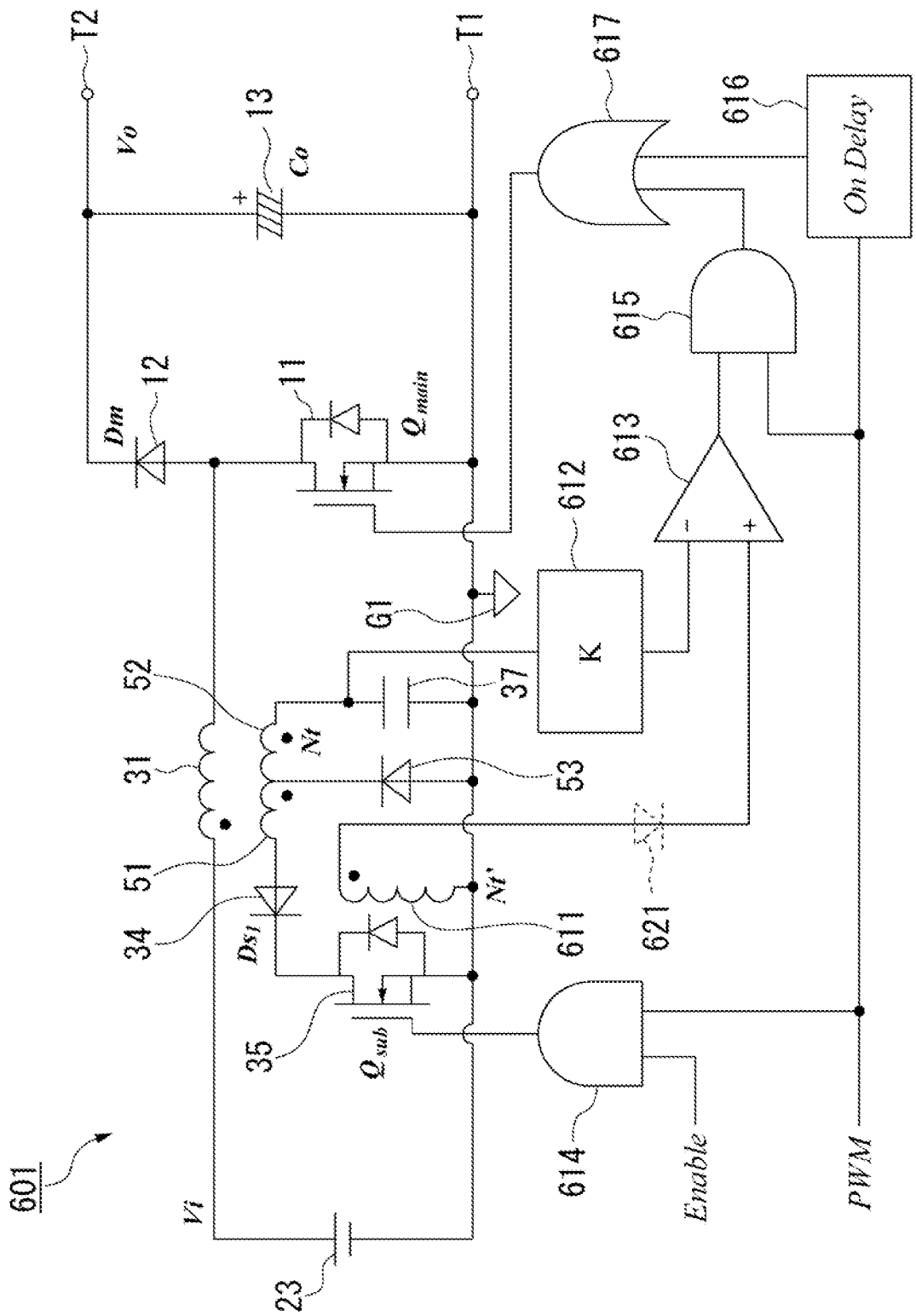
FIG. 18 is a diagram showing an example of a configuration of a controller (a drive circuit) of the ZVS assist circuit according to an embodiment.
Figure 19:
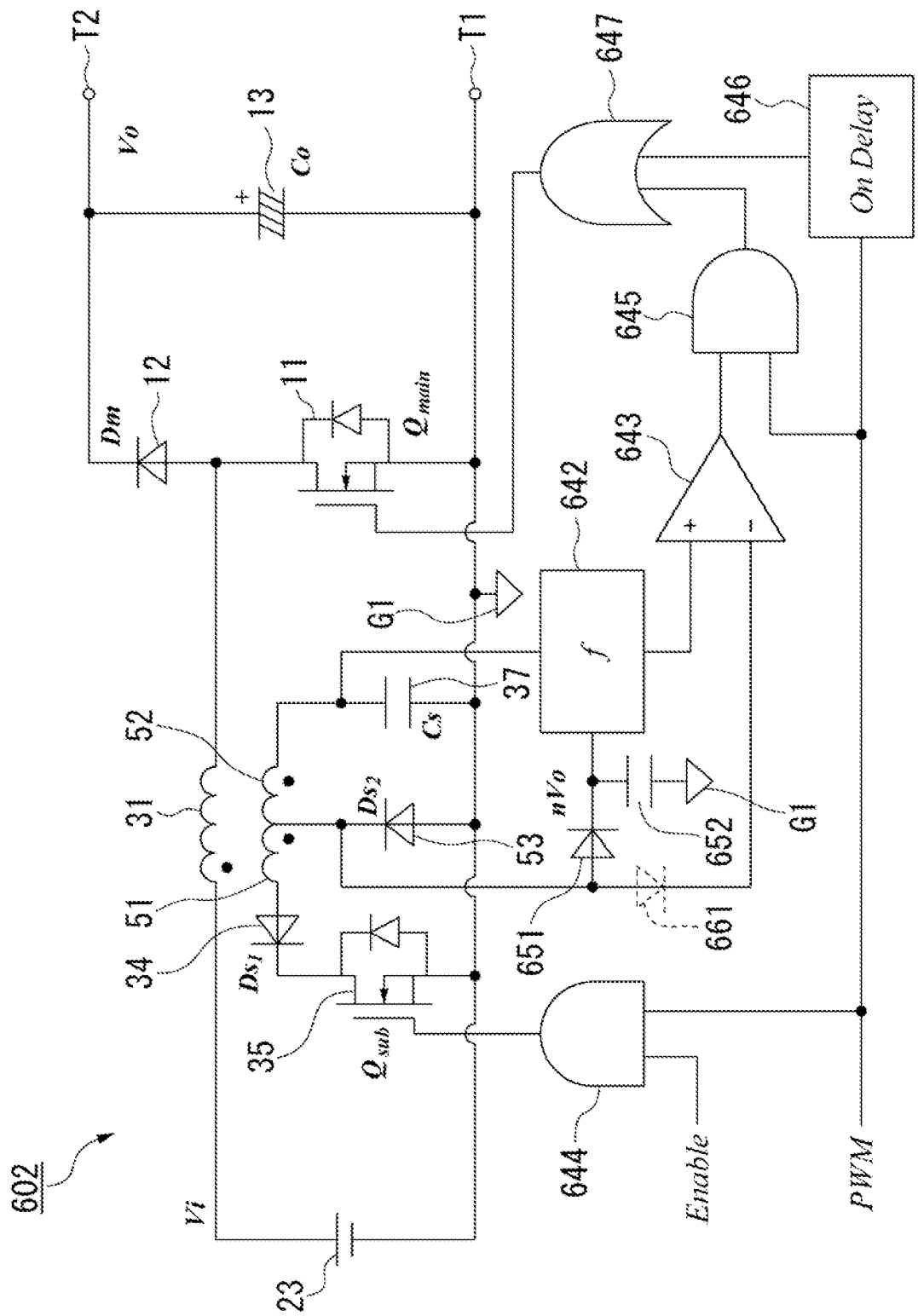
FIG. 19 is a diagram showing an example of a configuration of a controller (a drive circuit) of the ZVS assist circuit according to an embodiment.
Figure 20:
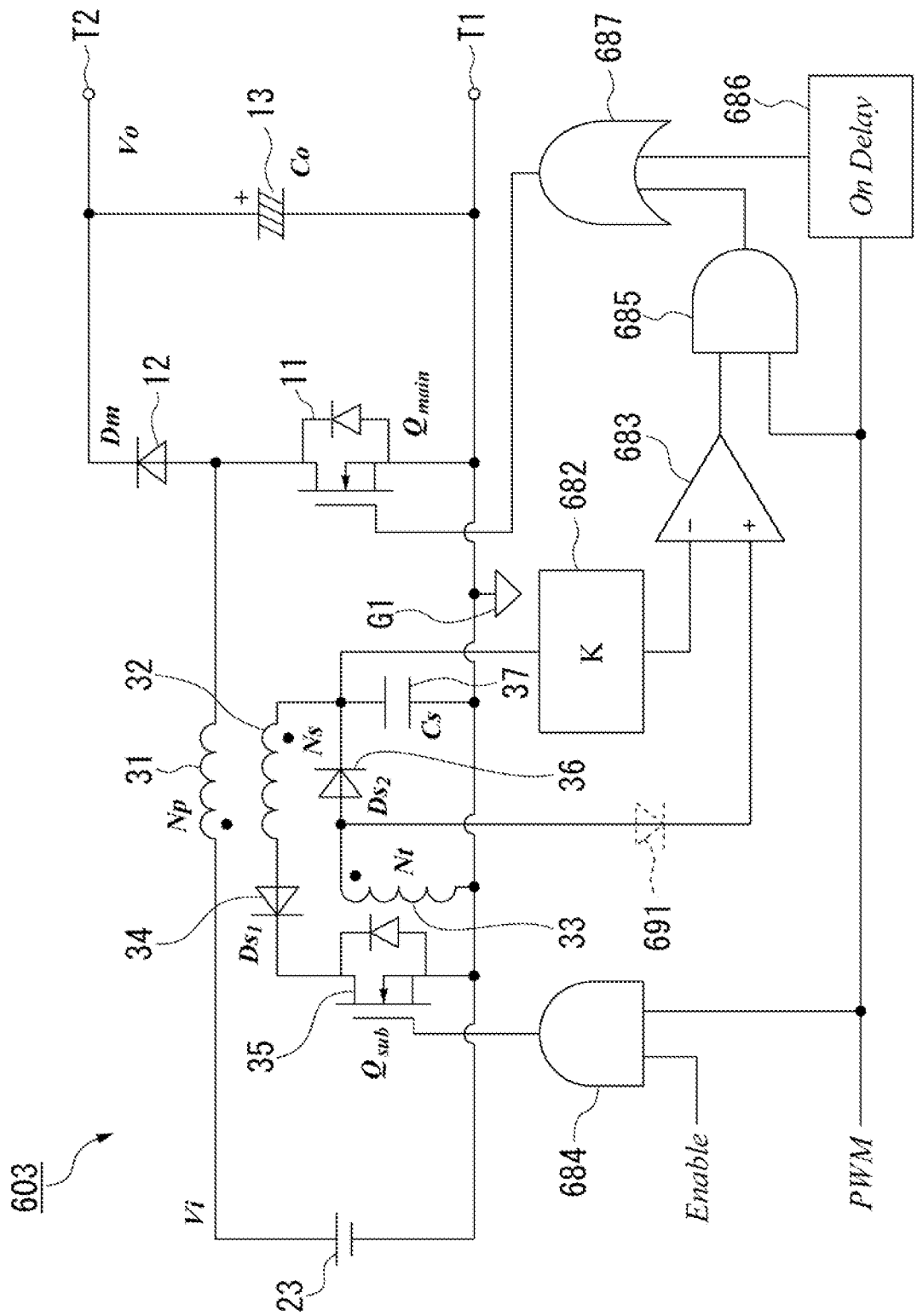
FIG. 20 is a diagram showing an example of a configuration of a controller (a drive circuit) of the ZVS assist circuit according to an embodiment.

In FIGS. 18 to 20, a case where the power conversion device includes a boost converter is shown.

Controller of ZVS Assist Circuit According to Example of FIG. 18

FIG. 18 is a diagram showing an example of a configuration of a controller (a drive circuit) of the ZVS assist circuit according to an embodiment.

In FIG. 18, a power conversion device 601 having a configuration similar to that of the power conversion device 4 shown in FIG. 4 and having a controller is shown. In the example of FIG. 18, circuit units similar to that shown in FIG. 4 are shown using reference signs that are the same as those of FIG. 4.

A power supply 23 is shown in FIG. 18.

Also, a first output terminal T1 is connected to a ground terminal G1.

The controller includes an auxiliary winding 611, an arithmetic unit 612, a comparator 613, an AND gate 614, an AND gate 615, an ON-delay circuit 616, and an OR gate 617.

The AND gate 614 inputs an Enable signal and a pulse width modulation (PWM) signal and outputs a logical operation result thereof to a gate of the switch element 35 ($Q_{sub}$).

Generally, the ON-delay circuit delays only a rising edge and the OFF-delay circuit delays only a falling edge.

Here, in the present embodiment, a control IC (not shown) outputs the Enable signal and the PWM signal.

The Enable signal is a signal for controlling the presence or absence of ZVS assist. For example, using the Enable signal, it is possible to stop a ZVS assist operation according to a condition and add a reactive current loss reduction function and a function of preventing a surge voltage to the switch element 35 ($Q_{sub}$).

One end of the auxiliary winding 611 is connected to a first output terminal T1 and the other end of the auxiliary winding 611 is connected to a positive (+) input terminal of the comparator 613.

Also, a diode 621 for allowing a current to flow in a direction from the auxiliary winding 611 to the comparator 613 as a forward direction may or may not be provided between the auxiliary winding 611 and the positive (+) input terminal of the comparator 613.

The arithmetic unit 612 is connected to the other end of the capacitor 37, a voltage applied to both ends of the capacitor 37 is multiplied by K, and the voltage multiplied by K is output to a negative (−) input terminal of the comparator 613.

The comparator 613 outputs a value according to inputs of the positive (+) input terminal and the negative (−) input terminal to the AND gate 615. Specifically, the comparator 613 outputs a value of 1 when the input of the positive (+) input terminal is greater than the input of the negative (−) input terminal and outputs a value of 0 when the input of the positive (+) input terminal is less than the input of the negative (−) input terminal.

The AND gate 615 inputs the PWM signal and the output from the comparator 613 and outputs a logical operation result thereof to the OR gate 617.

The ON-delay circuit 616 delays the PWM signal and outputs the delayed PWM signal to OR gate 617.

The OR gate 617 inputs the output from the AND gate 615 and the output from the ON-delay circuit 616 and outputs a logical operation result thereof to the gate of the switch element 11 ($Q_{main}$).

Here, a value (K in the present example) that is multiplied by the arithmetic unit 612 is obtained by, for example, a leakage inductor (and an additional inductor when the additional inductor is provided) and a threshold value (a value of the negative (−) input terminal) of the comparator 613 is obtained from the value and the voltage applied to both ends of the capacitor 37.

As a specific example, a theoretical value when a tapped inductor is configured with only a leakage inductor (Lk) is basically K=½. However, if a leakage inductance ratio is unbalanced between the primary winding and the secondary winding, K is adjusted in correspondence with the unbalance.

When resonance assist is performed only by the leakage inductor (Lk) of the tapped inductor, it is possible to determine an ON timing of the switch element 11 ($Q_{main}$) by comparing ½ of the voltage of the capacitor 37 (Cs) with a voltage of the tertiary winding 52 (Nt) or the auxiliary winding 611 (Nt').

Also, when there is an additional inductor (Ladd), it is necessary to adjust K, and K=½±α. α is an adjustment value.

When the additional inductor (Ladd) is used, a coefficient K of the voltage of the capacitor 37 (Cs) to be compared is changed.

Also, the number of turns of the auxiliary winding 611 (Nt') is set to Nt/K and the same operation is implemented even if a comparison process is performed using the voltage of the capacitor 37 (Cs).

Controller of ZVS Assist Circuit According to Example of FIG. 19

FIG. 19 is a diagram showing an example of a configuration of a controller (a drive circuit) of a ZVS assist circuit according to an embodiment.

In FIG. 19, a power conversion device 602 having a configuration similar to that of the power conversion device 4 shown in FIG. 4 and having a controller is shown. In the example of FIG. 19, circuit units similar to that shown in FIG. 4 are shown using reference signs that are the same as those of FIG. 4.

A power supply 23 is shown in FIG. 19.

Also, a first output terminal T1 is connected to a ground terminal G1.

The controller includes a diode 651, a capacitor 652, an arithmetic unit 642, a comparator 643, an AND gate 644, an AND gate 645, an ON-delay circuit 646, and an OR gate 647.

Here, the configuration of the controller shown in FIG. 19 is different from the configuration of the controller shown in FIG. 18 with respect to a configuration of an input side of the comparator 643 and is similar to the configuration of the controller shown in FIG. 18 with respect to others.

An anode of the diode 651, a negative (−) input terminal of the comparator 643, and a cathode of a diode 53 are connected.

Also, a diode 661 for allowing a current to flow in a direction from the diode 53 to the comparator 643 as a forward direction may or may not be provided between the cathode of the diode 53 and the negative (−) input terminal of the comparator 643.

One input terminal of the arithmetic unit 642 and the other end of the capacitor 37 (Cs) are connected.

The other input terminal of the arithmetic unit 642 and a cathode of the diode 651 are connected.

One end of the capacitor 652 and the ground terminal G1 are connected.

The other end of the capacitor 652 and a cathode of the diode 651 are connected.

An output terminal of the arithmetic unit 642 and a positive (+) input terminal of the comparator 643 are connected.

The example of FIG. 19 is an example in which the tertiary winding (Nt) or the auxiliary winding (Nt') is not used.

A function f(n) of the arithmetic unit 642 obtains an output value using a voltage of the capacitor 37 (Cs) (an input voltage Vi obtained therefrom) and a voltage that is n times an output voltage (Vo) obtained from the voltage of the diode 53 ($Ds_2$).

The comparator 643 compares an output of the arithmetic unit 642 with the voltage of the diode 53 ($Ds_2$) and generates a signal for controlling the switch element 11 ($Q_{main}$).

Controller of ZVS Assist Circuit According to Example of FIG. 20

FIG. 20 is a diagram showing an example of a configuration of a controller (a drive circuit) of a ZVS assist circuit according to an embodiment.

In FIG. 20, a power conversion device 603 having a configuration similar to that of the power conversion device 2 shown in FIG. 2 and having a controller is shown. In the example of FIG. 20, circuit units similar to that shown in FIG. 2 are shown using reference signs that are the same as those of FIG. 2.

A power supply 23 is shown in FIG. 20.

Also, a first output terminal T1 is connected to a ground terminal G1.

The controller includes an arithmetic unit 682, a comparator 683, an AND gate 684, an AND gate 685, an ON-delay circuit 686, and an OR gate 687.

Here, the configuration of the controller shown in FIG. 20 is different from the configuration of the controller shown in FIG. 18 with respect to an input side of the comparator 683 and is similar to the configuration of the controller shown in FIG. 18 with respect to others.

An anode of a diode 36 ($Ds_2$) and a positive (+) input terminal of the comparator 683 are connected.

Also, a diode 691 for allowing a current to flow in a direction from the anode of the diode 36 ($Ds_2$) to the comparator 683 as a forward direction may or may not be provided between the anode of the diode 36 ($Ds_2$) and the positive (+) input terminal of the comparator 683.

The arithmetic unit 682 is connected to the other end of the capacitor 37 and a cathode of the diode 36 ($Ds_2$), a voltage applied to both ends of the capacitor 37 is multiplied by K, and the voltage multiplied by K is output to a negative (−) input terminal of the comparator 683.

The example of FIG. 20 is an example in which the tertiary winding 33 (Nt) is used as a separate winding and no auxiliary winding (Nt') is used.

Also, in the examples of FIGS. 18 to 20, a configuration in which the ON-delay circuits 616, 646, and 686 are not provided may be used.

In the examples of FIGS. 18 to 20, because there is a case where the switch element 35 ($Q_{sub}$) is not turned on in the transient operation, the switch element 35 ($Q_{sub}$) is forcibly turned on by the ON-delay circuits 616, 646, and 686 after the elapse of a specified dead time ($t_{dead}$).

Although the case where the ZVS assist circuit is applied to the boost converter is shown in the examples of FIGS. 18 to 20, the ZVS assist circuit may be applied to a buck converter, a buck-boost converter, or a flyback converter.

Although the case where the DC power supply 23 is used is shown in the examples of FIGS. 18 to 20, this power supply may be a full-wave rectified voltage or a half-wave rectified voltage including a pulsating current as an example of another configuration and can also be applied to a general PFC circuit.

Example of Basic Configuration of Power Conversion Device Including Quasi-ZVS Assist Circuit A basic configuration example of a power conversion device including a quasi-ZVS assist circuit (a quasi-ZVS resonance assist circuit) will be described with reference to FIGS. 21 to 24.

Figure 21:
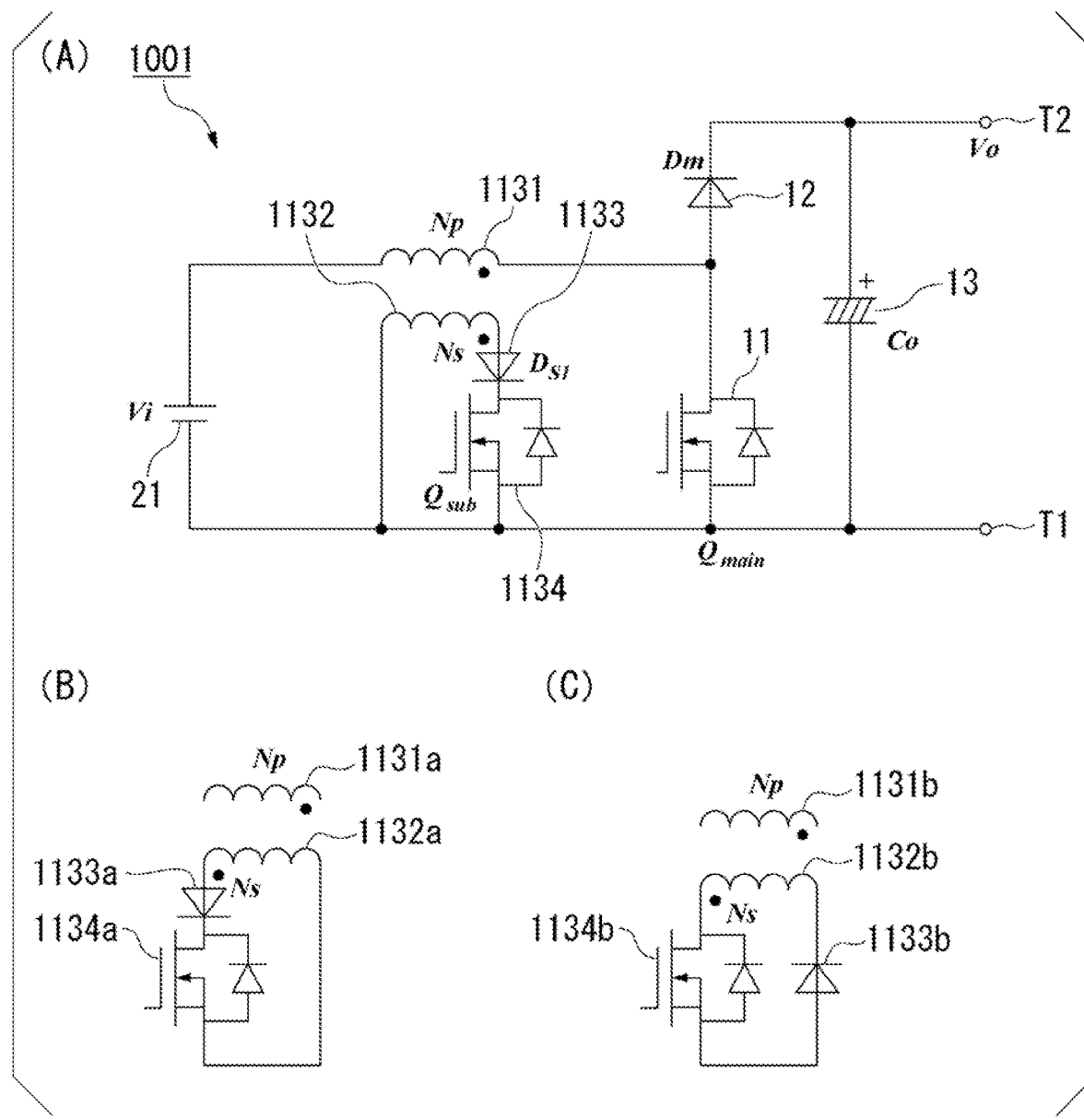
FIGS. 21(A), 21(B), and 21(C) are diagrams showing an example of a circuit configuration of a power conversion device including a quasi-ZVS assist circuit according to an embodiment.

Power Conversion Device According to Example of FIG. 21

FIG. 21(A) is a diagram showing an example of a circuit configuration of a power conversion device 1001 including a quasi-ZVS assist circuit according to an embodiment.

In FIG. 21(A), a case where the power conversion device includes a boost converter is shown.

In the example of FIG. 21(A), a control circuit is not shown.

The power conversion device 1001 includes a main circuit and a quasi-ZVS assist circuit.

The main circuit is similar to the main circuit according to the example of FIG. 1, and circuit elements of the main circuit are shown using reference signs that are the same as those of FIG. 1, except for a primary winding 1131 (Np) of a coupled inductor.

Also, in FIG. 21(A), a power supply 21 (Vi) similar to that shown in FIG. 1 is shown.

The quasi-ZVS assist circuit includes the primary winding 1131 (Np) and a secondary winding 1132 (Ns) of the coupled inductor, a diode 1133 ($Ds_1$), and a switch element 1134 ($Q_{sub}$) having a MOS type FET.

Here, a case where the primary winding 1131 (Np) of the coupled inductor is not included in the quasi-ZVS assist circuit may be considered.

A first output terminal T1, one end of the secondary winding 1132, and a source of the switch element 1134 are connected.

The other end of the secondary winding 1132 and an anode of the diode 1133 are connected.

A cathode of the diode 1133 and a drain of the switch element 1134 are connected.

Here, compared with the configuration of the ZVS assist circuit A1 shown in FIG. 1, a configuration of the quasi-ZVS assist circuit shown in FIG. 21(A) does not include a tertiary winding 33 (Nt), a diode 36 ($Ds_2$), and a capacitor 37 (Cs).

Here, in the power conversion device 1001, an input/output voltage ratio that satisfies a quasi-ZVS condition is represented by Inequality (5). In Inequality (5), Vo denotes an output voltage of a main circuit (a voltage applied between the first output terminal T1 and a second output terminal T2) and Vi denotes a voltage of a power supply 21.

$$Vo \geq 2Vi \qquad (5)$$

The quasi-ZVS assist circuit can be applied even if Vo and Vi do not satisfy a ZVS condition.

For example, if the ZVS condition is satisfied even in the case of $N_t/N_s \leq 0$, it is possible to make a configuration (a quasi-ZVS assist circuit) in which the auxiliary capacitor (Cs) and the diode ($Ds_2$) are deleted.

Although valley switching is used instead of ZVS and parasitic capacitance loss occurs when the switch element 11 ($Q_{main}$) is turned on in the quasi-ZVS assist circuit, the loss is low because a soft recovery effect and a soft switching effect are obtained.

FIG. 21(B) is an example of another configuration of the quasi-ZVS assist circuit shown in FIG. 21(A).

The quasi-ZVS assist circuit shown in FIG. 21(B) includes a primary winding 1131a (Np) and a secondary winding 1132a (Ns) of a coupled inductor, a diode 1133a ($Ds_1$), and a switch element 1134a ($Q_{sub}$) having a MOS type FET.

Here, a case where the primary winding 1131a (Np) of the coupled inductor is not included in the quasi-ZVS assist circuit may be considered.

In the quasi-ZVS assist circuit shown in FIG. 21(B) compared with of the example of FIG. 21(A), a circuit element connection method is different and the arrangement of the diode 1133a ($Ds_1$) is different.

Even if a position of the diode 1133a ($Ds_1$) changes as in the example of FIG. 21(B), it is equivalent to the example of FIG. 21(A).

FIG. 21(C) is an example of another configuration of the quasi-ZVS assist circuit shown in FIG. 21(A).

The quasi-ZVS assist circuit shown in FIG. 21(C) includes a primary winding 1131b (Np) and a secondary winding 1132b (Ns) of a coupled inductor, a diode 1133b ($Ds_1$), and a switch element 1134b ($Q_{sub}$) having a MOS type FET.

Here, a case where the primary winding 1131b (Np) of the coupled inductor is not included in the quasi-ZVS assist circuit may be considered.

In the quasi-ZVS assist circuit shown in FIG. 21(C) compared with the example of FIG. 21(A), a circuit element connection method is different and the arrangement of the diodes 1133b ($Ds_1$) is different. In the example of FIG. 21(C), a drain of the switch element 1134b is connected to one end of the secondary winding 1132b, a cathode of the diode 1133b is connected to the other end of the secondary winding 1132*b*, and a source of the switch element 1134*b* and an anode of the diode 1133*b* are connected to a first output terminal T1.

Even if a position of the diode 1133*b* ($Ds_1$) changes as in the example of FIG. 21(C), it is equivalent to the example of FIG. 21(A).

Although the case where the diode is used as a rectifying element is shown in the power conversion device 1001 according to the present embodiment, another rectifying element may be used.

For example, a switch element such as a MOS type FET may be used instead of a main diode 12 (Dm).

Figure 22:
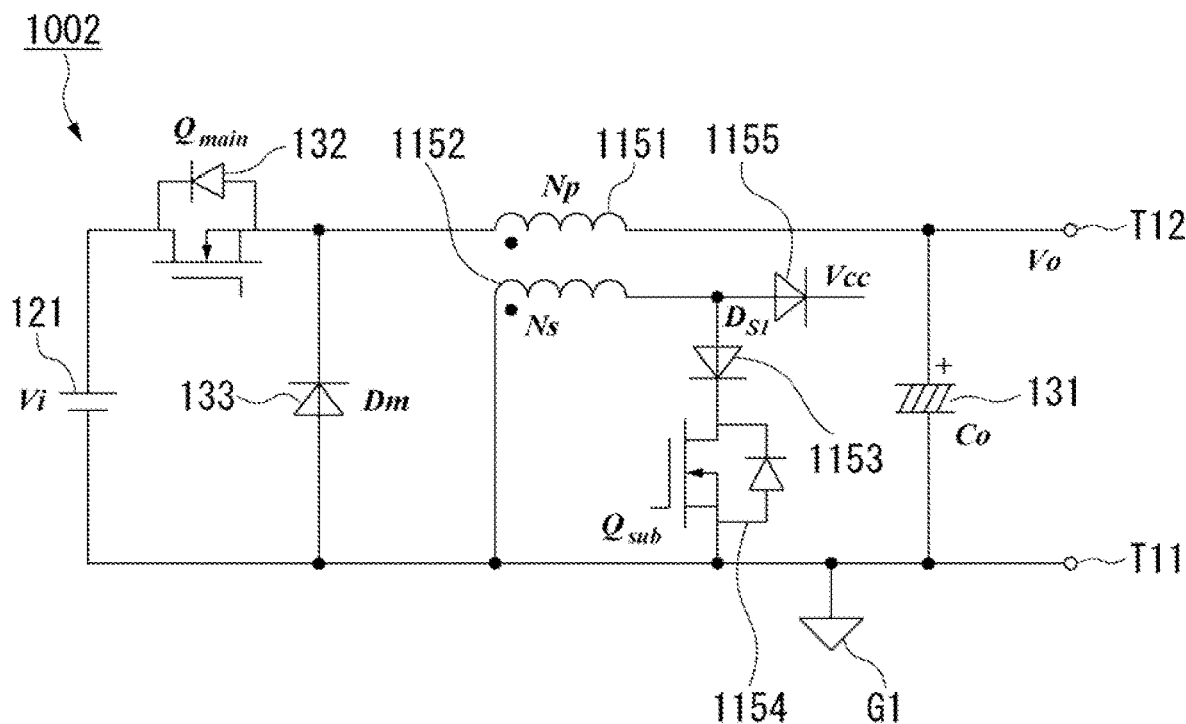
FIG. 22 is a diagram showing an example of a circuit configuration of a power conversion device including a quasi-ZVS assist circuit according to an embodiment.

Power Conversion Device According to Example of FIG. 22

FIG. 22 is a diagram showing an example of a circuit configuration of a power conversion device 1002 including a quasi-ZVS assist circuit according to an embodiment.

FIG. 22 shows a case where the power conversion device includes a buck converter.

In the example of FIG. 22, a control circuit is not shown.

The power conversion device 1002 includes a main circuit and a quasi-ZVS assist circuit.

The main circuit is similar to the main circuit according to the example of FIG. 8 and circuit elements of the main circuit are shown using reference signs that are the same as those of FIG. 8, except for a primary winding 1151 (Np) of a coupled inductor.

Also, a power supply 121 (Vi) similar to that shown in FIG. 8 is shown in FIG. 22.

Also, a ground terminal G1 is shown in FIG. 22.

The quasi-ZVS assist circuit includes the primary winding 1151 (Np) and a secondary winding 1152 (Ns) of the coupled inductor, a diode 1153 ($Ds_1$), and a switch element 1154 ($Q_{sub}$) having a MOS type FET.

Here, a case where the primary winding 1151 (Np) of the coupled inductor is not included in the quasi-ZVS assist circuit may be considered.

A first output terminal T1*l*, one end of the secondary winding 1152, and a source of the switch element 1154 are connected.

The other end of the secondary winding 1152 and an anode of the diode 1153 are connected.

A cathode of the diode 1153 and a drain of the switch element 1154 are connected.

Here, compared with the configuration of the ZVS assist circuit shown in FIG. 8, the configuration of the quasi-ZVS assist circuit shown in FIG. 22 does not include a tertiary winding 153 (Nt), a diode 156 ($Ds_2$), and a capacitor 157 (Cs).

Here, in the power conversion device 1002, an input/output voltage ratio that satisfies the quasi-ZVS condition is represented by Inequality (6). In Inequality (6), Vo denotes an output voltage of the main circuit (a voltage applied between the first output terminal T11 and a second output terminal T12) and Vi denotes a voltage of the power supply 121.

$$Vo \le 2Vi \tag{6}$$

The power conversion device 1002 further includes a diode 1155.

An anode of the diode 1155 is connected to an anode of the diode 1153.

In the power conversion device 1002 according to the example of FIG. 22, a voltage source (Vcc) can be obtained from a cathode of the diode 1155.

The voltage source (Vcc) may be used for any purpose and may be used, for example, for controlling a gate voltage of a switch element 132 or the switch element 1154.

Although the case where the diode is used as the rectifying element is shown in the power conversion device 1002 according to the present embodiment, another rectifying element may be used.

For example, a switch element such as a MOS type FET may be used instead of a main diode 133 (Dm).

Figure 23:
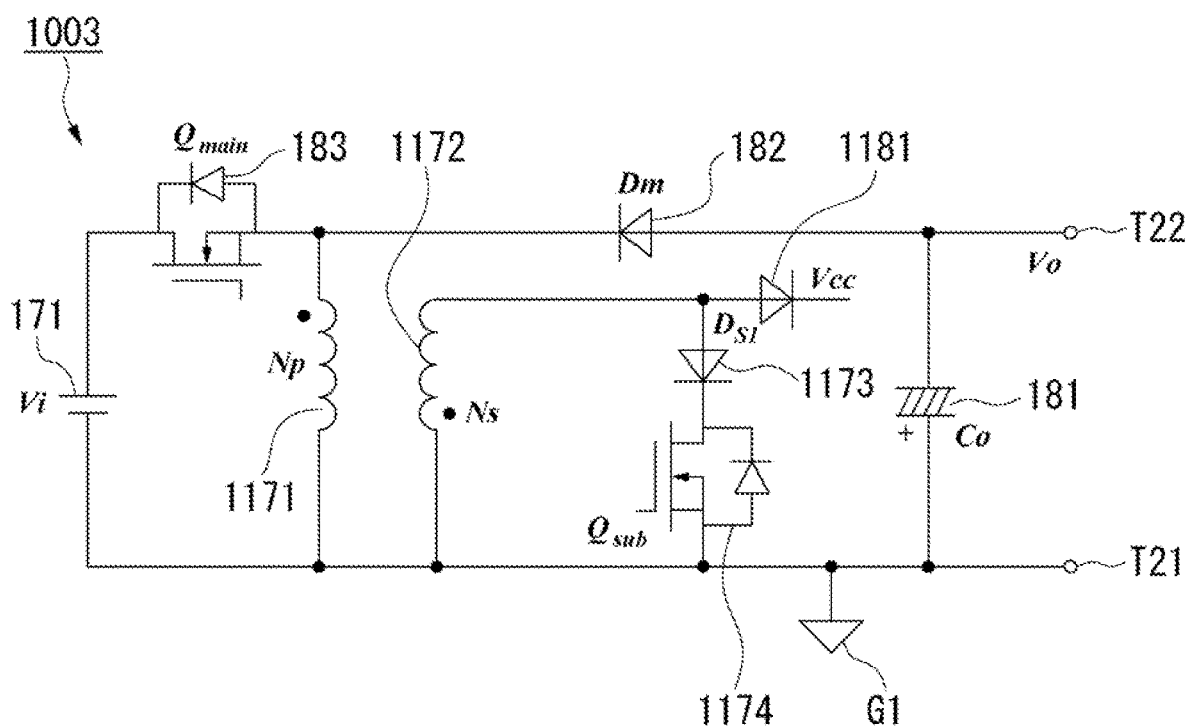
FIG. 23 is a diagram showing an example of a circuit configuration of a power conversion device including a quasi-ZVS assist circuit according to an embodiment.

Power Conversion Device According to Example of FIG. 23

FIG. 23 is a diagram showing an example of a circuit configuration of a power conversion device 1003 including a quasi-ZVS assist circuit according to an embodiment.

In FIG. 23, a case where the power conversion device includes a boost-buck converter is shown.

In the example of FIG. 23, a control circuit is not shown.

The power conversion device 1003 includes a main circuit and a quasi-ZVS assist circuit.

The main circuit is similar to the main circuit according to the example of FIG. 9 and circuit elements of the main circuit are shown using reference signs that are the same as those of the example of FIG. 9, except for a primary winding 1171 (Np) of a coupled inductor.

Also, a power supply 171 (Vi) similar to that shown in FIG. 9 is shown in FIG. 23.

Also, a ground terminal G1 is shown in FIG. 23.

The quasi-ZVS assist circuit includes the primary winding 1171 (Np) and a secondary winding 1172 (Ns) of the coupled inductor, a diode 1173 ($Ds_1$), and a switch element 1174 ($Q_{sub}$) having a MOS type FET.

Here, a case where the primary winding 1171 (Np) of the coupled inductor is not included in the quasi-ZVS assist circuit may be considered.

The arrangement of the primary winding 1171 is similar to that of the example of FIG. 9.

A first output terminal T21, one end of the secondary winding 1172, and a source of the switch element 1174 are connected.

The other end of the secondary winding 1172 and an anode of the diode 1173 are connected.

A cathode of the diode 1173 and a drain of the switch element 1174 are connected.

Here, compared with the configuration of the ZVS assist circuit shown in FIG. 9, the configuration of the quasi-ZVS assist circuit shown in FIG. 23 does not include a tertiary winding 213 (Nt), a diode 216 ($Ds_2$), and a capacitor 217 (Cs).

Here, in the power conversion device 1003, an input/output voltage ratio that satisfies the quasi-ZVS condition is represented by Inequality (7). In Inequality (7). Vo denotes an output voltage of the main circuit (a voltage applied between the first output terminal T21 and a second output terminal T22) and Vi denotes a voltage of a power supply 171.

$$VO \ge Vi \tag{7}$$

The power conversion device 1003 further includes a diode 1181.

An anode of the diode 1181 is connected to an anode of the diode 1173.

In the power conversion device 1003 according to the example of FIG. 23, a voltage source (Vcc) can be obtained from a cathode of the diode 1181.

The voltage source (Vcc) may be used for any purpose and may be used, for example, for controlling a gate voltage of a switch element 183 or the switch element 1174.

Although the case where the diode is used as the rectifying element is shown in the power conversion device 1003 according to the present embodiment, another rectifying element may be used.

For example, a switch element such as a MOS type FET may be used instead of a main diode 182 (Dm).

Figure 24:
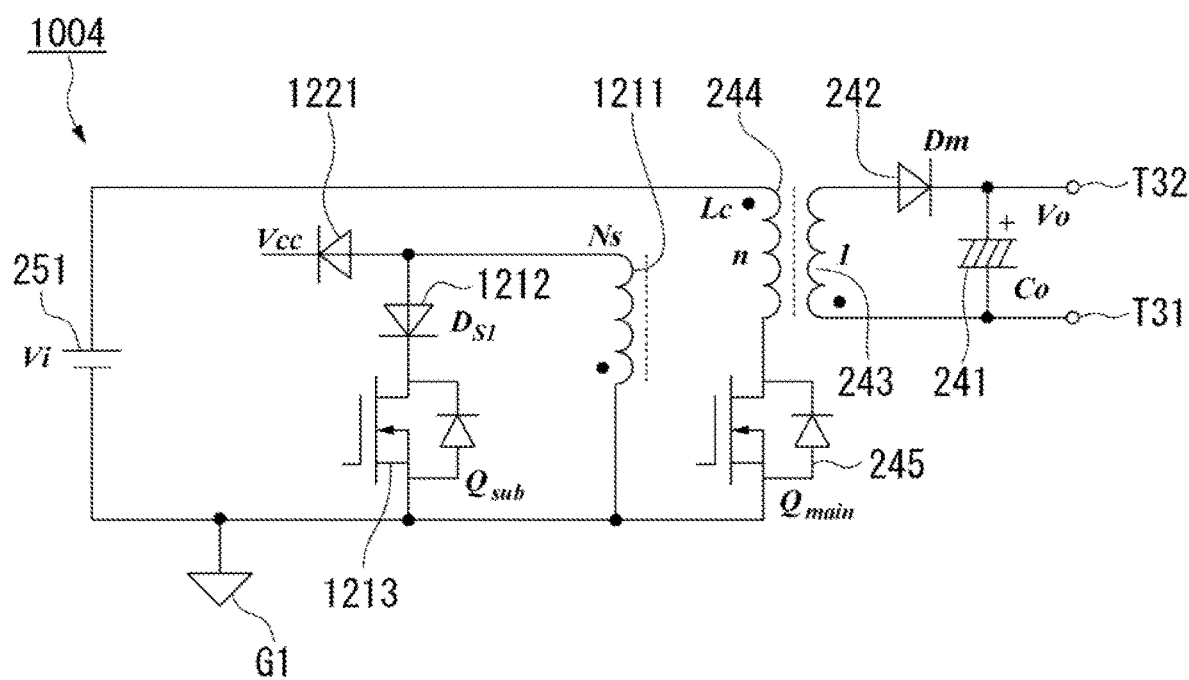
FIG. 24 is a diagram showing an example of a circuit configuration of a power conversion device including a quasi-ZVS assist circuit according to an embodiment.

Power Conversion Device According to Example of FIG. 24

FIG. 24 is a diagram showing an example of a circuit configuration of a power conversion device 1004 including a quasi-ZVS assist circuit according to an embodiment.

In FIG. 24, a case where the power conversion device includes a flyback converter is shown.

In the example of FIG. 24, a control circuit is not shown.

The power conversion device 1004 includes a main circuit and a quasi-ZVS assist circuit.

The main circuit is similar to the main circuit according to the example of FIG. 10 and circuit elements of the main circuit are shown using reference signs that are the same as those of the example of FIG. 10.

Also, a power supply 251 (Vi) similar to that shown in FIG. 10 is shown in FIG. 24.

Also, a ground terminal G1 is shown in FIG. 24.

The quasi-ZVS assist circuit includes a primary winding 244 (Np) and a secondary winding 1211 (Ns) of a coupled inductor, a diode 1212 (Ds$_1$), and a switch element 1213 (Q$_{sub}$) having a MOS type FET.

Here, a case where the primary winding 244 (Np) of the coupled inductor is not included in the quasi-ZVS assist circuit may be considered.

A source of the switch element 245 (Q$_{main}$), one end of the power supply 251, one end of the secondary winding 1211, and a source of the switch element 1213 are connected.

The other end of the secondary winding 1211 and an anode of the diode 1212 are connected.

A cathode of the diode 1212 and a drain of the switch element 1213 are connected.

Here, compared with the configuration of the ZVS assist circuit shown in FIG. 10, the configuration of the quasi-ZVS assist circuit shown in FIG. 24 does not include a tertiary winding 262 (Nt), a diode 265 (Ds$_2$), and a capacitor 266 (Cs).

Here, in the power conversion device 1004, an input/output voltage ratio that satisfies the quasi-ZVS condition is represented by Inequality (8). In Inequality (8), Vo denotes an output voltage of the main circuit (a voltage applied between a first output terminal T31 and a second output terminal T32) and Vi denotes a voltage of a power supply 251.

$$Vo \geq \frac{Vi}{n} \quad (8)$$

The power conversion device 1004 further includes a diode 1221.

An anode of the diode 1221 is connected to an anode of the diode 1212.

In the power conversion device 1004 according to the example of FIG. 24, a voltage source (Vcc) can be obtained from a cathode of the diode 1221.

The voltage source (Vcc) may be used for any purpose and may be used, for example, for controlling a gate voltage of a switch element 245 or the switch element 1213.

Although the case where the diode is used as the rectifying element is shown in the power conversion device 1004 according to the present embodiment, another rectifying element may be used.

For example, a switch element such as a MOS type FET may be used instead of a main diode 242 (Dm).

Although the case where the DC power supplies 21, 121, 171, and 251 are used is shown in the examples of FIGS. 21 to 24, the power supply may be a full-wave rectified voltage or a half-wave rectified voltage including a pulsating current as an example of another configuration and can be applied to a general PFC circuit.

Example of Operation of Power Conversion Device

An example of an operation performed in the power conversion device 1001 shown in FIG. 21 will be described with reference to FIG. 25.

The same is true for examples of operations performed in the power conversion devices 1002 to 1004 shown in FIGS. 22 to 24.

Figure 25:
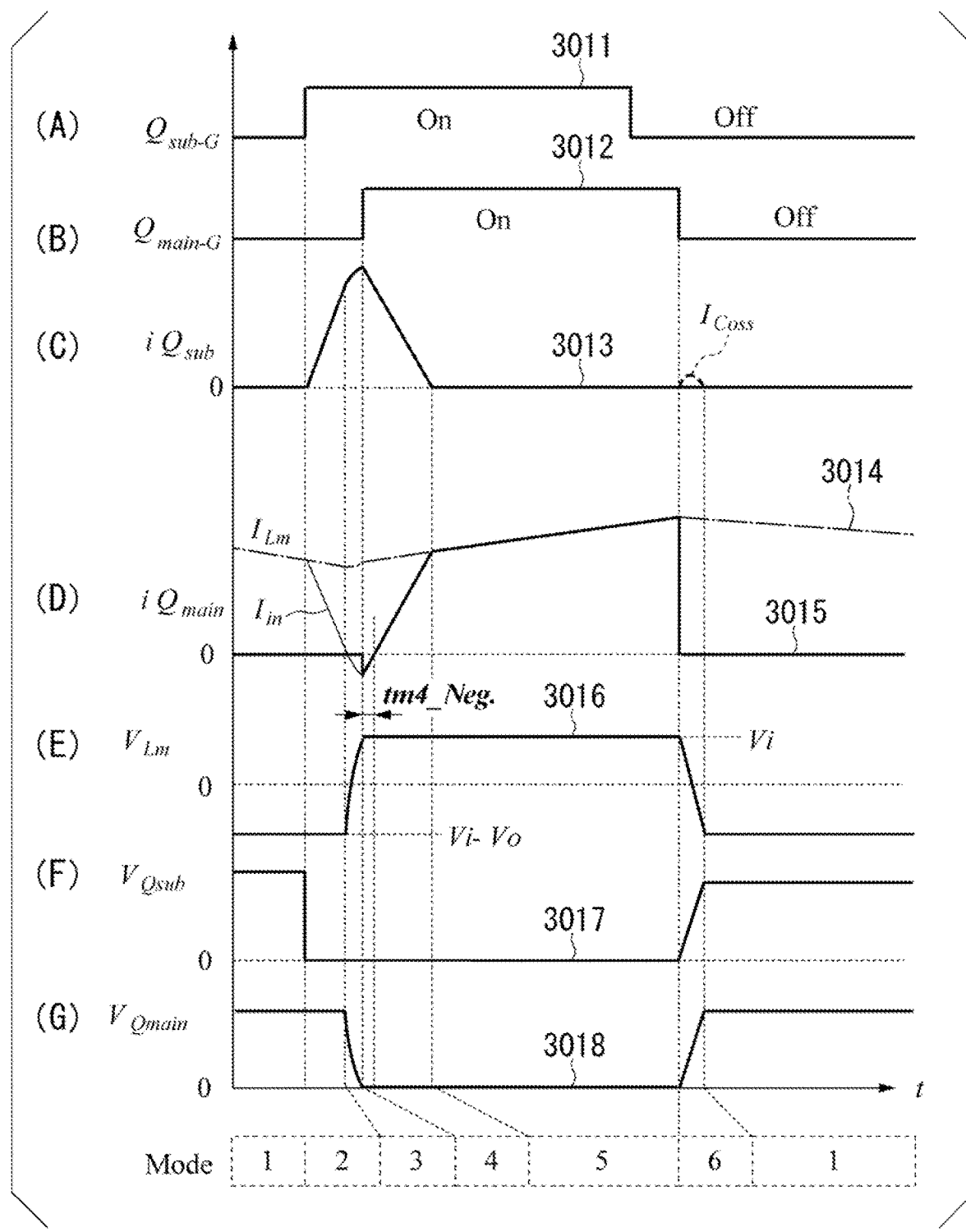
FIG. 25 is a diagram showing an example of a waveform in the power conversion device including the quasi-ZVS assist circuit according to the embodiment.

FIG. 25 is a diagram showing an example of a waveform in the power conversion device 1001 including the quasi-ZVS assist circuit according to an embodiment.

In the present embodiment, the switch element 11 (Q$_{main}$) is turned on after the switch element 1134 (Q$_{sub}$) is turned on in a control process performed by the controller. Also, in the control process, the switch element 11 (Q$_{main}$) is turned off after the switch element 1134 (Q$_{sub}$) is turned off or simultaneously when the switch element 1134 (Q$_{sub}$) is turned off.

In the graph shown in FIG. 25, the horizontal axis represents time (t), and the vertical axis represents a level of each waveform.

In FIG. 25(A), a waveform 3011 representing an ON state and an OFF state of the gate of the switch element 1134 (Q$_{sub}$) is shown.

In FIG. 25(B), a waveform 3012 representing an ON state and an OFF state of the gate of the switch element 11 (Q$_{main}$) is shown.

In FIG. 25(C), a waveform 3013 of a current flowing through the switch element 1134 (Q$_{sub}$) is shown.

In FIG. 25(D), a waveform 3014 of a current flowing through an exciting inductor L$_m$ in an equivalent circuit of the primary winding 1131 (Np) side when the secondary winding 1132 (Ns) side is changed is shown.

Also, in FIG. 25(D), a waveform 3015 of a current flowing through the switch element 11 (Q$_{main}$) is shown.

Also, in FIG. 25(D), a waveform of an input current I$_{in}$ is shown with respect to mode 2 and mode 3.

In FIG. 25(E), a waveform 3016 of a voltage applied to the exciting inductor L$_m$ in an equivalent circuit of the primary winding 1131 (Np) side when the secondary winding 1132 (Ns) side is changed is shown.

In FIG. 25(F), a waveform 3017 of the voltage applied to the switch element 1134 (Q$_{sub}$) is shown.

In FIG. 25(G), a waveform 3018 of the voltage applied to the switch element 11 (Q$_{main}$) is shown.

The power conversion device 1001 sequentially transitions from the state of mode 1 to the state of mode 6 according to a flow of time and returns to the state of mode 1 again after the state of mode 6.

As described above, in the power conversion devices 1001 to 1004 according to the present embodiment, the number of parts can be further reduced when a ZVS condition is satisfied even if $N_r/N_s \leq 0$ according to the quasi-ZVS assist circuit.

In the power conversion devices 1001 to 1004 according to the present embodiment, it is possible to increase a degree of freedom in device selection of the quasi-ZVS assist circuit, shorten a reset period of a resonance current in the quasi-ZVS assist circuit, and reduce the turn-off loss of the main switch.

Also, in the quasi-ZVS assist circuit, an operation in which a charging current of the auxiliary capacitor (Cs) in mode 5 does not occur is performed.

The quasi-ZVS assist circuit according to the present embodiment can be applied to, for example, a boost converter, a buck converter, a boost-buck converter, or a flyback converter connected to smooth, step-up, or step-down a voltage associated with the primary winding (Np) of the coupled inductor.

Example of Configuration of Power Conversion Device Including AC Converter Having Quasi-ZVS Assist Circuit An example of a configuration of a power conversion device including an AC converter having a quasi-ZVS assist circuit will be described with reference to FIGS. 26 and 27.

Figure 26:
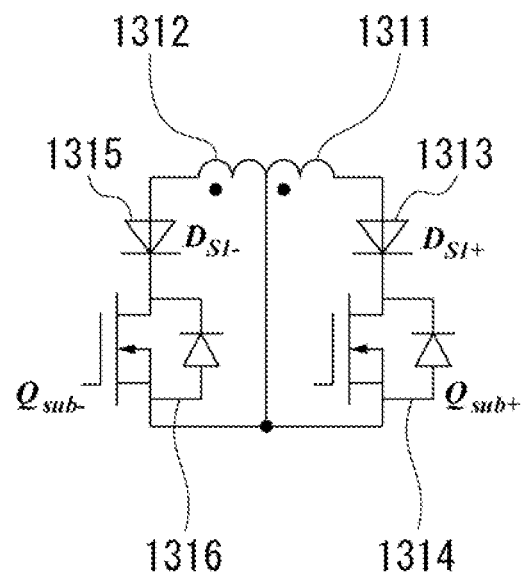
FIG. 26 is a diagram showing an example of a circuit configuration of a power conversion device including an AC converter having a quasi-ZVS assist circuit according to an embodiment.
Figure 27:
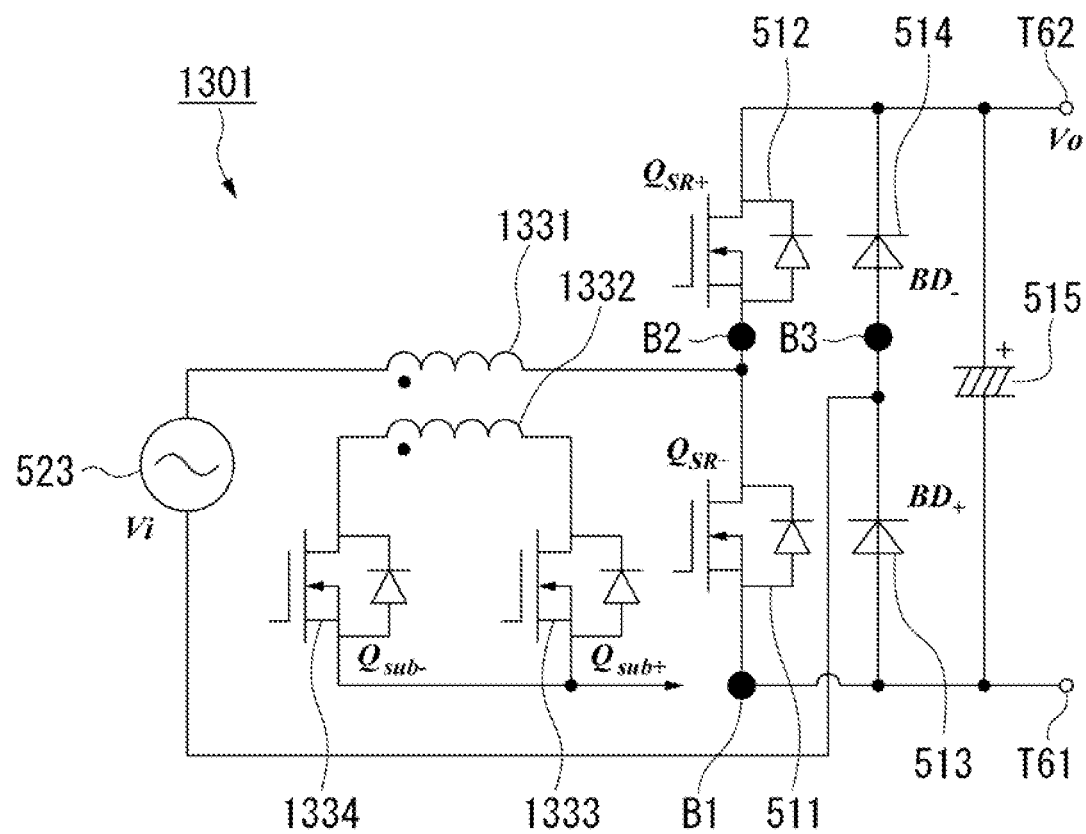
FIG. 27 is a diagram showing an example of a circuit configuration of a power conversion device including an AC converter having a quasi-ZVS assist circuit according to an embodiment.

In FIGS. 26 and 27, a case where the power conversion device includes a boost converter is shown.

Quasi-ZVS Assist Circuit of Power Conversion Device According to Example of FIG. 26

FIG. 26 is a diagram showing an example of a circuit configuration of a quasi-ZVS assist circuit according to an embodiment.

In the example of FIG. 26, a main circuit and a control circuit are not shown.

Here, the main circuit is similar to the main circuit shown in FIG. 14.

The quasi-ZVS assist circuit includes a primary winding 541 (Np), a secondary winding 1311 (Ns+), and a secondary winding 1312 (Ns−) of a coupled inductor, a diode 1313 ($Ds_{1+}$), a switch element 1314 ($Q_{sub+}$) having a MOS type FET, a diode 1315 ($Ds_{1-}$), and a switch element 1316 ($Q_{sub-}$) having a MOS type FET.

Here, a case where the primary winding 541 (Np) of the coupled inductor is not included in the quasi-ZVS assist circuit may be considered.

In the example of FIG. 26, the primary winding 541 (Np) is not shown.

One end of the secondary winding 1312 and an anode of the diode 1315 are connected.

A cathode of the diode 1315 and a drain of the switch element 1316 are connected.

The other end of the secondary winding 1312, one end of the secondary winding 1311, a source of the switch element 1316, and a source of the switch element 1314 are connected.

The other end of the secondary winding 1311 and an anode of the diode 1313 are connected.

A cathode of the diode 1313 and a drain of the switch element 1314 are connected.

Power Conversion Device According to Example of FIG. 27

FIG. 27 is a diagram showing an example of a circuit configuration of a power conversion device 1301 including a quasi-ZVS assist circuit according to an embodiment.

In the example of FIG. 27, a control circuit is not shown.

The power conversion device 1301 includes a main circuit and a quasi-ZVS assist circuit.

The main circuit is similar to the main circuit according to the example of FIG. 14 and circuit elements of the main circuit are shown using reference signs that are the same as those of the example of FIG. 14, except for a primary winding 1331 (Np) of a coupled inductor.

Also, a power supply 523 similar to that shown in FIG. 14 is shown in FIG. 27.

The quasi-ZVS assist circuit includes the primary winding 1331 (Np) and a secondary winding 1332 (Ns) of the coupled inductor, a switch element 1333 ($Q_{sub+}$) having a MOS type FET, and a switch element 1334 ($Q_{sub-}$) having a MOS type FET.

Here, a case where the primary winding 1331 (Np) of the coupled inductor is not included in the quasi-ZVS assist circuit may be considered.

The arrangement of the primary winding 1331 is similar to the arrangement of the primary winding 541 shown in FIG. 14.

One end of the secondary winding 1332 and a drain of the switch element 1334 are connected.

The other end of the secondary winding 1332 and a drain of the switch element 1333 are connected.

A source of the switch element 1333 and a source of the switch element 1334 are connected.

In the example of FIG. 27, a case where the switch element 1333 ($Q_{sub+}$) includes a MOSFET having no reverse blocking function and there is a rectifying element ($Ds_{1-}$) connected in parallel to the switching unit can be considered.

Likewise, in the example of FIG. 27, a case where the switch element 1334 ($Q_{sub-}$) includes a MOSFET having no reverse blocking function and there is a rectifying element ($Ds_{1+}$) connected in parallel to the switching unit can be considered.

As an example of another configuration, other components may be used as one or both components of the rectifying element ($Ds_{1-}$) and the rectifying element ($Ds_{1+}$).

Here, the potential of the source of the switch element ($Q_{sub+}$ or $Q_{sub-}$) in the quasi-assist circuit may be connected to a potential of any location.

Generally, in the example of FIG. 27, a potential of a first output terminal T61 (a potential of a point B1 in FIG. 27), a potential of a drain of a switch element 511 and a source of a switch element 512 (a potential of a point B2 in FIG. 27), or a potential of a cathode of a half-wave rectifier diode 513 and an anode of a half-wave rectifier diode 514 (a potential of a point B3 in FIG. 27) is used as the potential.

Also, the points B1, B2, and B3 in FIG. 27 are shown for the convenience of description and do not limit the circuit configuration of the power conversion device 1301.

Although the case where the quasi-ZVS assist circuit is applied to the boost converter is shown in the examples of FIGS. 26 and 27, the quasi-ZVS assist circuit may be applied to a buck converter, a buck-boost converter, or a flyback converter.

Example of Operation of Quasi-ZVS Assist Circuit Based on Current Suction of Synchronous Rectification An example of an operation of the quasi-ZVS assist circuit according to the example of FIG. 27 will be described with reference to FIGS. 28 to 29.

Here, a ZVS assist operation (an SR-ZVS assist operation) based on the suction of a synchronous current in a half-bridge configuration such as a totem-pole PFC circuit will be described.

Figure 28:
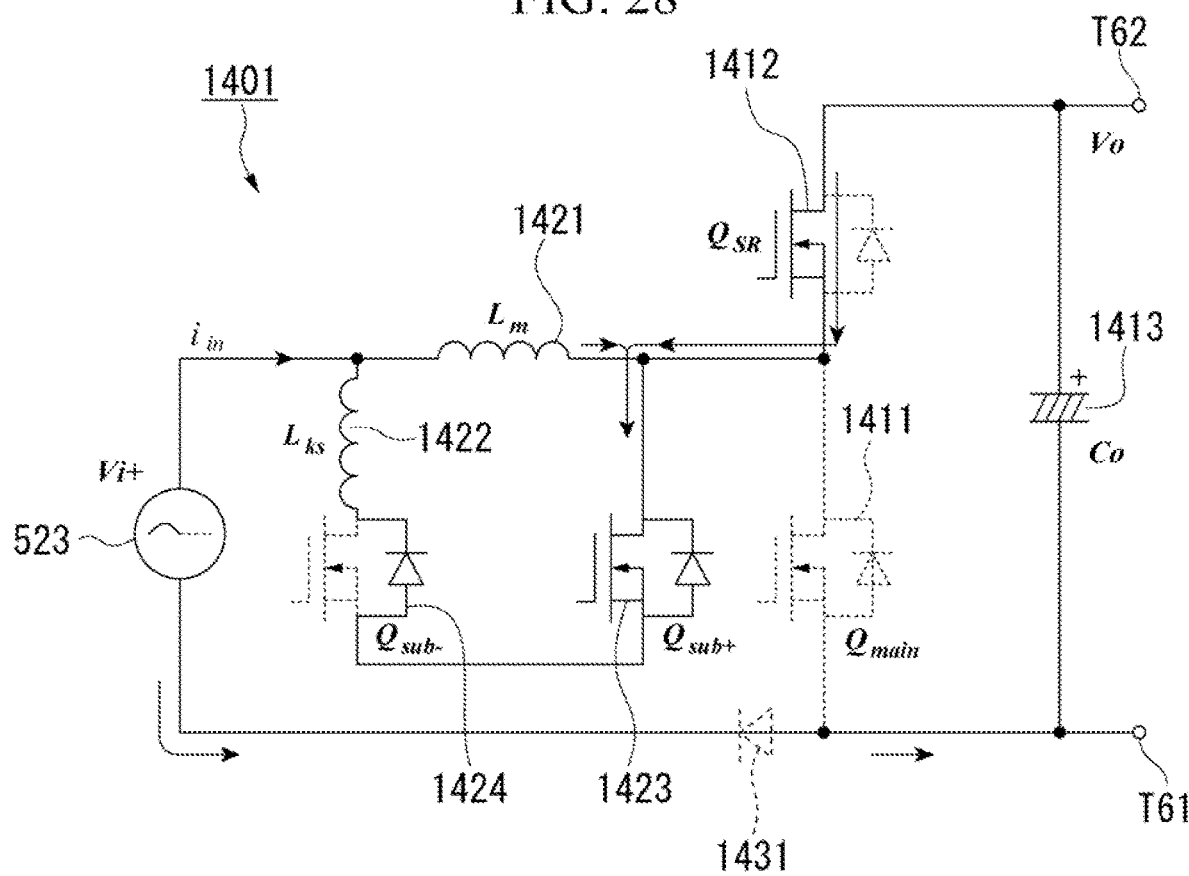
FIG. 28 is a diagram showing an example of an equivalent circuit of a circuit configuration of a power conversion device including an AC converter having a quasi-ZVS assist circuit according to an embodiment.

Equivalent Circuit According to Example of FIG. 28

FIG. 28 is a diagram showing an example of an equivalent circuit 1401 having a circuit configuration of a power conversion device 1301 including an AC converter having a quasi-ZVS assist circuit according to an embodiment.

The equivalent circuit 1401 is an equivalent circuit in the case of Vi>0.

In the equivalent circuit 1401, a first output terminal T61, a second output terminal T62, and a power supply 523 are shown and a switch element 1411 ($Q_{main}$) having a MOS type FET, a switch element 1412 ($Q_{SR}$) having a MOS type FET, an exciting inductor 1421 ($L_m$), an inductor 1422 ($L_{ks}$), a switch element 1423 ($Q_{sub+}$) having a MOS type FET, and a switch element 1424 ($Q_{sub-}$) having a MOS type FET are shown.

Also, in mode S, a half-wave rectifier diode 1431 for allowing a current to flow in a direction from the first output terminal T61 to a power supply 523 as a forward direction may or may not be provided.

Also, when the half-wave rectifier diode 1431 is turned off by a reverse current and the present resonance operation is interfered with in a totem-pole PFC circuit, a process of interfering with the resonance operation can be prevented by connecting a capacitance component in parallel to the half-wave rectifier diode 1431 (corresponding to the half-wave rectifier diodes 513 and 514 in the examples of FIG. 27). Alternatively, it is possible to prevent a process of interfering with the resonance operation even if the half-wave rectifier diodes 513 and 514 in the example of FIG. 27 are replaced with switch elements such as FETs so that a reverse current is allowed to flow through the half-wave rectifier diode 1431 (corresponding to the half-wave rectifier diodes 513 and 514 in the example of FIG. 27).

In FIG. 28, a flow of a current in a prescribed mode (referred to as mode S For the convenience of description) is shown.

In the example of FIG. 28, a control process is performed so that the switch element 1412 ($Q_{SR}$) responsible for a reflux operation of an exciting current of a primary winding (Np) performs a pair of ON/OFF operations (a synchronous rectification operation) for which a short-circuit prevention period associated with the switch element 1411 ($Q_{main}$) is set.

An example of an operation performed in the power conversion device 1301 (the equivalent circuit 1401) shown in FIG. 28 will be described with reference to FIG. 29.

Figure 29:
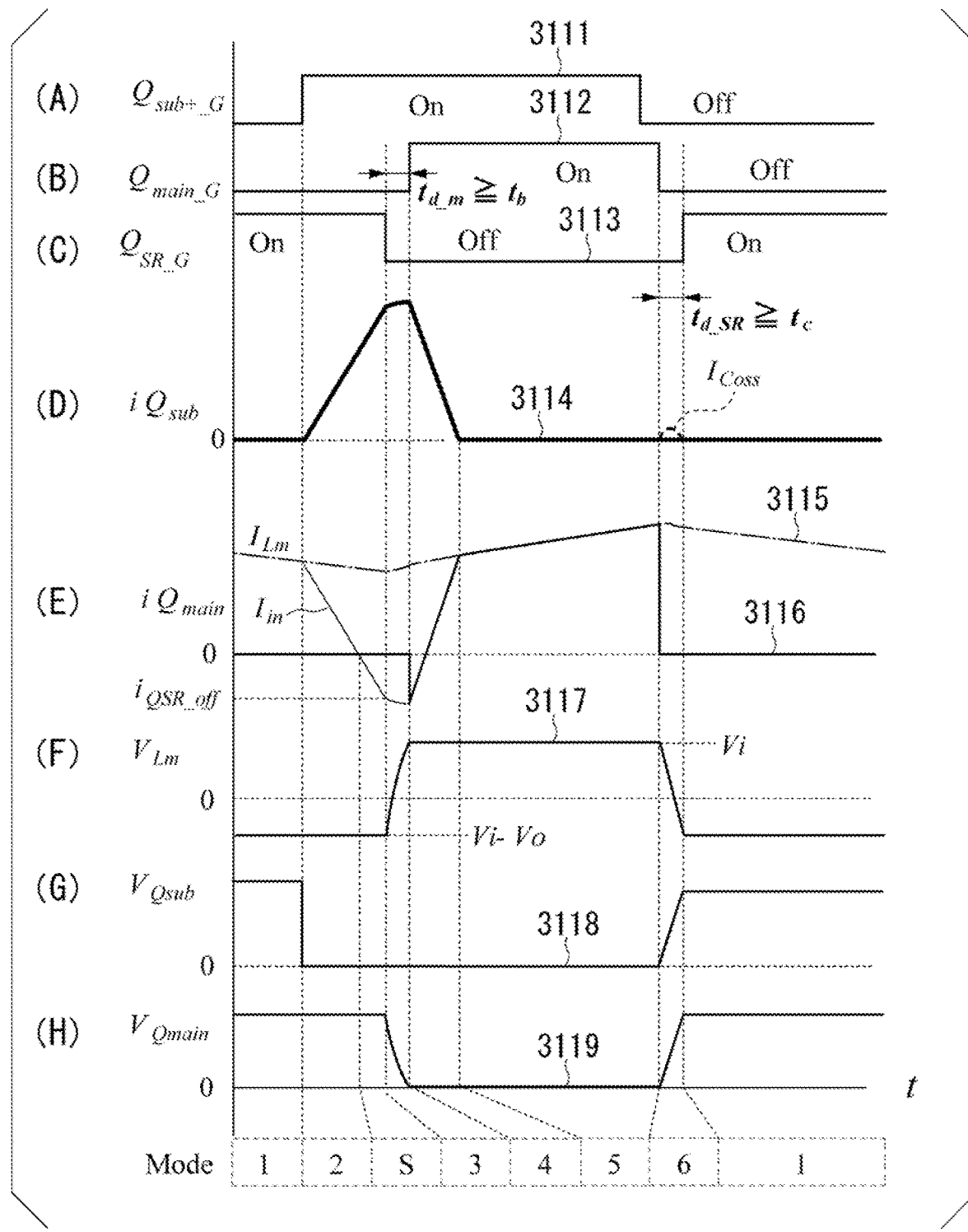
FIG. 29 is a diagram showing an example of a waveform in the power conversion device including the AC converter having the quasi-ZVS assist circuit according to an embodiment.

FIG. 29 is a diagram showing an example of a waveform in the power conversion device 1301 (the equivalent circuit 1401) including the AC converter having the quasi-ZVS assist circuit according to the embodiment.

In the present embodiment, the switch element 1411 ($Q_{main}$) is turned on after the switch element 1423 ($Q_{sub+}$) is turned on in a control process performed by a controller. Also, in the control process, the switch element 1411 ($Q_{main}$) is turned off after the switch element 1423 ($Q_{sub+}$) is turned off or simultaneously when the switch element 1423 ($Q_{sub+}$) is turned off.

In the graph shown in FIG. 29, the horizontal axis represents time (t) and the vertical axis represents a level of each waveform.

In FIG. 29(A), a waveform 3111 representing an ON state and an OFF state of a gate of the switch element 1423 ($Q_{sub+}$) is shown.

In FIG. 29(B), a waveform 3112 representing an ON state and an OFF state of a gate of the switch element 1411 ($Q_{main}$) is shown.

In FIG. 29(C), a waveform 3113 representing an ON state and an OFF state of a gate of the switch element 1412 ($Q_{SR}$) is shown.

In FIG. 29(D), a waveform 3114 of a current flowing through the switch element 1423 ($Q_{sub+}$) is shown.

In FIG. 29(E), a waveform 3115 of a current flowing through the exciting inductor 1421 ($L_m$) is shown.

Also, in FIG. 29(E), a waveform 3116 of a current flowing through the switch element 1411 ($Q_{main}$) is shown.

Also, in FIG. 29(E), a waveform of an input current $I_{in}$ is shown with respect to mode 2, mode S, and mode 3.

In FIG. 29(F), a waveform 3117 of a voltage applied to the exciting inductor 1421 ($L_m$) is shown.

In FIG. 29(G), a waveform 3118 of a voltage applied to the switch element 1423 ($Q_{sub+}$) is shown.

In FIG. 29(H), a waveform 3119 of a voltage applied to the switch element 1411 ($Q_{main}$) is shown.

The power conversion device 1301 (the equivalent circuit 1401) sequentially transitions from the state of mode 1 to the state of mode 2, the state of mode S, and the states of modes 3 to 6 state according to a flow of time and returns to the state of mode 1 again after the state of mode 6.

In the example of FIG. 29, when the current of the switch element 1412 ($Q_{SR}$) reaches any negative current value after the switch element 1423 ($Q_{sub+}$) is turned on, the mode becomes mode 3 if the switch element 1412 ($Q_{SR}$) is turned off. In the state of mode 3, after the elapse of a transition time $t_b$ when a voltage ($V_{Qmain}$) applied to the switch element 1411 ($Q_{main}$) transitions to a zero voltage, the turn-on of the switch element 1411 ($Q_{main}$) becomes the turn-on of ZVS and the mode transitions to mode 4. Subsequently, when the switch element 1411 ($Q_{main}$) is turned off in mode 6, after the elapse of a period $t_c$ for which a charging/discharging process associated with the capacitance component parallel to the switch is performed, the switch element 1412 ($Q_{SR}$) performs a reflux operation and the mode transitions to mode 1. When the switch element 1412 ($Q_{SR}$) is turned on in the state of mode 1, it is possible to reduce the conduction loss in synchronous rectification.

In the power conversion device 1301 (the equivalent circuit 1401), a ZVS operation is possible in a range of the total input voltage Vi including Vi>Vo/2.

In the power conversion device 1301 (the equivalent circuit 1401), even if Vi>Vo/2, valley switching is performed and a soft recovery operation can be obtained.

The PFC circuit loss when the input voltage (Vi) is high as in Vi>Vo/2 is less than that when the input voltage (Vi) is low. Also, a switching frequency does not increase when the input voltage (Vi) is high as in a critical conduction mode (CRM)-PFC.

Also, in the example of FIG. 27, each of the half-wave rectifier diode 513 and the half-wave rectifier diode 514 of the main circuit may be replaced with a switch element such as a MOS type FET, and, in this case, a bidirectional converter is implemented.

Although the case where the quasi-ZVS assist circuit is applied to the boost converter is shown in the examples of FIGS. 28 and 29, the quasi-ZVS assist circuit may be applied to a buck converter, a buck-boost converter, or a flyback converter.

Figure 30:
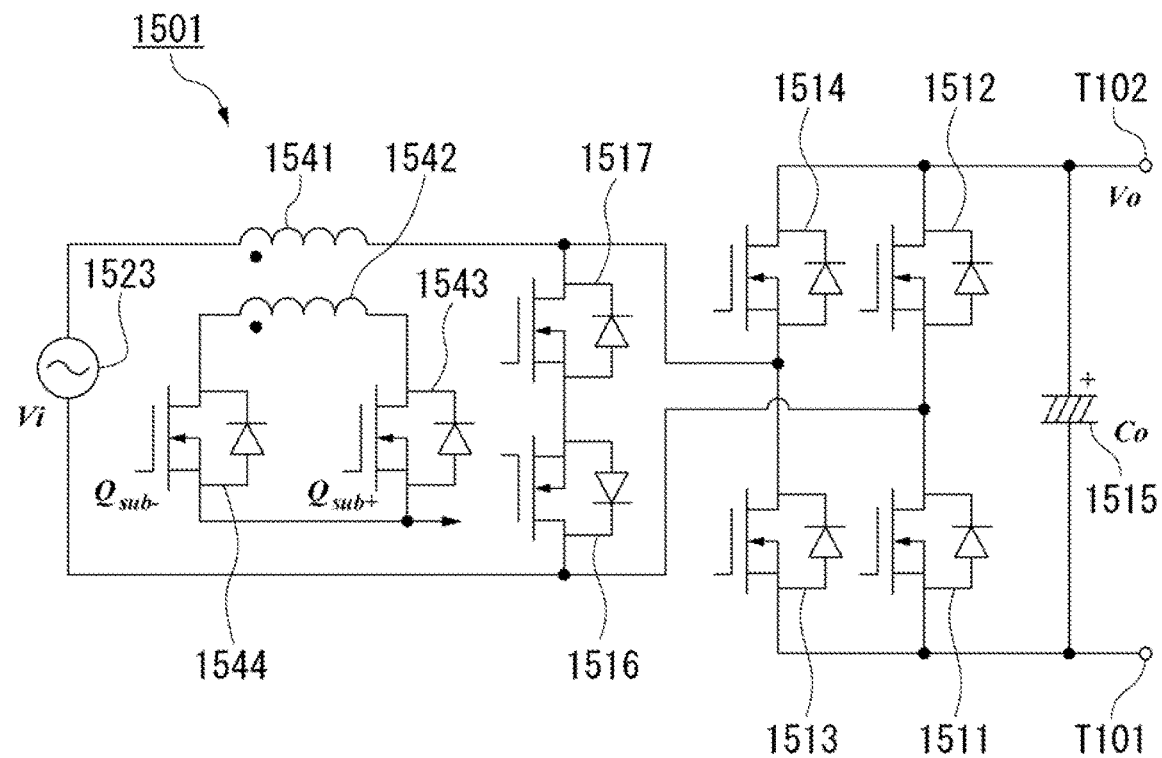
FIG. 30 is a diagram showing an example of a circuit configuration of a power conversion device including an AC converter having a quasi-ZVS assist circuit according to an embodiment.

Power Conversion Device According to Example of FIG. 30

FIG. 30 is a diagram showing an example of a circuit configuration of a power conversion device 1501 including a quasi-ZVS assist circuit according to an embodiment.

The example of FIG. 30 is an example when the quasi-ZVS assist circuit is applied to a bridgeless PFC circuit of an AC switch.

In the example of FIG. 30, a control circuit is not shown.

The power conversion device 1501 includes a main circuit and a quasi-ZVS assist circuit.

The main circuit includes four switch elements 1511 to 1514 having MOS type FETs, a capacitor 1515 (Co), which is an output capacitor, two switch elements 1516 and 1517 having MOS type FETs, and a primary winding 1541 (Np) of a coupled inductor.

Also, in FIG. 30, an AC power supply 1523 is shown. Here, the power supply 1523 may be, for example, a commercial AC power supply.

For the convenience of description, in the power conversion device 1501, two output terminals on a side to which a load (not shown) is connected will be referred to as a first output terminal T101 and a second output terminal T102. In the example of FIG. 30, the first output terminal T101 is on a ground (GND) side and the second output terminal T102 is on a positive (+) side.

The first output terminal T101, a source of the switch element 1511, a source of the switch element 1513, and one end of the capacitor 1515 are connected.

The second output terminal T102, a drain of the switch element 1512, a drain of the switch element 1514, and the other end of the capacitor 1515 are connected.

A drain of the switch element 1511, a source of the switch element 1512, a drain of the switch element 1516, and one end of the power supply 1523 are connected.

The other end of the power supply 1523 and one end of the primary winding 1541 are connected.

The other end of the primary winding 1541, a drain of the switch element 1513, a source of the switch element 1514, and a drain of the switch element 1517 are connected.

A source of the switch element 1516 and a source of the switch element 1517 are connected.

The quasi-ZVS assist circuit includes a primary winding 1541 (Np) and a secondary winding 1542 (Ns) of a coupled inductor, a switch element 1543 ($Q_{sub+}$) having a MOS type FET, and a switch element 1544 ($Q_{sub-}$) having a MOS type FET.

Here, a case where the primary winding 1541 (Np) of the coupled inductor is not included in the quasi-ZVS assist circuit may be considered.

The configuration of the quasi-ZVS assist circuit is similar to that of the example of FIG. 27.

Also, in the example of FIG. 30, the potential of the switch element ($Q_{sub+}$ or $Q_{sub-}$) of the quasi-ZVS assist circuit may be connected to any potential as in the example of FIG. 27.

Generally, in the example of FIG. 30, one of the source potentials of the FETs of a power circuit is used as the potential.

Figure 31:
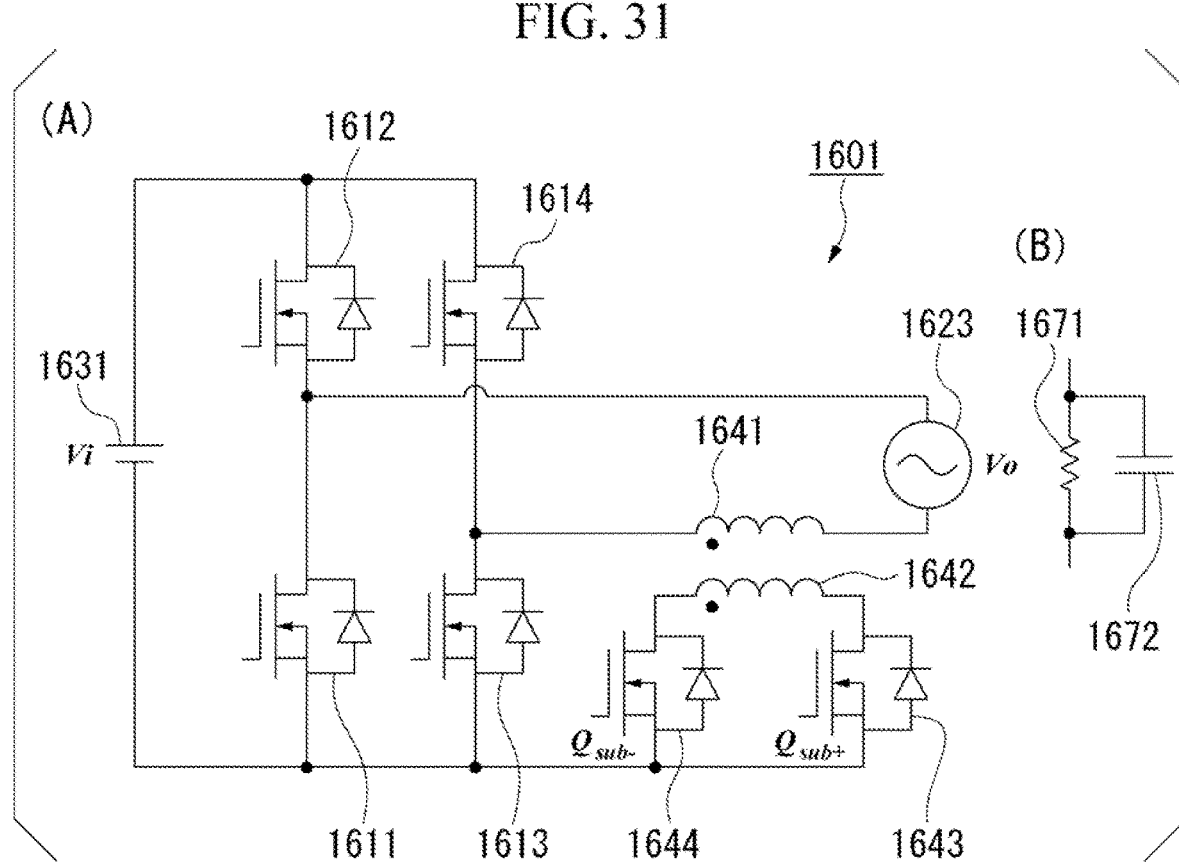
FIGS. 31(A) and 31(B) are diagrams showing an example of a circuit configuration of a power conversion device including a quasi-ZVS assist circuit according to an embodiment.

Power Conversion Device According to Example of FIG. 31

FIG. 31(A) is a diagram showing an example of a circuit configuration of a power conversion device 1601 including a quasi-ZVS assist circuit according to the embodiment.

The example of FIG. 31(A) is an example when the quasi-ZVS assist circuit is applied to an inverter.

In the example of FIG. 31(A), a control circuit is not shown.

The power conversion device 1601 includes a main circuit and a quasi-ZVS assist circuit.

The main circuit includes four switch elements 1611 to 1614 having MOS type FETs and a primary winding 1641 (Np) of a coupled inductor.

Also, in FIG. 31(A), a DC power supply 1631 and an AC power supply 1623 are shown.

A drain of the switch element 1613, a source of the switch element 1614, and one end of the primary winding 1641 are connected.

The other end of the primary winding 1641 and one end of the power supply 1623 are connected.

A drain of the switch element 1611, a source of the switch element 1612, and the other end of the power supply 1623 are connected.

A source of the switch element 1613, a source of the switch element 1611, and one end of the power supply 1631 are connected.

A drain of the switch element 1614, a drain of the switch element 1612, and the other end of the power supply 1631 are connected.

The quasi-ZVS assist circuit includes the primary winding 1641 (Np) and a secondary winding 1642 (Ns) of a coupled inductor, a switch element 1643 ($Q_{sub+}$) having a MOS type FET, and a switch element 1644 ($Q_{sub-}$) having a MOS type FET.

Here, a case where the primary winding 1641 (Np) of the coupled inductor is not included in the quasi-ZVS assist circuit may be considered.

A configuration of the quasi-ZVS assist circuit is similar to that of the example of FIG. 27.

In the example of FIG. 31(A), a source of the switch element 1643 and a source of the switch element 1644 are connected to the source of the switch element 1613 and the source of the switch element 1611 (and one end of the power supply 1631) with respect to the potentials of the switch elements ($Q_{sub+}$ and $Q_{sub-}$) of the quasi-ZVS assist circuit.

Here, the power supply 1623 may be replaced with a load circuit unit shown in FIG. 31(B).

The circuit unit shown in FIG. 31(B) is a parallel circuit of a resistor 1671 and a capacitor 1672.

Figure 32:
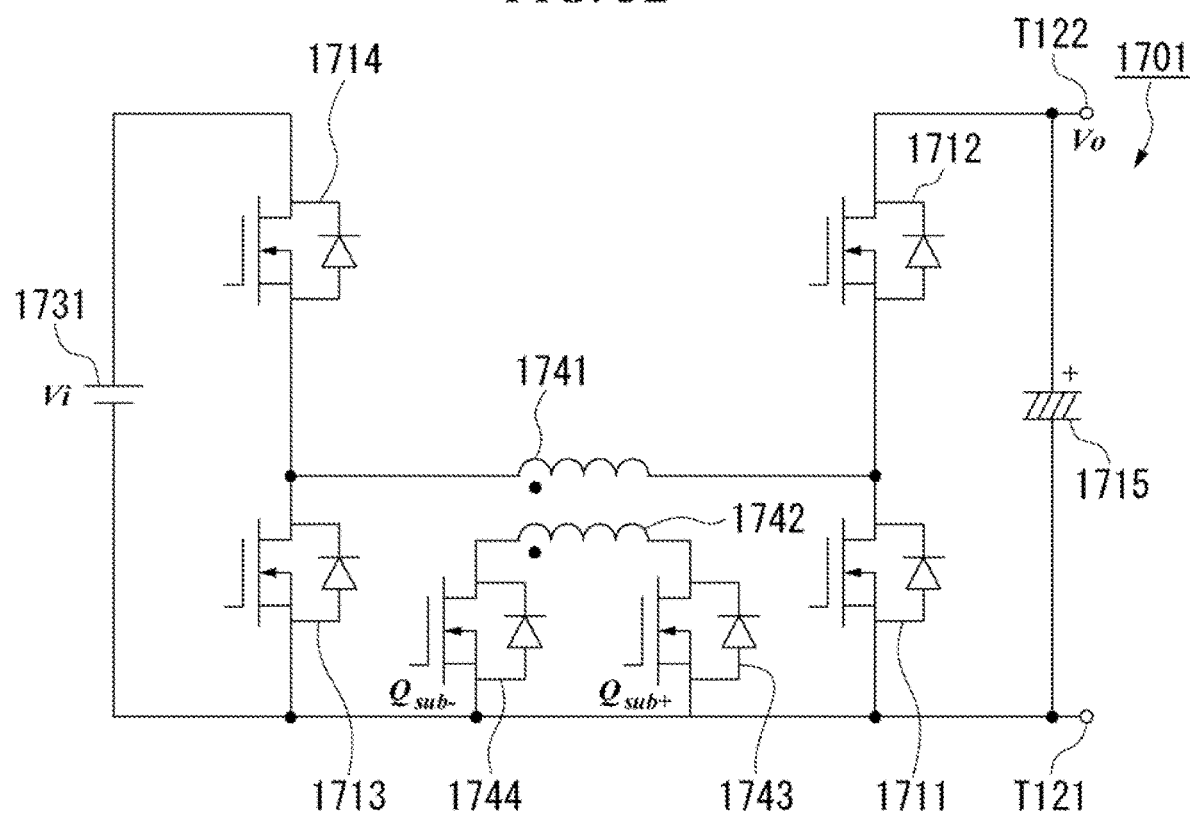
FIG. 32 is a diagram showing an example of a circuit configuration of a power conversion device including a quasi-ZVS assist circuit according to an embodiment.

Power Conversion Device According to Example of FIG. 32

FIG. 32 is a diagram showing an example of a circuit configuration of a power conversion device 1701 including a quasi-ZVS assist circuit according to an embodiment.

The example of FIG. 32 is an example when the quasi-ZVS assist circuit is applied to an H-bridge boost-buck converter.

In the example of FIG. 31, a control circuit is not shown.

The power conversion device 1701 includes a main circuit and a quasi-ZVS assist circuit.

The main circuit includes four switch elements 1711 to 1714 having MOS type FETs, a capacitor 1715 (Co), which is an output capacitor, and a primary winding 1741 (Np) of a coupled inductor.

Also, a DC power supply 1731 is shown in FIG. 31.

For the convenience of description, in the power conversion device 1701, two output terminals on a side to which a load (not shown) is connected will be referred to as a first output terminal T121 and a second output terminal T122. In the example of FIG. 32, the first output terminal T121 is on a ground (GND) side and the second output terminal T122 is on a positive (+) side.

The first output terminal T121, a source of the switch element 1711, a source of the switch element 1713, one end of the capacitor 1715, and one end of the power supply 1731 are connected.

The second output terminal T122, a drain of the switch element 1712, and the other end of the capacitor 1715 are connected.

The other end of the power supply 1731 and a drain of the switch element 1714 are connected.

A drain of the switch element 1713, a source of the switch element 1714, and one end of the primary winding 1741 are connected.

The other end of the primary winding 1741, a drain of the switch element 1711, and a source of the switch element 1712 are connected.

The quasi-ZVS assist circuit includes the primary winding 1741 (Np) and a secondary winding 1742 (Ns) of a coupled inductor, a switch element 1743 ($Q_{sub+}$) having a MOS type FET, and a switch element 1744 ($Q_{sub-}$) having a MOS type FET.

Here, a case where the primary winding 1741 (Np) of the coupled inductor is not included in the quasi-ZVS assist circuit may be considered.

Also, a configuration of the quasi-ZVS assist circuit is similar to that of the example of FIG. 27.

In the example of FIG. 32, a source of the switch element 1743 and a source of the switch element 1744 are connected to a source of the switch element 1711 and a source of the switch element 1713 (and the first output terminal T121 and one end of the power supply 1731) with respect to the potentials of the switch element ($Q_{sub+}$ and $Q_{sub-}$) of the quasi-ZVS assist circuit.

Example of Configuration of Controller (Drive Circuit) of Quasi-ZVS Assist Circuit An example of a configuration of a controller (a drive circuit) of a quasi-ZVS assist circuit is similar to the examples of the configurations of the controllers (the drive circuits) shown in FIGS. 18 to 20, but is different from the examples of the configurations of the controllers (the drive circuits) shown in FIGS. 18 to 20 in that no auxiliary capacitor (Cs) is used in the quasi-ZVS assist circuit.

In the example of FIG. 18, a case where an input terminal of the arithmetic unit 612 is short-circuited because the tertiary winding 52, the diode 53, and the capacitor 37 are not provided in the case of the application to the quasi-ZVS assist circuit is considered. In this case, the potential of a negative (−) input terminal of the comparator 613 becomes 0 [V] and an ON/OFF timing of the main switch element ($Q_{main}$) is controlled on the basis of a comparison result of the comparator 613.

The potential at the negative (−) input terminal of the comparator 613 does not necessarily have to be 0 [V]. For example, a configuration in which an offset voltage having a noise margin at 0 [V] is applied to the negative (−) input terminal of the comparator 613 may be used.

Here, the offset voltage may be set in consideration of the input voltage range of the comparator 613, and for example, an offset voltage of about 0 [V] to 1 [V] may be set.

Hereinafter, configuration examples of ZVS and quasi-ZVS will be further shown.

Figure 33:
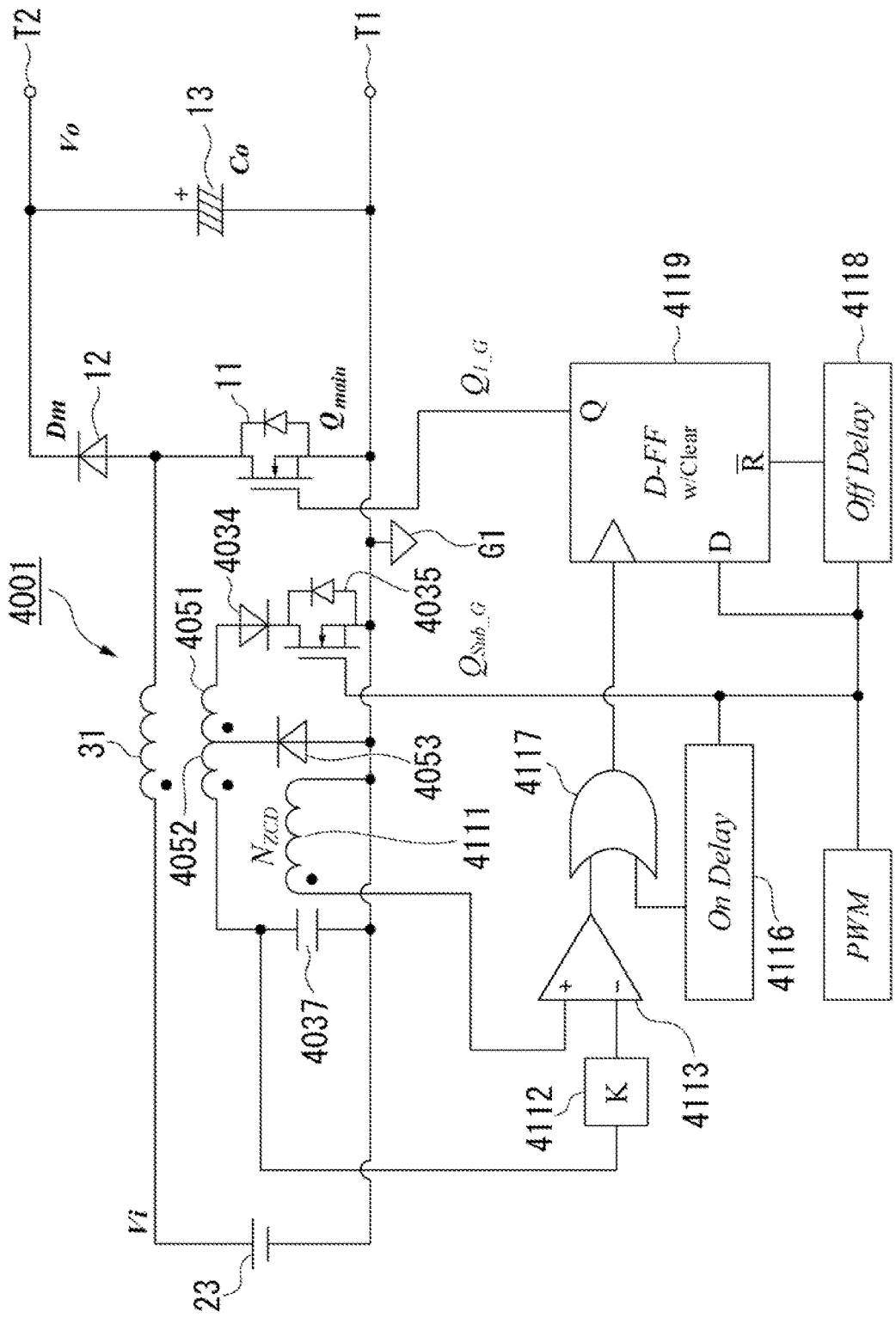
FIG. 33 is a diagram showing an example of a configuration of a controller (a drive circuit) of the ZVS assist circuit according to an embodiment.

Controller of ZVS Assist Circuit According to Example of FIG. 33

FIG. 33 is a diagram showing an example of a configuration of a controller (a drive circuit) of a ZVS assist circuit according to an embodiment.

The example of FIG. 33 is roughly an example in which the order of the AND and OR gates in the example of FIG. 18 is changed and a D-type flip-flop with an asynchronous clear terminal is used as an alternative to the AND gate.

In the example of FIG. 33, a flip-flop function and a latch function prevent a double pulse to a gate of a main switch element 11 ($Q_{main}$).

FIG. 33 shows a power conversion device 4001 having a controller having a configuration different from that of the controller of the power conversion device 601 shown in FIG. 18. In the example of FIG. 33, circuit units similar to those shown in FIG. 18 are shown using reference signs that are the same as those of FIG. 18.

Also, a power supply 23 is shown in FIG. 33.

A first output terminal T1 is connected to a ground terminal G1.

Although a configuration in which a winding 4051, a tertiary winding 4052, a diode 4053, a diode 4034, a switch element 4035, and a capacitor 4037 are provided in the example of FIG. 33 instead of the winding 51, the tertiary winding 52, the diode 53, the diode 34, the switch element 35, and the capacitor 37 in the example of FIG. 18 is shown, these are substantially similar ZVS assist circuits.

The controller includes an auxiliary winding 4111 (Nt': $N_{ZCD}$), an arithmetic unit 4112, a comparator 4113, an ON-delay circuit 4116, an OR gate 4117, an OFF-delay circuit 4118, and a D-type flip-flop (D-FF) 4119 with an asynchronous clear terminal.

Here, in the example of FIG. 33, the auxiliary winding 4111 is provided as a configuration part corresponding to the auxiliary winding 611 in the example of FIG. 18.

One end of the auxiliary winding 4111 is connected to the first output terminal T1 and the other end of the auxiliary winding 4111 is connected to a positive (+) input terminal of the comparator 4113.

Also, a diode (not shown in FIG. 33) for allowing a current to flow in a direction from the auxiliary winding 4111 to the comparator 4113 as a forward direction may or may not be provided between the auxiliary winding 4111 and the positive (+) input terminal of the comparator 4113.

The arithmetic unit 4112 is connected to a point between the capacitor 4037 and the tertiary winding 4052 (a location corresponding to the other end of the capacitor 37 in the example of FIG. 18), a voltage applied between both ends of the capacitor 4037 is multiplied by K, and the voltage multiplied by K is output to a negative (−) input terminal of the comparator 4113.

The comparator 4113 outputs a value according to inputs of the positive (+) input terminal and the negative (−) input terminal to the OR gate 4117. Specifically, the comparator 4113 outputs a value of 1 when the input of the positive (+) input terminal is greater than the input of the negative (−) input terminal and outputs a value of 0 when the input of the positive (+) input terminal is less than the input of the negative (−) input terminal.

Here, in the present embodiment, a control IC (not shown) outputs a PWM signal. The PWM signal is output to each of a gate of the auxiliary switch element 4035 ($Q_{sub}$), the ON-delay circuit 4116, the OFF-delay circuit 4118, and a D terminal (an input terminal) of the D-type flip-flop 4119.

The ON-delay circuit 4116 inputs a PWM signal and outputs a result of an ON-delay operation to the OR gate 4117.

The OR gate 4117 inputs an output from the comparator 4113 and an output from the ON-delay circuit 4116 and outputs a logical operation result thereof to a clock terminal of the D-type flip-flop 4119.

The OFF-delay circuit 4118 inputs a PWM signal and outputs a result of an OFF-delay operation to an asynchronous clear terminal (R of a negative logic) of the D-type flip-flop 4119.

The D-type flip-flop 4119 outputs a result based on an input of a D terminal thereof, the input of the clock terminal, and an input of the asynchronous clear terminal (R of the negative logic) from a Q terminal thereof to the gate of the main switch element 11 ($Q_{main}$).

In the example of FIG. 33, the PWM signal output from the control IC of the PFC circuit is input as the input of the D-type flip-flop 4119.

In the example of FIG. 33, a rising edge of a zero current detection (ZCD) comparator (the comparator 4113 in the example of FIG. 33) by an $N_{ZCD}$ tap (a tap of the auxiliary winding 4111 in the example of FIG. 33) is input to the D-type flip-flop 4119, the ZVS of the main switch element 11 ($Q_{main}$) is turned on, and the latch function is implemented.

However, because the main switch element 11 ($Q_{main}$) must be forcibly turned on regardless of the zero current detection (ZCD) at the time of activation, a latch function and a forced ON function are implemented by connecting a signal of an OR operation on an output of the ZCD comparator and an output of the ON-delay circuit 4116 to an edge input of the D-type flip-flop 4119. Also, the OFF-delay circuit 4118 is connected to the asynchronous clear terminal of the D-type flip-flop 4119 for the purpose of controlling an OFF timing of the main switch element 11 ($Q_{main}$), so that the auxiliary switch element 4035 ($Q_{sub}$) is turned off before the main switch element 11 ($Q_{main}$). Thereby, adjustment elements in this circuit configuration are three elements of a delay time of the PWM signal in the ON-delay circuit 4116, a delay time of the PWM signal in the OFF-delay circuit 4118, and the ZCD comparator.

Figure 34:
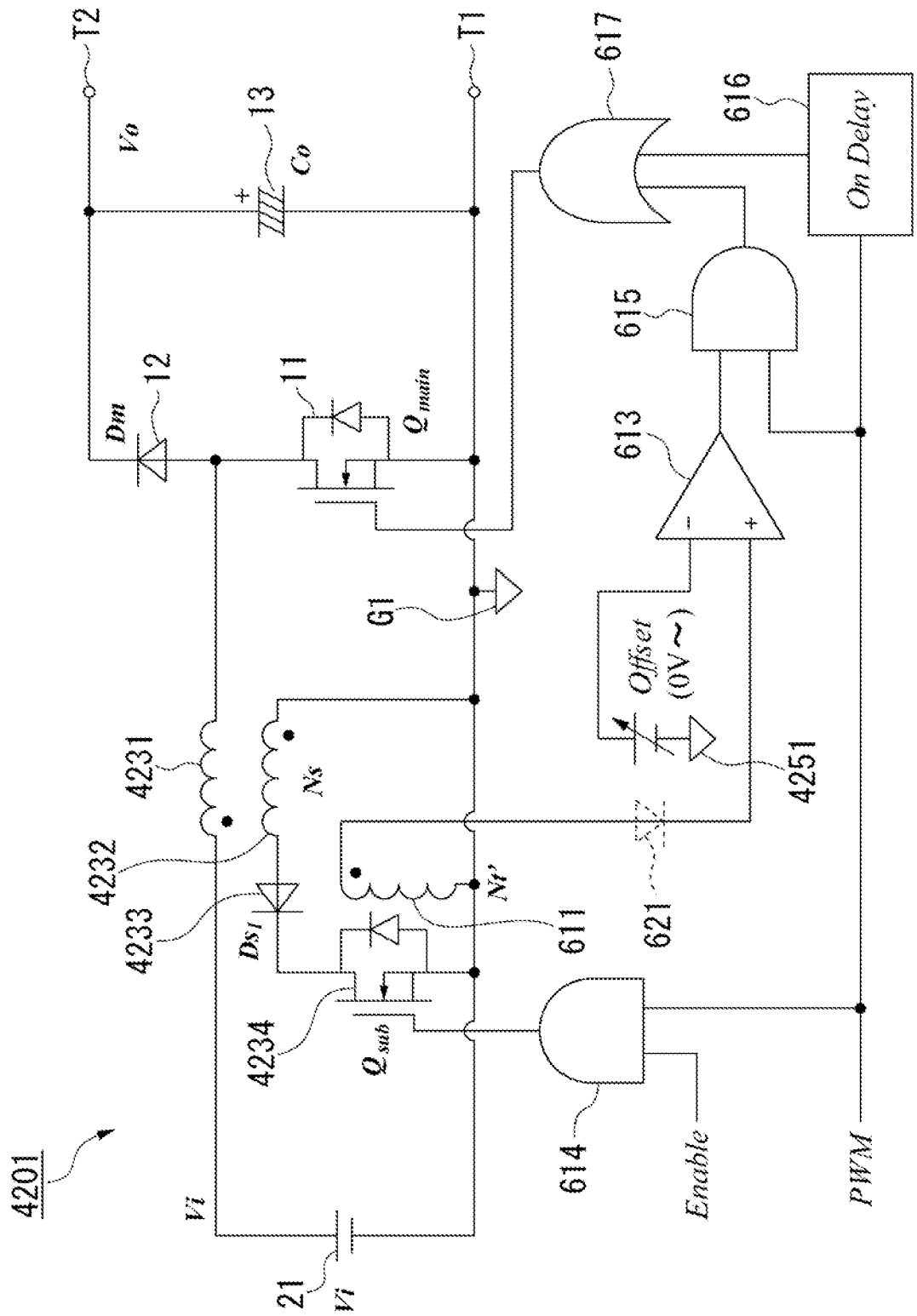
FIG. 34 is a diagram showing an example of a configuration of a controller (a drive circuit) of the quasi-ZVS assist circuit according to an embodiment.

Controller of Quasi-ZVS Assist Circuit According to Example of FIG. 34

FIG. 34 is a diagram showing an example of a configuration of a controller (a drive circuit) of a quasi-ZVS assist circuit according to an embodiment.

In FIG. 34, a power conversion device 4201 having a configuration similar to that of the power conversion device 1001 shown in FIG. 21(A) and having a controller substantially similar to that of the example of FIG. 18 is shown. In the example of FIG. 34, circuit units similar to those shown in FIG. 21(A) or FIG. 18 are shown using reference signs that are the same as those of FIG. 21(A) or FIG. 18.

Also, a power supply 21 is shown in FIG. 34.

Also, a first output terminal T1 is connected to a ground terminal G1.

Although a configuration in which a primary winding 4231, a secondary winding 4232, a diode 4233, and a switch element 4234 are provided in the example of FIG. 34 instead of the primary winding 1131, the secondary winding 1132, the diode 1133, and the switch element 1134 in the example of FIG. 21(A) is shown, these are substantially similar quasi-ZVS assist circuits.

The controller includes an auxiliary winding 611, a comparator 613, an AND gate 614, an AND gate 615, an ON-delay circuit 616, an OR gate 617, and an offset power supply 4251.

A diode 621 may or may not be provided.

In the present embodiment, a control IC (not shown) outputs an Enable signal and a PWM signal.

Here, the configuration of the controller in the example of FIG. 34 is different from the configuration of the controller in the example of FIG. 18 in that an input to a negative (−) input terminal of the comparator 613 is different.

In the example of FIG. 34, a voltage of the offset power supply 4251 is output to the negative (−) input terminal of the comparator 613.

The offset power supply 4251 outputs an offset voltage of 0 [V] or higher.

Figure 35:
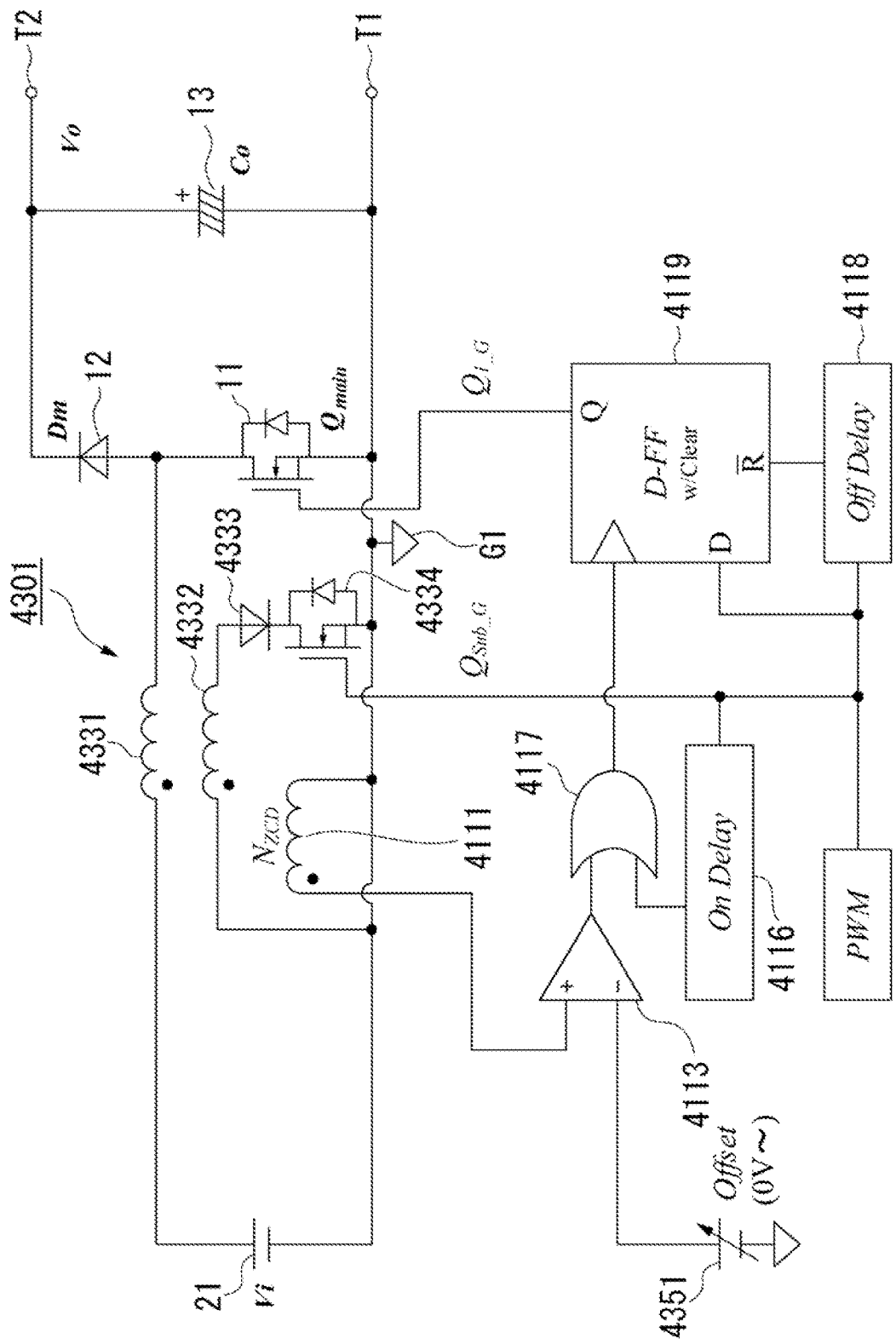
FIG. 35 is a diagram showing an example of a configuration of a controller (a drive circuit) of the quasi-ZVS assist circuit according to an embodiment.

Controller of Quasi-ZVS Assist Circuit According to Example of FIG. 35

FIG. 35 is a diagram showing an example of a configuration of a controller (a drive circuit) of a quasi-ZVS assist circuit according to an embodiment.

The example of FIG. 35 is roughly an example in which the order of the AND and OR gates in the example of FIG. 34 is changed and a D-type flip-flop with an asynchronous clear terminal is used as an alternative to an AND gate.

In the example of FIG. 35, a flip-flop function and a latch function prevent a double pulse to a gate of a main switch element 11 ($Q_{main}$).

In FIG. 35, a power conversion device 4301 having a configuration different from that of the controller of the power conversion device 4201 shown in FIG. 34 and having a controller substantially similar to that of the example of FIG. 33 is shown. In the example of FIG. 35, circuit units similar to those shown in FIG. 34 or 33 are shown using reference signs that are the same as those of FIG. 34 or 33.

Also, a power supply 21 is shown in FIG. 35.

Also, a first output terminal T1 is connected to a ground terminal G1.

Although a configuration in which a primary winding 4331, a secondary winding 4332, a diode 4333, and a switch element 4334 are provided in the example of FIG. 35 instead of the primary winding 4231, the secondary winding 4232, the diode 4233, and the switch element 4234 in the example of FIG. 34 is shown, these are substantially similar quasi-ZVS assist circuits.

The controller includes an auxiliary winding 4111, a comparator 4113, an ON-delay circuit 4116, an OR gate 4117, an OFF-delay circuit 4118, a D-type flip-flop (D-FF) 4119 with an asynchronous clear terminal, and an offset power supply 4351.

A diode (not shown in FIG. 35) for allowing a current to flow in a direction from the auxiliary winding 4111 to the comparator 4113 as a forward direction may or may not be provided between the auxiliary winding 4111 and a positive (+) input terminal of the comparator 4113.

In the present embodiment, a control IC (not shown) outputs a PWM signal.

Here, the configuration of the controller in the example of FIG. 35 is different from the configuration of the controller in the example of FIG. 33 in that an input to a negative (−) input terminal of the comparator 4113 is different.

In the example of FIG. 35, the voltage of the offset power supply 4351 is output to the negative (−) input terminal of the comparator 4113.

The offset power supply 4351 outputs an offset voltage of 0 [V] or higher.

Figure 36:
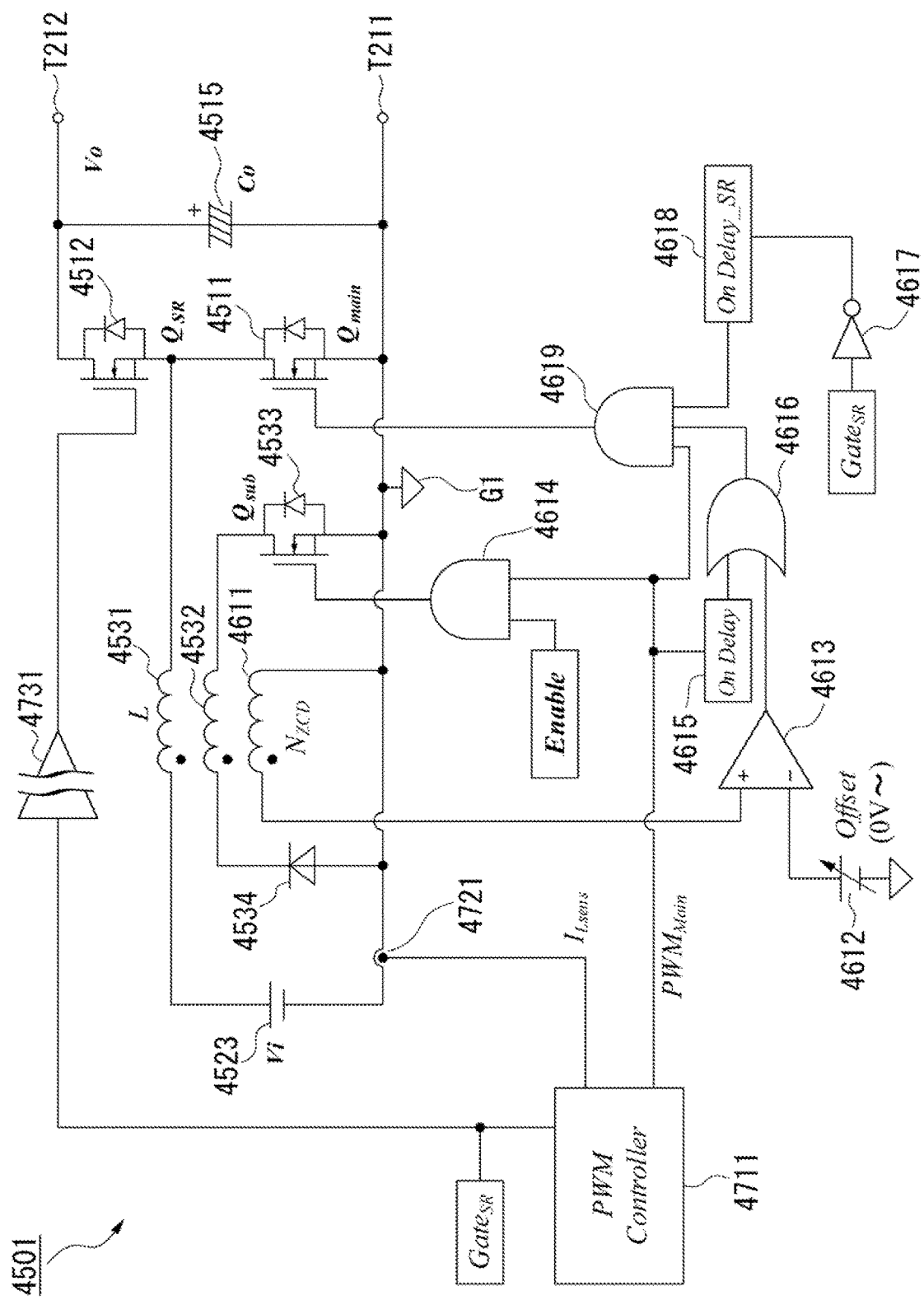
FIG. 36 is a diagram showing an example of a configuration of a controller (a drive circuit) of the quasi-ZVS assist circuit according to the embodiment.

Controller of Quasi-ZVS Assist Circuit According to Example of FIG. 36

FIG. 36 is a diagram showing an example of a configuration of a controller (a drive circuit) of a quasi-ZVS assist circuit according to an embodiment.

Herein, the equivalent circuit 1401 in the case of Vi>0 (a period in which the polarity of Vi is positive) in the example of FIG. 27 is shown in FIG. 28 and the operation example thereof has been described.

In FIG. 36, an example of a circuit (a control circuit) of the controller when the operation according to the example of FIG. 28 is performed is shown.

A power conversion device 4501 shown in FIG. 36 will be described.

The power conversion device 4501 includes a first output terminal T211, a second output terminal T212, a main switch element 4511 ($Q_{main}$), a switch element 4512 ($Q_{SR}$), a capacitor 4515, a primary winding 4531, a secondary winding 4532, an auxiliary switch element 4533 ($Q_{sub}$), and a diode 4534.

These correspond to the first output terminal T61, the second output terminal T62, the main switch element 511 ($Q_{SR-}$), the switch element 512 ($Q_{SR+}$), the capacitor 515, the primary winding 1331, the secondary winding 1332, the auxiliary switch element 1333 ($Q_{sub+}$), and the auxiliary switch element 1334 ($Q_{sub-}$) in the example of FIG. 27.

Also, a power supply 4523 is shown in FIG. 36.

Also, a first output terminal T211 is connected to a ground terminal G1.

The controller includes an auxiliary winding 4611 (Nt': $N_{ZCD}$), an offset power supply 4612, a comparator 4613, an AND gate 4614, an ON-delay circuit 4615, an OR gate 4616, a NOT gate 4617, an ON-delay circuit (SR) 4618, an AND gate 4619, a PWM controller 4711, a detection unit 4721, and a circuit unit 4731.

The AND gate 4614 inputs an Enable signal and a PWM signal and outputs a logical operation result thereof to a gate of the auxiliary switch element 4533 ($Q_{sub}$).

Here, in the present embodiment, the control IC outputs an Enable signal and a PWM signal. In the example of FIG. 36, the PWM controller 4711 constituting the control IC is shown. The PWM controller 4711 has a function of outputting a PWM signal. The function of outputting the Enable signal may be provided in, for example, the PWM controller 4711, or may be provided separately from the PWM controller 4711.

The Enable signal is a signal that controls the presence or absence of ZVS assist. For example, using an Enable signal, it is possible to stop the ZVS assist operation according to a condition and add a reactive current loss reduction function and a function of preventing a surge voltage to the auxiliary switch element 4533 ($Q_{sub}$).

One end of the auxiliary winding 4611 is connected to the first output terminal T211 and the other end of the auxiliary winding 4611 is connected to a positive (+) input terminal of the comparator 4613.

Also, a diode (not shown in FIG. 36) for allowing a current to flow in a direction from the auxiliary winding 4611 to the comparator 4613 as a forward direction may or may not be provided between the auxiliary winding 4611 and the positive (+) input terminal of the comparator 4613.

The offset power supply 4612 outputs an offset voltage of 0 [V] or higher to a negative (−) input terminal of the comparator 4613.

The comparator 4613 outputs a value according to inputs of the positive (+) input terminal and the negative (−) input terminal thereof to the OR gate 4616. Specifically, the comparator 4613 outputs a value of 1 when the input of the positive (+) input terminal is greater than the input of the negative (−) input terminal and outputs a value of 0 when the input of the positive (+) input terminal is less than the input of the negative (−) input terminal.

The PWM controller 4711 outputs a PWM signal to each of the AND gate 4614, the ON-delay circuit 4615, and the AND gate 4619.

Here, the detection unit 4721 detects a current ($I_{LSENS}$) flowing through the side of the first output terminal T211 of the power supply 4523 and outputs a current detection result to the PWM controller 4711.

The PWM controller 4711 outputs a PWM signal on the basis of the current detection result.

Also, the PWM controller 4711 outputs a voltage (a $Gate_{SR}$ signal) for controlling the switch element 4512 ($Q_{SR}$) to the gate of the switch element 4512 ($Q_{SR}$) via the circuit unit 4731.

The voltage (a $Gate_{SR}$ signal) is also output from the PWM controller 4711 to the NOT gate 4617.

Also, the circuit unit 4731 may be any circuit.

For example, the circuit unit 4731 has a function of driving a different $Q_{SR}$ gate input of a GND potential. The circuit unit 4731 may be any circuit such as an insulated gate driver or a gate driver with a bootstrap circuit.

The ON-delay circuit 4615 delays a PWM signal and outputs the delayed PWM signal to the OR gate 4616.

The OR gate 4616 inputs an output from the comparator 4613 and an output from the ON-delay circuit 4615 and outputs a logical operation result thereof to the AND gate 4619.

The NOT gate 4617 inverts a voltage from the PWM controller 4711 (inverts a positive/negative state) and outputs the inverted voltage to the ON-delay circuit (SR) 4618.

The ON-delay circuit (SR) 4618 delays a signal (for example, a voltage) input from the NOT gate 4617 and outputs the delayed signal to the AND gate 4619.

The AND gate 4619 inputs a PWM signal, an output from the OR gate 4616, and an output from the ON-delay circuit (SR) 4618 and outputs a logical operation result thereof to a gate of the main switch element 4511 ($Q_{main}$).

Here, an example of an operation including a prescribed mode (mode S) has been described with reference to FIGS. 28 and 29.

In the controller according to the example of FIG. 36, it is possible to control a gate voltage (a $Q_{main}$ signal) to the main switch element 4511 ($Q_{main}$) and a gate voltage (a $Q_{SR}$ signal) to the switch element 4512 ($Q_{SR}$) so that the switch element 4512 ($Q_{SR}$) responsible for a reflux operation of an exciting current of a primary winding performs a pair of ON/OFF operations (a synchronous rectification operation) for which a short-circuit prevention period associated with the main switch element 4511 ($Q_{main}$) is set.

In the example of FIG. 36, in the assist operation according to FIG. 28, a ZVS ON timing of the main switch is determined by an $N_{ZCD}$ detection comparator (the comparator 4613 in the example of FIG. 28).

In the example of FIG. 36, a three-input AND gate is used as an AND gate 4619 that outputs a gate voltage (a $Q_{main}$ signal) to the main switch element 4511 ($Q_{main}$) to set a short-circuit prevention period. As the three inputs, a PWM signal (a gate main signal), an output from an OR gate 4616 (a signal of the $N_{ZCD}$ detection comparator), and an output signal from the ON-delay circuit (SR) 4618 (a signal set for a short-circuit prevention period ($t_{dead\_SR}$) in the $Gate_{SR}$ signal that has been inverted) are used.

Figure 37:
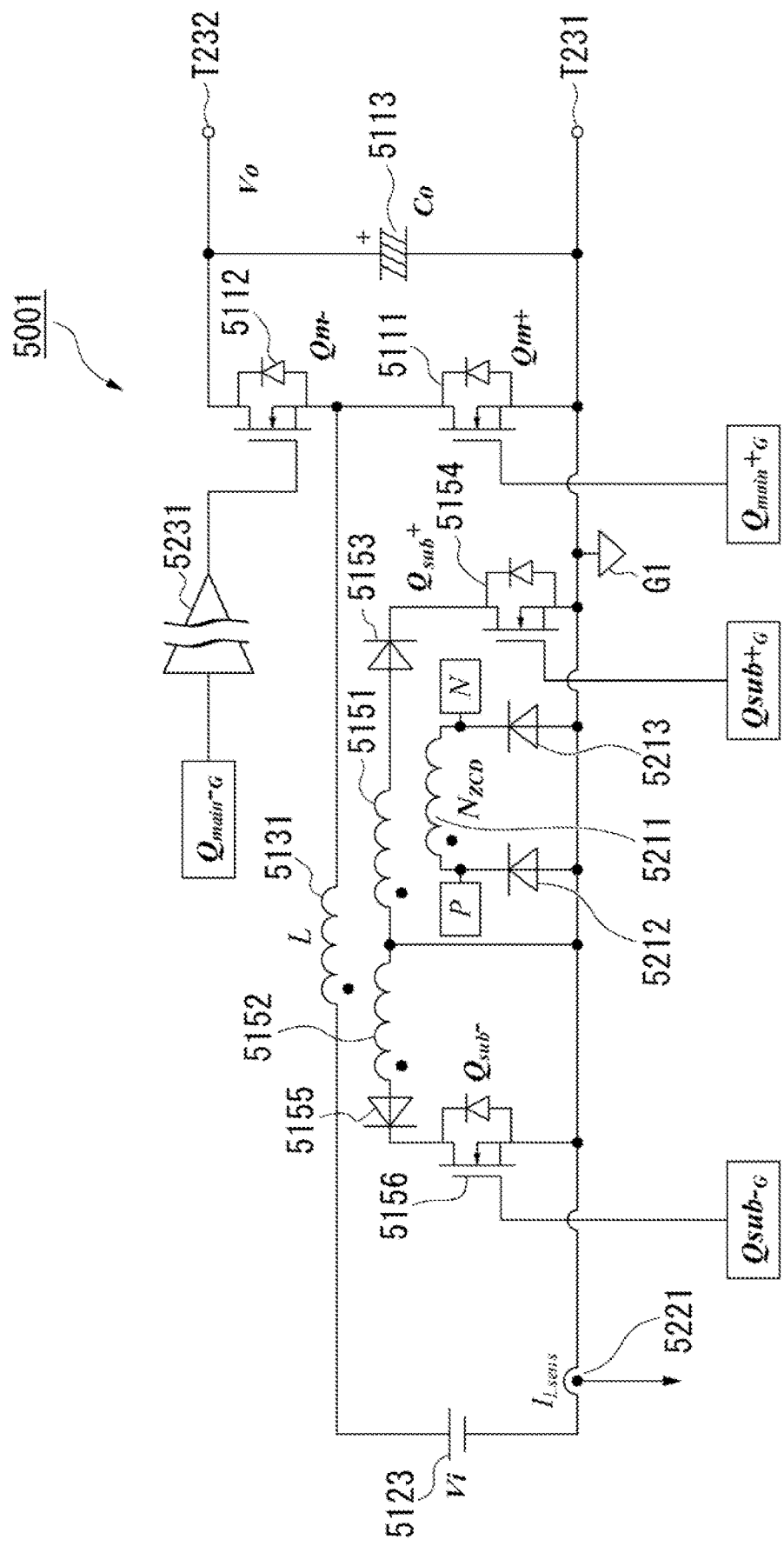
FIG. 37 is a diagram showing an example of a configuration of a power conversion device including a quasi-ZVS assist circuit according to an embodiment.
Figure 38:
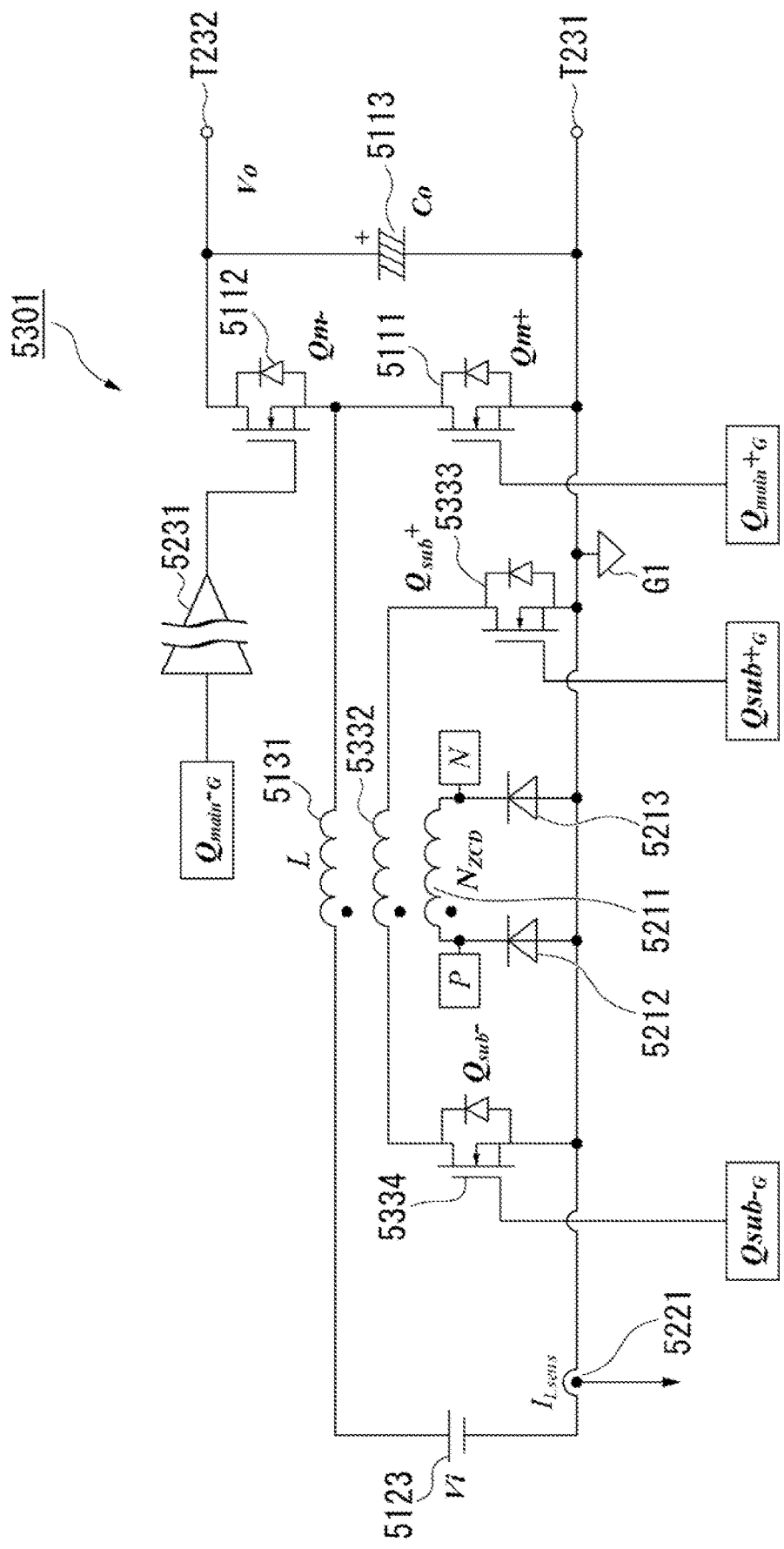
FIG. 38 is a diagram showing an example of a configuration of a power conversion device including a quasi-ZVS assist circuit according to an embodiment.
Figure 39:
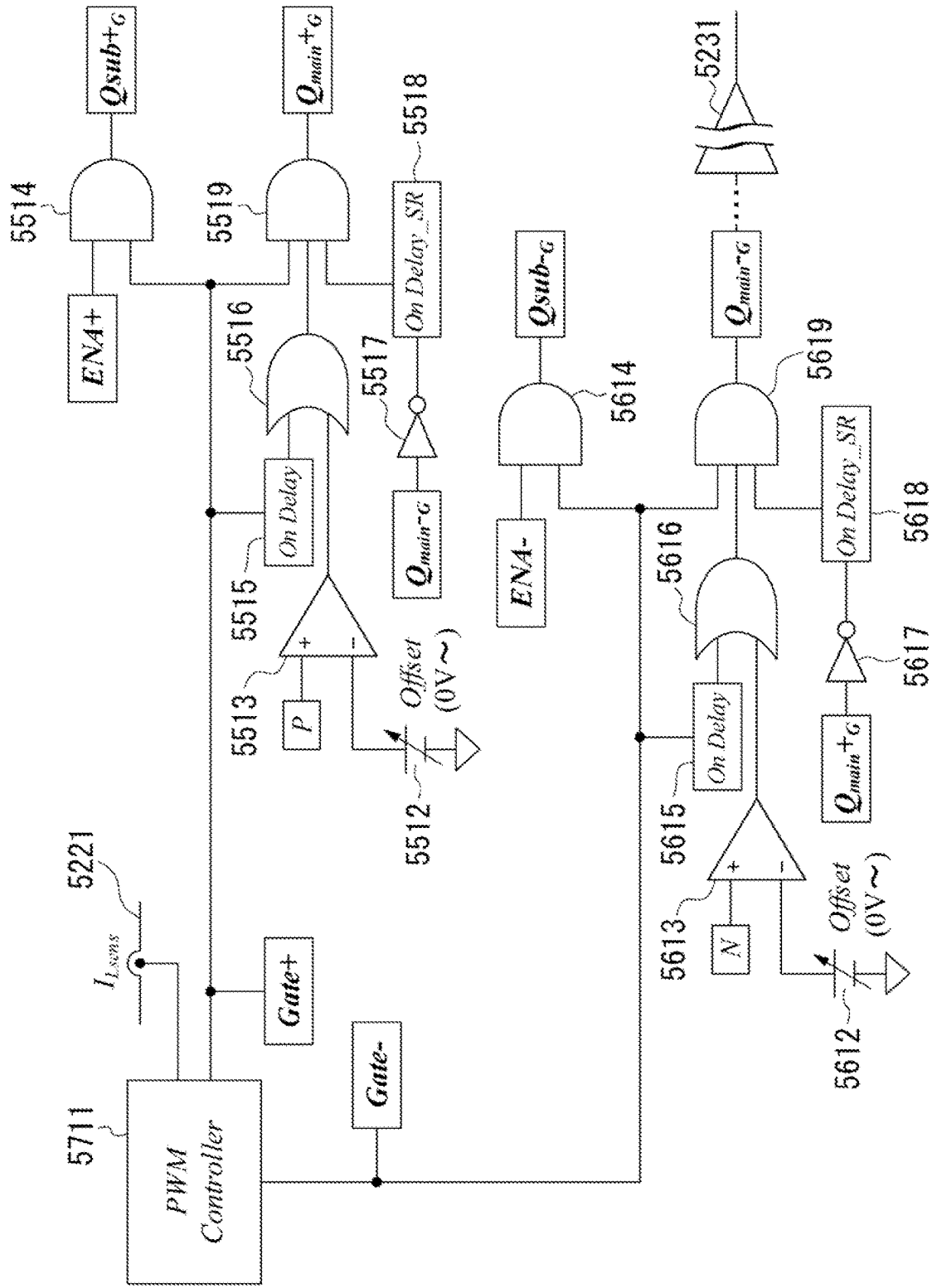
FIG. 39 is a diagram showing an example of a configuration of a controller (a drive circuit) of the quasi-ZVS assist circuit according to the embodiment.

(Description of FIGS. 37 to 39)

Power Conversion Device Including Quasi-ZVS Assist Circuit According to Example of FIG. 37

FIG. 37 is a diagram showing an example of a configuration of a power conversion device 5001 including a quasi-ZVS assist circuit according to an embodiment.

Also, a controller of the power conversion device 5001 will be described with reference to FIG. 39.

The power conversion device 5001 shown in FIG. 37 will be described.

The power conversion device 5001 includes a first output terminal T231, a second output terminal T232, a main switch element 5111 ($Q_{main+}$), a switch element 5112 ($Q_{main-}$), a capacitor 5113, a primary winding 5131, a secondary winding 5151, a secondary winding 5152, a diode 5153, a sub-switch element 5154 ($Q_{sub+}$), a diode 5155, and a sub-switch element 5156 ($Q_{sub-}$).

Also, a power supply 5123 is shown in FIG. 37.

Also, a first output terminal T231 is connected to a ground terminal G1.

Here, the arrangement of the first output terminal T231, the second output terminal T232, the switch element 5111 ($Q_{main+}$), the switch element 5112 ($Q_{main-}$), the capacitor 5113, the primary winding 5131, and the power supply 5123 is similar to the arrangement of the first output terminal T211, the second output terminal T212, the switch element 4511 ($Q_{main}$), the switch element 4512 ($Q_{SR}$), the capacitor 4515, the primary winding 4531, and the power supply 4523 in the example of FIG. 36.

Also, the arrangement of the secondary winding 5151, the secondary winding 5152, the diode 5153, the switch element 5154 ($Q_{sub+}$), the diode 5155, and the switch element 5156 ($Q_{sub-}$) is similar to the arrangement of the secondary winding 1311, the secondary winding 1312, the diode 1313, the switch element 1314 ($Q_{sub+}$), the diode 1315, and the switch element 1316 ($Q_{sub-}$) in the example of FIG. 26.

In the example of FIG. 37, a source of the switch element 5154 ($Q_{sub+}$), a source of the switch element 5156 ($Q_{sub-}$), and a connection point between the secondary winding 5151 and the secondary winding 5152 are connected to the first output terminal T231.

In FIG. 37, an auxiliary winding 5211 (Nt':$N_{ZCD}$), a diode 5212, a diode 5213, a detection unit 5221, and a circuit unit 5231 are shown as configuration parts of the controller.

Here, an anode of the diode 5212 and an anode of the diode 5213 are connected to the first output terminal T231.

The auxiliary winding 5211 is provided between a cathode of the diode 5212 and a cathode of the diode 5213.

The controller of the power conversion device 5001 extracts a signal (for example, a voltage signal) of the cathode side of the diode 5212 as a P signal, and extracts a signal (for example, a voltage signal) of the cathode side of the diode 5213 as an N signal.

The detection unit 5221 detects a current flowing through a location similar to a location of current detection by the detection unit 4721 in the example of FIG. 36.

The circuit unit 5231 is provided on a gate side of the switch element 5112 $Q_{main-}$) like the circuit unit 4731 in the example of FIG. 36.

Power Conversion Device Including Quasi-ZVS Assist Circuit According to Example of FIG. 38

FIG. 38 is a diagram showing an example of a configuration of a power conversion device 5301 including a quasi-ZVS assist circuit according to an embodiment.

A controller of the power conversion device 5301 will be described with reference to FIG. 39.

The power conversion device 5301 shown in FIG. 38 will be described.

Here, the configuration of the power conversion device 5301 is similar to the configuration of the power conversion device 5001 in the example of FIG. 37, except that a part of a quasi-ZVS circuit is different. Thus, in FIG. 38, configuration parts similar to those shown in FIG. 37 are denoted by reference signs that are the same as those of FIG. 37.

In the example of FIG. 38, a secondary winding 5332, a sub-switch element 5333 ($Q_{sub+}$), and a sub-switch element 5334 ($Q_{sub-}$) are provided instead of circuit parts of the secondary winding 5151, the secondary winding 5152, the diode 5153, the switch element 5154 ($Q_{sub+}$), the diode 5155, and the switch element 5156 ($Q_{sub-}$) in the example of FIG. 37.

A source of the sub-switch element 5333 ($Q_{sub+}$) and a source of the sub-switch element 5334 ($Q_{sub-}$) are connected to the first output terminal T231.

The secondary winding 5332 is provided between a drain of the sub-switch element 5333 ($Q_{sub+}$) and a drain of the sub-switch element 5334 ($Q_{sub-}$).

Controller of Quasi-ZVS Assist Circuit According to Example of FIG. 39

FIG. 39 is a diagram showing an example of a configuration of a controller (a drive circuit) of a quasi-ZVS assist circuit according to an embodiment.

The controller according to the example of FIG. 39 can be applied to both the power conversion device 5001 shown in FIG. 37 and the power conversion device 5301 shown in FIG. 38 and both cases will be described together here.

The controller includes an auxiliary winding 5211, two diodes 5212 and 5213, a detection unit 5221, a circuit unit 5231, and a PWM controller 5711.

Also, the controller includes an offset power supply 5512, a comparator 5513, an AND gate 5514, an ON-delay circuit 5515, an OR gate 5516, a NOT gate 5517, an ON-delay circuit (SR) 5518, and an AND gate 5519.

Also, the controller includes an offset power supply 5612, a comparator 5613, an AND gate 5614, an ON-delay circuit 5615, an OR gate 5616, a NOT gate 5617, an ON-delay circuit (SR) 5618, and an AND gate 5619.

Also, the ON-delay circuit (SR) 5518 has a delay time different from that of the ON-delay circuit 5515.

Also, the ON-delay circuit (SR) 5618 has a delay time different from that of the ON-delay circuit 5615.

Here, in the present embodiment, the control IC outputs an Enable signal and a PWM signal. In the example of FIG. 39, the PWM controller 5711 constituting the control IC is shown. The PWM controller 5711 has a function of outputting a PWM signal. For example, a function of outputting an Enable signal may be provided in the PWM controller 5711 or may be provided separately from the PWM controller 5711.

The Enable signal is a signal for controlling the presence or absence of ZVS assist. For example, using the Enable signal, it is possible to stop the ZVS assist operation according to a condition and add a reactive current loss reduction function and a function of preventing a surge voltage to the auxiliary switch element ($Q_{sub}$).

In the example of FIG. 39, an enable (ENA+) signal corresponding to the sub-switch element ($Q_{sub+}$) and an enable (ENA−) signal corresponding to the sub-switch element ($Q_{sub−}$) are used.

The PWM controller 5711 outputs a PWM signal to each of the AND gate 5514, the ON-delay circuit 5515, the AND gate 5519, the AND gate 5614, the ON-delay circuit 5615, and the AND gate 5619.

Here, the detection unit 5221 detects a current ($I_{LSENS}$) flowing through the side of the first output terminal T231 of the power supply 5123 and outputs a current detection result to the PWM controller 5711.

The PWM controller 5711 outputs a PWM signal on the basis of the current detection result.

The AND gate 5514 inputs an Enable (ENA+) signal and a PWM signal corresponding to the sub-switch element ($Q_{sub+}$) and outputs a logical operation result thereof to a gate of the sub-switch element ($Q_{sub+}$).

The switch element ($Q_{sub+}$) is the switch element 5154 ($Q_{sub+}$) in the example of FIG. 37 and is the switch element 5333 ($Q_{sub+}$) in the example of FIG. 38.

The offset power supply 5512 outputs an offset voltage of 0 [V] or higher to a negative (−) input terminal of the comparator 5513.

The P signal in the example of FIG. 37 and the example of FIG. 38 is input to a positive (+) input terminal of the comparator 5513.

The comparator 5513 outputs a value according to inputs of the positive (+) input terminal and the negative (−) input terminal thereof to the OR gate 5516. Specifically, the comparator 5513 outputs a value of 1 when the input of the positive (+) input terminal is greater than the input of the negative (−) input terminal and outputs a value of 0 when the input of the positive (+) input terminal is less than the input of the negative (−) input terminal.

The ON-delay circuit 5515 delays a PWM signal and outputs the delayed PWM signal to the OR gate 5516.

The OR gate 5516 inputs an output from the comparator 5513 and an output from the ON-delay circuit 5515 and outputs a logical operation result thereof to the AND gate 5519.

The NOT gate 5517 inputs an output voltage from the AND gate 5619, inverts the input voltage (inverts a positive/negative state), and outputs the inverted voltage to the ON-delay circuit (SR) 5518.

The ON-delay circuit (SR) 5518 delays an input from the NOT gate 5517 and outputs the delayed input to the AND gate 5519.

The AND gate 5519 inputs a PWM signal, an output from the OR gate 5516, and an output from the ON-delay circuit (SR) 5518, and outputs a logical operation result thereof to a gate of the main switch element ($Q_{main+}$).

The switch element ($Q_{main+}$) is the switch element 5111 ($Q_{main+}$) in the example of FIG. 37 and the example of FIG. 38.

The AND gate 5614 inputs an enable (ENA−) signal and a PWM signal corresponding to the sub-switch element ($Q_{sub−}$) and outputs a logical operation result thereof to a gate of the sub-switch element ($Q_{sub−}$).

The switch element ($Q_{sub−}$) is the switch element 5156 ($Q_{sub+}$) in the example of FIG. 37 and is the switch element 5334 ($Q_{sub+}$) in the example of FIG. 38.

The offset power supply 5612 outputs an offset voltage of 0 [V] or higher to a negative (−) input terminal of the comparator 5613.

The N signal in the example of FIG. 37 and the example of FIG. 38 is input to a positive (+) input terminal of the comparator 5613.

The comparator 5613 outputs a value according to inputs of the positive (+) input terminal and the negative (−) input terminal thereof to the OR gate 5616. Specifically, the comparator 5613 outputs a value of 1 when the input of the positive (+) input terminal is greater than the input of the negative (−) input terminal and outputs a value of 0 when the input of the positive (+) input terminal is less than the input of the negative (−) input terminal.

The ON-delay circuit 5615 delays a PWM signal and outputs the delayed PWM signal to the OR gate 5616.

The OR gate 5616 inputs an output from the comparator 5613 and an output from the ON-delay circuit 5615 and outputs a logical operation result thereof to the AND gate 5619.

The NOT gate 5617 inputs an output voltage from the AND gate 5519, inverts the input voltage (inverts a positive/negative state), and outputs the inverted voltage to the ON-delay circuit (SR) 5618.

The ON-delay circuit (SR) 5618 delays an input from the NOT gate 5617 and outputs the delayed input to the AND gate 5619.

The AND gate 5619 inputs a PWM signal, an output from the OR gate 5616, and an output from the ON-delay circuit (SR) 5618, and outputs a logical operation result thereof to a gate of the switch element ($Q_{main−}$) via the circuit unit 5231.

The switch element ($Q_{main−}$) is the switch element 5112 ($Q_{main−}$) in the example of FIG. 37 and the example of FIG. 38.

Here, the example of FIG. 39 is an example of a control circuit for implementing ZVS of the switch element 5111 ($Q_{main+}$) and the switch element 5112 ($Q_{main−}$), which are main switch elements, using the auxiliary winding 5211 in the AC converter as shown in FIGS. 26 and 27.

For example, an extension is facilitated by adding the detection unit 5221 ($I_{LSENS}$) and the Enable signal (ENA+ or ENA−) of the assist operation generated on the basis of the polarity of an AC input voltage to a control circuit of a unidirectional converter. The reason for this is that the output of the corresponding $N_{ZCD}$ detection point (P/N) from the comparator is high at the ON-timing of the main rectifying element ($Q_{SR}$) that is switched according to the polarity, so that the ON-timing of the main rectifying element ($Q_{SR}$) for $N_{ZCD}$ detection is not affected.

Example of Configuration of Power Conversion Device Including AC Converter Having Quasi-ZVS Assist Circuit An example of a configuration of a power conversion device including an AC converter having a quasi-ZVS assist circuit will be described with reference to FIGS. 40 and 41.

Figure 40:
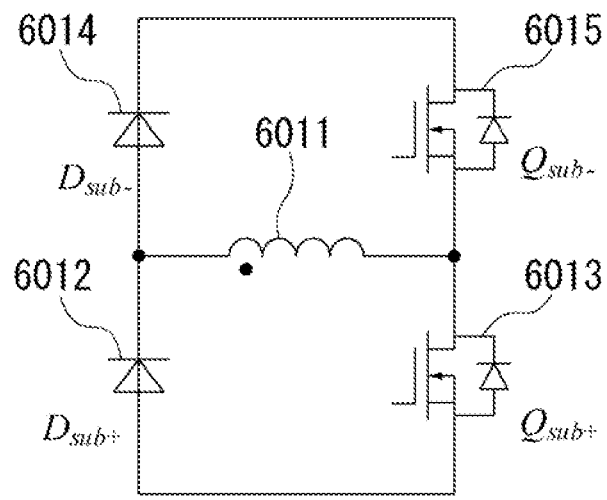
FIG. 40 is a diagram showing an example of a circuit configuration of a power conversion device including an AC converter having a quasi-ZVS assist circuit according to an embodiment.
Figure 41:
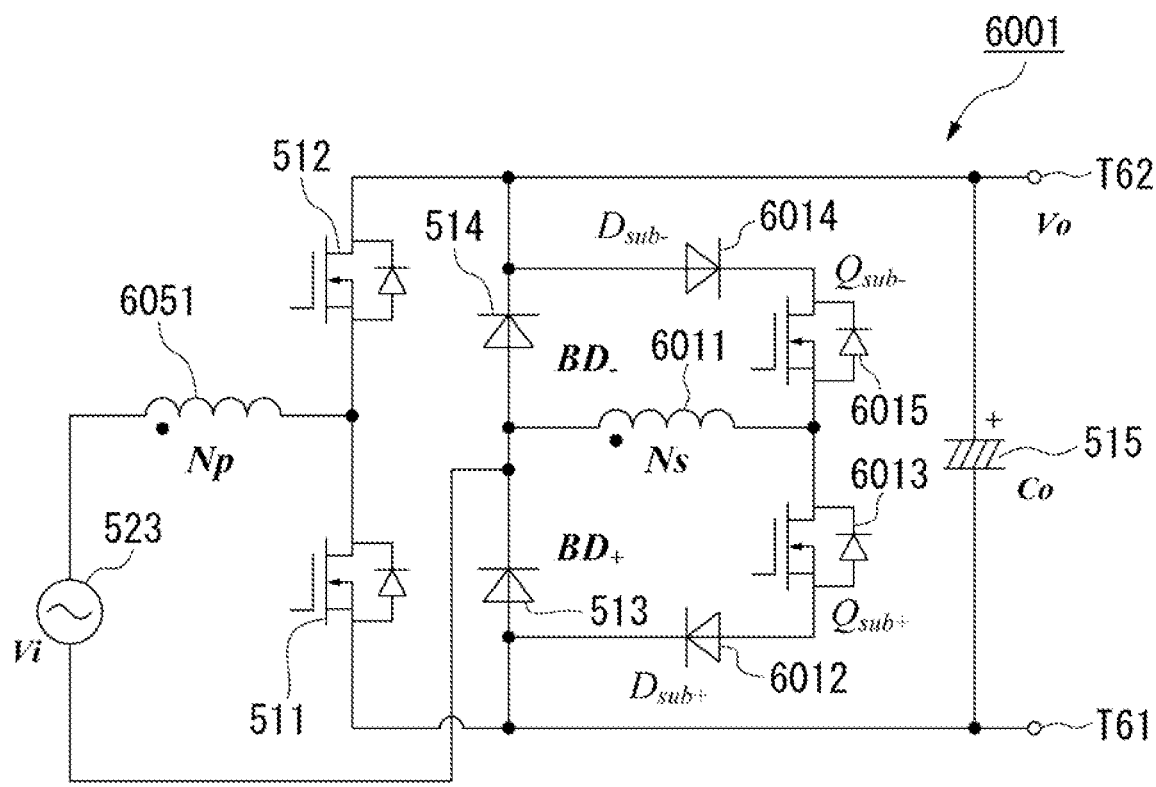
FIG. 41 is a diagram showing an example of a circuit configuration of a power conversion device including an AC converter having a quasi-ZVS assist circuit according to an embodiment.

In FIGS. 40 and 41, a case where the power conversion device includes a boost converter is shown.

Quasi-ZVS Assist Circuit of Power Conversion Device According to Example of FIG. 40

FIG. 40 is a diagram showing an example of a circuit configuration of a quasi-ZVS assist circuit according to an embodiment.

In the example of FIG. 40, a main circuit and a control circuit are not shown.

Here, the main circuit is similar to the main circuit shown in FIG. 14.

The quasi-ZVS assist circuit includes a primary winding 541 (Np) and a secondary winding 6011 of a coupled inductor, a diode 6012 ($D_{sub+}$), a switch element 6013 ($Q_{sub+}$) having a MOS type FET, a diode 6014 ($D_{sub-}$), and a switch element 6015 ($Q_{sub-}$) having a MOS type FET.

Here, a case where the primary winding 541 (Np) of the coupled inductor is not included in the quasi-ZVS assist circuit may be considered.

In the example of FIG. 40, a primary winding 541 (Np) is not shown.

One end of the secondary winding 6011, a cathode of the diode 6012, and an anode of the diode 6014 are connected.

A cathode of the diode 6014 and a drain of the switch element 6015 are connected.

The other end of the secondary winding 6011, a source of the switch element 6015, and a drain of the switch element 6013 are connected.

An anode of the diode 6012 and a source of the switch element 6013 are connected.

Power Conversion Device According to Example of FIG. 41

FIG. 41 is a diagram showing an example of a circuit configuration of a power conversion device 6001 including a quasi-ZVS assist circuit according to an embodiment.

In the example of FIG. 41, a control circuit is not shown.

The power conversion device 6001 includes a main circuit and a quasi-ZVS assist circuit.

The main circuit is similar to the main circuit according to the example of FIG. 14 and circuit elements of the main circuit are shown using reference signs that are the same as those of FIG. 14, except for a primary winding 6051 (Np) of a coupled inductor.

Also, a power supply 523 similar to that shown in FIG. 14 is shown in FIG. 41.

The quasi-ZVS assist circuit has a configuration similar to that of the example of FIG. 40.

Specifically, the quasi-ZVS assist circuit includes the primary winding 6051 (Np) of the coupled inductor, a secondary winding 6011, a diode 6012 ($D_{sub+}$), a switch element 6013 ($Q_{sub+}$) having a MOS type FET, a diode 6014 ($D_{sub-}$), and a switch element 6015 ($Q_{sub-}$) having a MOS type FET.

Here, a case where the primary winding 6051 (Np) of the coupled inductor is not included in the quasi-ZVS assist circuit may be considered.

Also, the arrangement of the primary winding 6051 is similar to the arrangement of the primary winding 541 shown in FIG. 14.

One end of the secondary winding 6011, a cathode of a half-wave rectifier diode 513, and an anode of a half-wave rectifier diode 514 are connected.

A cathode of the diode 6012 ($D_{sub+}$) and an anode of the half-wave rectifier diode 513 are connected.

An anode of the diode 6014 ($D_{sub-}$) and a cathode of the half-wave rectifier diode 514 are connected.

While the two secondary windings 1311 and 1312 (Ns windings) are required in the circuit configuration shown in FIG. 26, it is only necessary to provide one secondary winding 6011 in the example of FIG. 40.

Like the circuit configuration shown in FIG. 26, the circuit configuration shown in FIG. 40 is effective when the body diode characteristics of an auxiliary FET are poor or for simplification of ZVS ON control by the auxiliary winding.

The circuit configuration shown in FIG. 41 is obtained by applying the configuration shown in FIG. 40 to the totem-pole PFC circuit.

The circuit configuration shown in FIG. 41 can solve the following problems related to the half-wave rectifier diode 513 ($BD_+$) and the half-wave rectifier diode 514 ($BD_-$), which are AC diodes.

That is, in the totem-pole PFC circuit, the AC diode ($BD_{+/-}$) is turned off by a prescribed current ($i_{QSR\_off}$) in the negative direction, so that recovery loss occurs in the AC diode ($BD_{+/-}$).

Furthermore, it is known that turning off the AC diode ($BD_{+/-}$) worsens the common mode noise at zero crossing of the current of the AC diode.

Thus, it is general to replace the AC diode ($BD_{+/-}$) with a FET for synchronous rectification, but the cost increases.

As another example, alleviating the problem by connecting a relatively large capacitor to the AC diode ($BD_{+/-}$) is insufficient as a solution.

For such a problem of the AC diode, the configuration of the ZVS assist circuit having a triangle current mode (TCM) shown in FIG. 41 may be used.

In the circuit shown in FIG. 41, the switch element 6013 ($Q_{sub+}$), which is an auxiliary switch that performs an assist operation only when the input voltage is positive, and the switch element 6015 ($Q_{sub-}$), which is an auxiliary switch that performs an assist operation only when the input voltage is negative, are connected to the secondary winding 6011 (Ns) via an AC diode ($BD_{+/-}$) and an auxiliary diode ($D_{sub+/-}$) having polarities corresponding thereto.

Here, when the number of turns of the secondary winding 6011 (Ns) and the number of turns of the primary winding 6051 (Np) are equal, a current applied to the AC diode ($BD_{+/-}$) has the same value as an input current $I_{Lm}$ on which the assist current is not superimposed. Consequently, the AC diode ($BD_{+/-}$) is not turned off by the current in the negative direction ($i_{QSR\_off}$).

Thereby, the above problems can be solved and the AC diode ($BD_{+/-}$) can be replaced with an inexpensive general rectifier diode from the synchronous rectifier FET.

However, Vds=Vi+Vo, which is higher than that in the example of FIG. 40, is applied to the switch element ($Q_{sub}$) that is always turned off during a polarity-specific half-cycle without the assist operation.

Also, in the example of FIG. 41, for example, the arrangement (the order of the arrangement) of the diode 6012 ($D_{sub+}$) and the switch element 6013 ($Q_{sub+}$) may be reversed and the arrangement (the order of the arrangement) of the diode 6014 ($D_{sub-}$) and the switch element 6015 ($Q_{sub-}$) may be reversed.

Example of Configuration of Multiphase Power Conversion Device Including ZVS Assist Circuit An example of a configuration of a multiphase power conversion device including a ZVS assist circuit (a ZVS resonance assist circuit) will be described with reference to FIG. 42.

Figure 42:
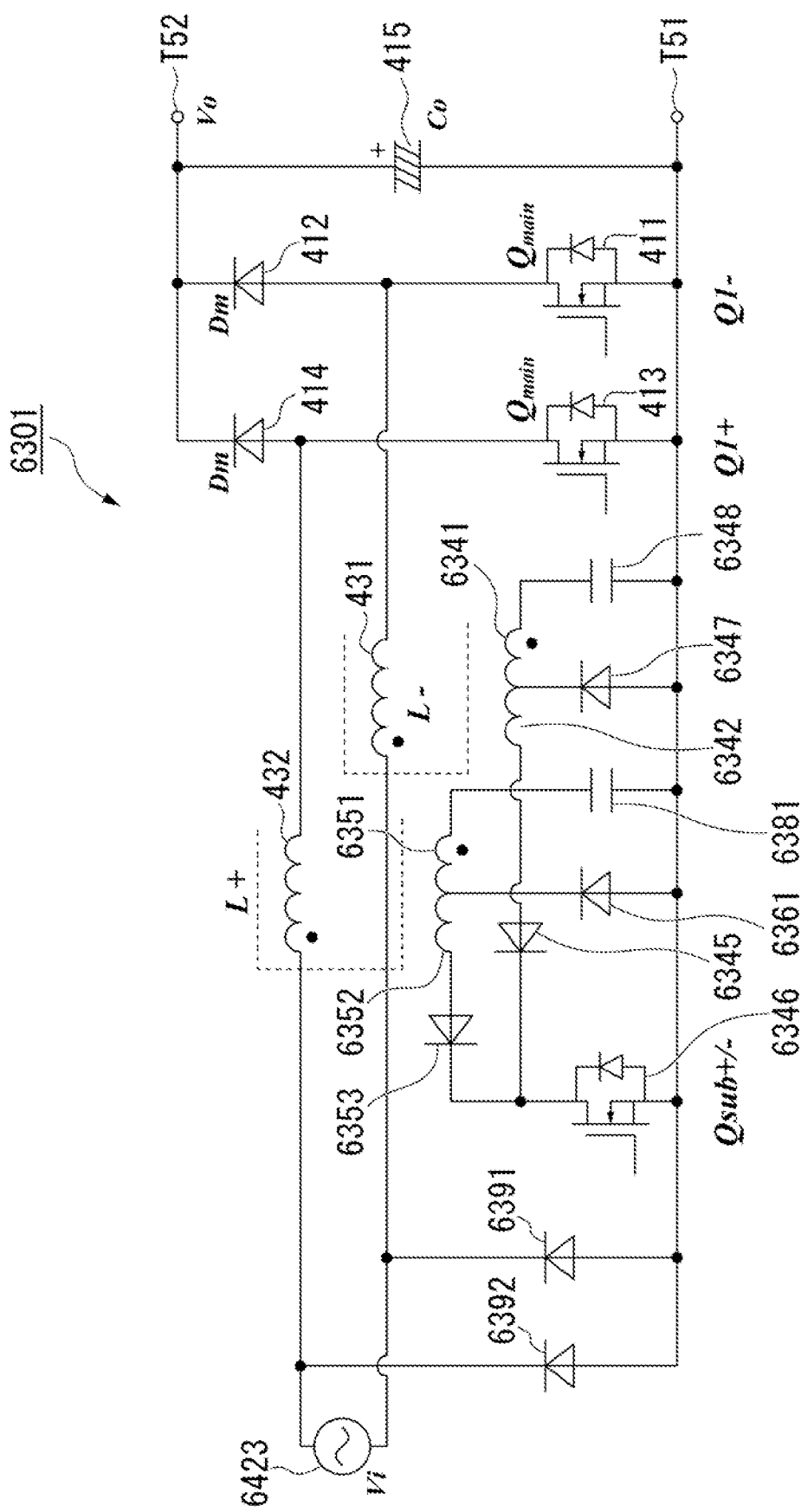
FIG. 42 is a diagram showing an example of a circuit configuration of a multiphase power conversion device including a ZVS assist circuit according to an embodiment.

In FIG. 42, a case where the power conversion device includes a boost converter is shown.

ZVS Assist Circuit According to Example of FIG. 42

FIG. 42 is a diagram showing an example of a circuit configuration of a multiphase power conversion device 6301 including a ZVS assist circuit according to an embodiment.

In the example of FIG. 42, a case where the ZVS assist circuit is applied to a dual-boost PFC circuit is shown and an example of a configuration of a two-phase power conversion device 6301 is shown.

In the example of FIG. 42, the control circuit is not shown. For example, the configuration of the control circuit including the auxiliary winding may be applied to the example of FIG. 42.

In the example of FIG. 42, configuration parts similar to those shown in FIG. 13 are denoted by reference signs that are the same as those of FIG. 13.

The dual-boost PFC circuit may be referred to as, for example, a dual-boost-bridgeless PFC circuit, a dual-boost semi-bridgeless PFC circuit, or the like.

The power conversion device 6301 includes a main circuit and a ZVS assist circuit.

The main circuit includes a main switch element 411 ($Q_{main}$) having a MOS type FET and a main diode 412 (Dm) in a first phase, a main switch element 413 (Qmain) having a MOS type FET and a main diode 414 (Dm) in a second phase, a capacitor 415 (Co), which is an output capacitor, a primary winding 431 (Np) of a coupled inductor corresponding to the first phase, and a primary winding 432 (Np) of a coupled inductor corresponding to the second phase.

Also, the main circuit includes a diode 6391 corresponding to the first phase and a diode 6392 corresponding to the second phase.

Also, a single-phase AC power supply 6423 is shown in FIG. 42.

Here, an anode of the diode 6391, an anode of the diode 6392, and a first output terminal T51 are connected.

A cathode of the diode 6391 and a location on the first phase side of the power supply 6423 are connected.

A cathode of the diode 6392 and a location on the second phase side of the power supply 6423 are connected.

The ZVS assist circuit includes the primary winding 431 (Np) of the coupled inductor corresponding to the first phase and the primary winding 432 (Np) of the coupled inductor corresponding to the second phase.

Also, the ZVS assist circuit includes a winding 6341 (Nc), a tertiary winding 6342 (Nt), a diode 6345 ($Ds_1$), a switch element 6346 ($Q_{sub+/-}$) having a MOS type FET, a diode 6347 ($Ds_2$), and a capacitor 6348 (Cs) which is an auxiliary capacitor, as circuit units corresponding to the primary winding 431 of the first phase.

A secondary winding (Ns=Nc+Nt) includes the winding 6341 and the tertiary winding 6342.

Here, the arrangement of these circuit units is similar to that of the example of FIG. 13, except that the two diodes 6391 and 6392 are provided in the example of FIG. 42.

Also, the ZVS assist circuit includes a winding 6351 (Nc), a tertiary winding 6352 (Nt), a diode 6353 ($Ds_1$), and a diode 6361 as circuit units corresponding to the second phase primary winding 432. Also, the circuit unit corresponding to the primary winding 432 of the second phase shares the switch element 6346 ($Q_{sub+/-}$) with the circuit unit corresponding to the first phase.

Here, a case where the primary winding 431 (Np) of the coupled inductor and the primary winding 432 (Np) of the coupled inductor are not included in the ZVS assist circuit may be considered.

A secondary winding (Ns=Nc+Nt) includes the winding 6351 and the tertiary winding 6352.

Here, the arrangement of these circuit units will be described.

The first output terminal T51, one end of the capacitor 6381, and an anode of the diode 6361 are connected.

The other end of the capacitor 6381 and one end of the winding 6351 (Nc) are connected.

The other end of the winding 6351, a cathode of the diode 6361, and one end of the tertiary winding 6352 are connected.

The other end of the tertiary winding 6352 and an anode of the diode 6353 ($Ds_1$) are connected.

A cathode of the diode 6353 ($Ds_1$) and a drain of the sub-switch element 6346 ($Q_{sub+/-}$) are connected.

Here, the circuit units of the second phase of the ZVS assist circuit share the sub-switch element 6346 ($Q_{sub+/-}$) of the first phase.

Although an example of a configuration of the two-phase power conversion device 6301 is shown in the example of FIG. 42, it is also possible to provide a circuit unit of a ZVS assist circuit in correspondence with each phase in a power conversion device having three or more phases.

Here, the example of FIG. 42 is an example in which the ZVS circuit of the dual-boost PFC circuit using the switch element 6346 ($Q_{sub+/-}$), which is a single auxiliary switch element, is applied.

A gate signal of the switch element 6346 ($Q_{sub+/-}$) is generated on the basis of a Q1+ gate signal (a $Q_{main+}$ gate signal) during a period when the input polarity is positive and is generated on the basis of a Q1- gate signal (a $Q_{main-}$ gate signal) during a period when the input polarity is negative.

When the input polarity is positive, the voltage of the negative electrode side inductor L- is 0 [V] except for the case of the resistance drop, so that the assist current does not occur due to an ON state of the switch element 6346 ($Q_{sub+/-}$). Thus, a ZVS operation similar to that of an operation waveform shown in FIG. 6 can be obtained in the boost circuit on the positive electrode side without causing operation interference.

Example of Configuration of Multiphase Power Conversion Device Including Quasi-ZVS Assist Circuit An example of a configuration of a multiphase power conversion device including a quasi-ZVS assist circuit (a quasi-ZVS resonance assist circuit) will be described with reference to FIG. 43.

Figure 43:
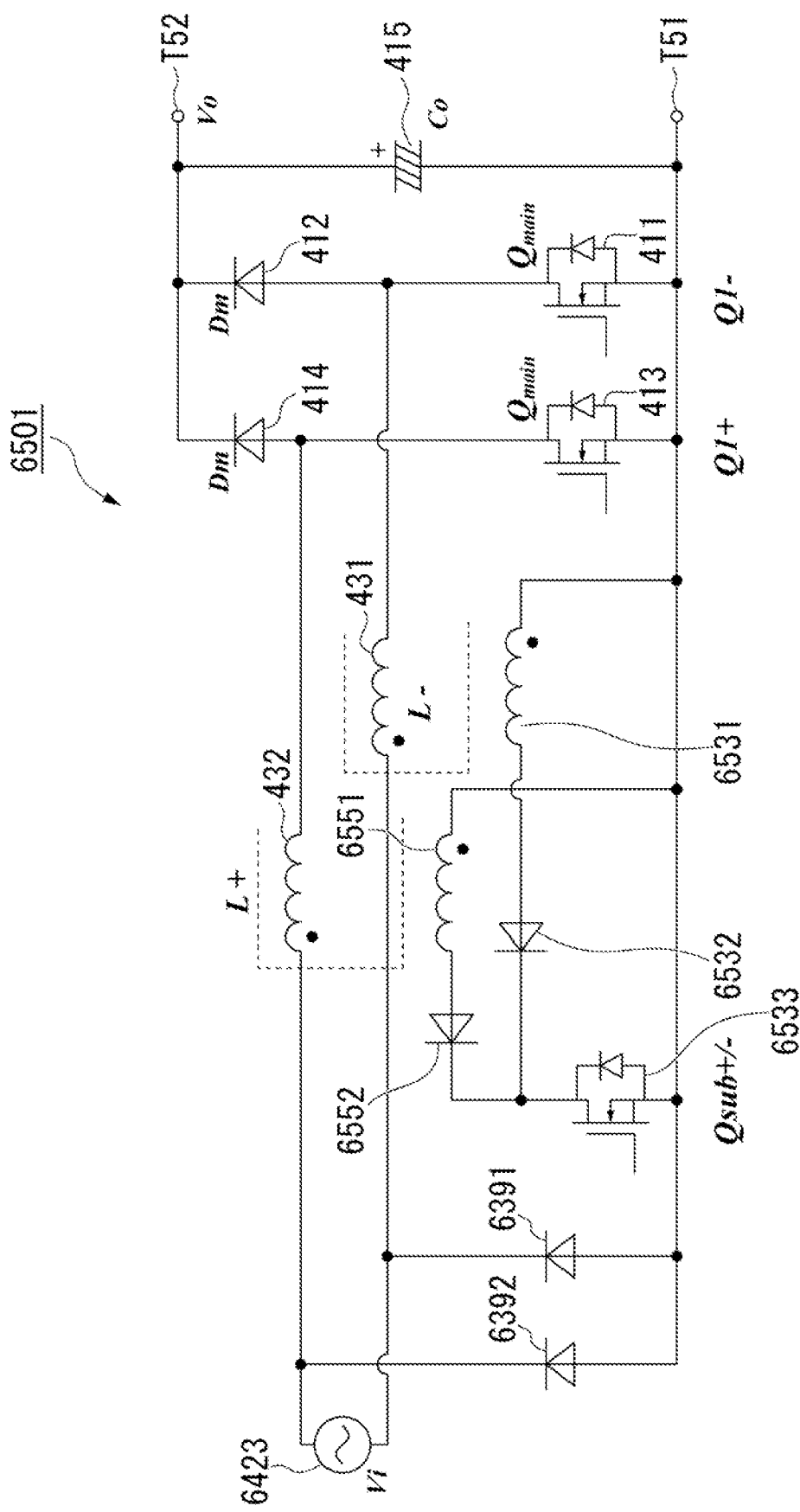
FIG. 43 is a diagram showing an example of a circuit configuration of a multiphase power conversion device including a quasi-ZVS assist circuit according to an embodiment.

In FIG. 43, a case where the power conversion device includes a boost converter is shown.

Quasi-ZVS Assist Circuit According to Example of FIG. 43

FIG. 43 is a diagram showing an example of a circuit configuration of a multiphase power conversion device 6501 including a quasi-ZVS assist circuit according to an embodiment.

In the example of FIG. 43, a case where the quasi-ZVS assist circuit is applied to the dual-boost PFC circuit is shown and an example of a configuration of the two-phase power conversion device 6501 is shown.

In the example of FIG. 43, a control circuit is not shown. For example, a configuration of the control circuit including the auxiliary winding may be applied to the example of FIG. 43.

In the example of FIG. 43, configuration parts similar to those shown in FIG. 42 are denoted by reference signs that are the same as those of FIG. 42.

The power conversion device 6501 includes a main circuit and a quasi-ZVS assist circuit.

The configuration of the main circuit is similar to the configuration of the main circuit in the example of FIG. 42.

Also, a power supply 6423 is shown in FIG. 43.

The quasi-ZVS assist circuit includes a primary winding 431 (Np) of the coupled inductor corresponding to the first phase and a primary winding 432 (Np) of the coupled inductor corresponding to the second phase.

Also, the quasi-ZVS assist circuit is a secondary winding 6531 (Ns), a diode 6532, and an auxiliary switch element 6533 ($Q_{sub+/-}$) having a MOS type FET as circuit units corresponding to the primary winding 431 of the first phase.

Here, one end of the secondary winding 6531 (Ns) and a first output terminal T51 are connected.

The other end of the secondary winding 6531 (Ns) and an anode of the diode 6532 are connected.

A cathode of the diode 6532 and a drain of the auxiliary switch element 6533 ($Q_{sub+/-}$) are connected.

A source of the auxiliary switch element 6533 ($Q_{sub+/-}$) and the first output terminal T51 are connected.

Also, the quasi-ZVS assist circuit includes a secondary winding 6551 (Ns) and a diode 6552 as circuit units corresponding to the primary winding 432 of the second phase. Also, the circuit unit corresponding to the primary winding 432 of the second phase shares the auxiliary switch element 6533 ($Q_{sub+/-}$) with the circuit unit corresponding to the first phase.

Here, one end of the secondary winding 6551 (Ns) and the first output terminal T51 are connected.

The other end of the secondary winding 6551 (Ns) and an anode of the diode 6552 are connected.

A cathode of the diode 6552 and a drain of the auxiliary switch element 6533 ($Q_{sub+/-}$) are connected.

As described above, the circuit units of the second phase of the quasi-ZVS assist circuit share the switch element 6533 ($Q_{sub+/-}$) of the first phase.

Although an example of a configuration of the two-phase power conversion device 6501 is shown in the example of FIG. 43, it is also possible to provide a circuit unit of a quasi-ZVS assist circuit in correspondence with each phase in a power conversion device having three or more phases.

Here, the example of FIG. 43 is an example in which the quasi-ZVS circuit of the dual-boost PFC circuit using the switch element 6533 ($Q_{sub+/-}$), which is a single auxiliary switch element, is applied.

Agate signal of the switch element 6533 ($Q_{sub+/-}$) is generated on the basis of a Q1+ gate signal (a $Q_{main+}$ gate signal) during a period when the input polarity is positive and is generated on the basis of a Q1− gate signal (a $Q_{main-}$ gate signal) during a period when the input polarity is negative.

When the input polarity is positive, the voltage of the negative electrode side inductor L− is 0 [V] except for the case of the resistance drop, so that the assist current does not occur due to an ON state of the switch element 6533 ($Q_{sub+/-}$). Thus, a quasi-ZVS operation similar to that of an operation waveform shown in FIG. 25 can be obtained in the boost circuit on the positive electrode side without causing operation interference.

(Diode Clamp Circuit)

A diode clamp circuit will be described with reference to FIGS. 44 and 45.

Figure 44:
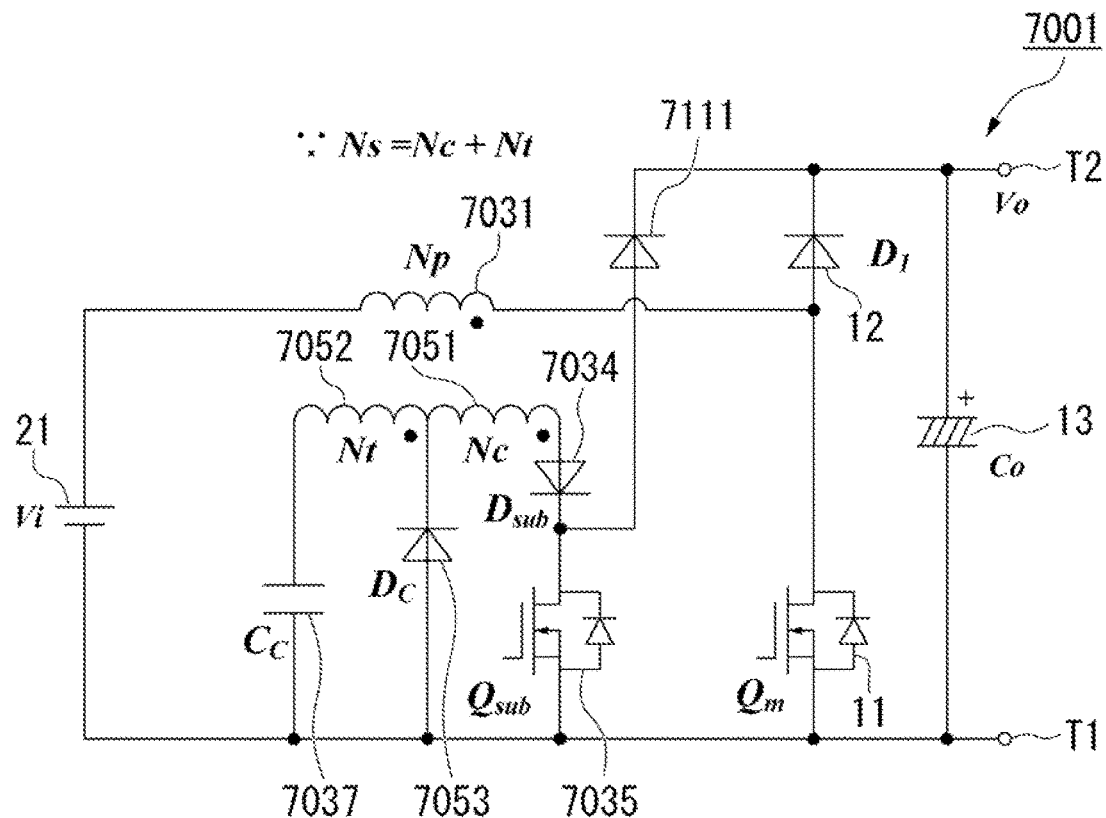
FIG. 44 is a diagram showing an example of a circuit configuration of a power conversion device including a ZVS assist circuit according to an embodiment.

Power Conversion Device According to Example of FIG. 44

FIG. 44 is a diagram showing an example of a circuit configuration of a power conversion device 7001 including a ZVS assist circuit according to an embodiment.

In the example of FIG. 44, a control circuit is not shown.

The power conversion device 7001 includes a main circuit and a ZVS assist circuit.

The main circuit is similar to the main circuit according to the example of FIG. 4, and circuit elements of the main circuit are shown using reference signs that are the same as those of FIG. 4.

Also, a power supply 21 (Vi) similar to that shown in FIG. 4 is shown in FIG. 44.

The ZVS assist circuit includes a primary winding 7031 (Np), a winding 7051 (Nc=Ns−Nt), a tertiary winding 7052 (Nt), a diode 7034, a switch element 7035, a capacitor 7037, and a diode 7053.

Although a configuration including the primary winding 7031 (Np), the winding 7051 (Nc=Ns−Nt), the tertiary winding 7052 (Nt), the diode 7034, the switch element 7035, the capacitor 7037, and the diode 7053 is shown in the example of FIG. 44 instead of the primary winding 31 (Np), the winding 51 (Nc=Ns−Nt), the tertiary winding 52 (Nt), the diode 34, the switch element 35, the capacitor 37, and the diode 53 in the example of FIG. 4, these are substantially similar ZVS assist circuits.

Furthermore, the power conversion device 7001 according to the present embodiment includes a diode 7111.

An anode of the diode 7111 is connected to a cathode of the diode 7034 and a drain of the switch element 7035.

A cathode of the diode 7111 is connected to a second output terminal T2.

A diode clamp circuit using such a diode 7111 is a countermeasure against a surge voltage to the auxiliary switch (the switch element 7035) in the actual machine.

According to such a configuration, a lossless clamp circuit that can be used when $V_{Qsub}$ is lower than Vo in Eq. (9) is implemented.

In Eq. (9), $V_{Qsub}$ denotes a voltage applied to both ends of the switch element 7035, $V_{Ns}$ denotes a voltage applied to the secondary winding (Ns), $V_{Cc}$ denotes a voltage applied to the capacitor 7037, $N_p$ denotes the number of turns of the primary winding 7031, $N_s$ denotes the number of turns of the secondary winding, $N_t$ denotes the number of turns of the tertiary winding 7052, Vo denotes an output voltage of the main circuit (a voltage applied between a first output terminal T1 and a second output terminal T2), and Vi denotes a voltage of the power supply 21.

$$V_{Qsub} = V_{Ns} + V_{Cc} = \frac{N_S}{N_P}(V_O - V_i) + \frac{N_t}{N_P} Vi \qquad (9)$$

Figure 45:
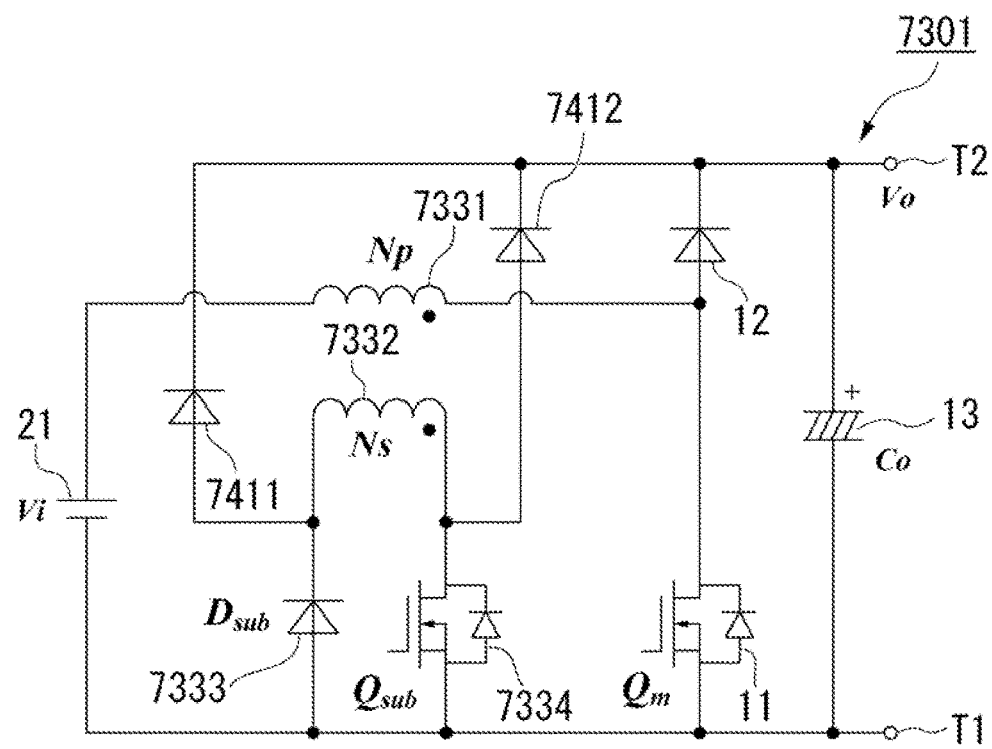
FIG. 45 is a diagram showing an example of a circuit configuration of a power conversion device including a quasi-ZVS assist circuit according to an embodiment.

Power Conversion Device According to Example of FIG. 45

FIG. 45 is a diagram showing an example of a circuit configuration of a power conversion device 7301 including a quasi-ZVS assist circuit according to an embodiment.

In the example of FIG. 45, a control circuit is not shown.

The power conversion device 7301 includes a main circuit and a quasi-ZVS assist circuit.

The main circuit is similar to the main circuit according to the example of FIG. 21(A) and circuit elements of the main circuit are shown using reference signs that are the same as those of FIG. 21(A).

Also, a power supply 21 (Vi) similar to that shown in FIG. 21(A) is shown in FIG. 45

The quasi-ZVS assist circuit includes a primary winding 7331 (Np), a secondary winding 7332 (Ns), a diode 7333, and a switch element 7334.

Here, the arrangement of these circuits is substantially similar to that of the quasi-ZVS assist circuit shown in FIG. 21(C).

Furthermore, the power conversion device 7301 according to the present embodiment includes a diode 7411 and a diode 7412.

An anode of the diode 7411 is connected to a cathode of the diode 7333.

A cathode of the diode 7411 is connected to the second output terminal T2.

An anode of the diode 7412 is connected to a drain of the auxiliary switch element 7334.

A cathode of the diode 7412 is connected to the second output terminal T2.

The diode clamp circuit using such diodes 7411 and 7412 is a countermeasure against a surge voltage to the auxiliary switch (the switch element 7334) in the actual machine.

According to such a configuration, a clamp circuit can be connected when $V_{Dsub}$ is lower than Vo in Eq. (10).

In Eq. (10), $V_{Dsub}$ denotes a voltage applied across the diode 7333, $V_{Ns}$ denotes a voltage applied to the secondary winding 7332 (Ns), $N_p$ denotes the number of turns of the primary winding 7331, $N_s$ denotes the number of turns of the secondary winding 7332, and Vi denotes a voltage of the power supply 21.

$$V_{Dsub} = V_{Ns} = \frac{N_S}{N_P} Vi \tag{10}$$

Examples of Configuration

Examples of Configuration of ZVS Assist Circuit

As an example of a configuration (examples of FIGS. 1 to 4 and FIGS. 7 to 10), a power conversion device includes a converter including a main switch element ($Q_{main}$), a main rectifying element (Dm), an output capacitor (Co), and a primary winding (Np) of a coupled inductor; and a resonance assist circuit (a ZVS assist circuit) based on a closed-loop circuit including a first series circuit having a secondary winding (Ns) of the coupled inductor, a first rectifying element ($Ds_1$) and an auxiliary switch element ($Q_{sub}$), a second series circuit having a tertiary winding (Nt) of the coupled inductor and a second rectifying element ($Ds_2$), and an auxiliary capacitor (Cs) to which the first series circuit and the second series circuit are connected.

The secondary winding and the tertiary winding are separate bodies and the first series circuit and the second series circuit are connected in parallel to the auxiliary capacitor (examples of FIG. 1 to 3) or the tertiary winding is integrated with the secondary winding (examples of FIG. 4 and FIGS. 7 to 10).

Here, in the configuration in which the secondary winding and the tertiary winding are separate bodies, the secondary winding and the tertiary winding are separate windings (the secondary winding 32 and the tertiary winding 33 are separate windings in the example of FIG. 1).

Also, in the configuration in which the tertiary winding is integrated with the secondary winding, the secondary winding includes the tertiary winding and another winding (the secondary winding (Ns) includes the winding 51 and the tertiary winding 52 in the example of FIG. 4).

As an example of the configuration (examples of FIG. 6 and FIG. 18), the power conversion device further includes a controller (for example, a control circuit) and the controller turns on the main switch element ($Q_{main}$) after turning on the auxiliary switch element ($Q_{sub}$) and then turns off the main switch element ($Q_{main}$) after turning off the auxiliary switch element ($Q_{sub}$) or simultaneously when turning off the auxiliary switch element ($Q_{sub}$).

As an example of the configuration (an example of FIG. 18), the controller determines an ON timing of the main switch element ($Q_{main}$) using a voltage of the tertiary winding (Nt) or an auxiliary winding (Nt') and a voltage of the auxiliary capacitor (Cs).

As an example of the configuration (examples of FIG. 7 and FIG. 8), in the power conversion device, the converter is a boost converter or a buck converter and the converter obtains a constant voltage source (Vcc) from a voltage of a second rectifying element ($Ds_2$) via a rectifier diode (the diodes 118 and 158 in the examples of FIG. 7 and FIG. 8).

As an example of the configuration (an example of FIG. 13), in the power conversion device, a multiphase system including the main switch element ($Q_{main}$) and the main rectifying element (Dm) is provided and the resonance assist circuit is a multiphase resonance assist circuit corresponding to multiple phases.

As the example of the configuration (the example of FIG. 13), in the power conversion device, in the multiphase resonance assist circuit (a ZVS assist circuit), one or both of the auxiliary capacitor (Cs) and the second rectifying element ($Ds_2$) are shared between at least two phases.

As an example of the configuration (an example of FIG. 11), a power conversion device includes a converter including a main switch element ($Q_{main}$), a main rectifying element (Dm), an output capacitor (Co), and a primary winding (Np) of a coupled inductor; and a resonance assist circuit (a ZVS assist circuit) based on a closed-loop circuit including a first series circuit having a first rectifying element (the diode 317 ($Ds_1'$) in the example of FIG. 11) and a first auxiliary capacitor (the capacitor 316 (Cs) in the example of FIG. 11), a second series circuit having a second auxiliary capacitor (the capacitor 313 (Cs) in the example of FIG. 11) and a second rectifying element (the diode 314 ($Ds_1'$) in the example of FIG. 11), a third series circuit having a secondary winding (Ns) of the coupled inductor and an auxiliary switch element ($Q_{sub}$) and connected in parallel to the first series circuit and the second series circuit, and a third rectifying element ($Ds_2'$) arranged between an anode of the first rectifying element and a cathode of the second rectifying element.

As an example of the configuration (an example of FIG. 12), a power conversion device includes a converter including a main switch element ($Q_{main}$), a main rectifying element (Dm), an output capacitor (Co), and a primary winding (Np) of a coupled inductor; and a resonance assist circuit (a ZVS assist circuit) based on a closed-loop circuit including a first series circuit having a first rectifying element (the diode 338 ($Ds_1'$) in the example of FIG. 12) and a first auxiliary capacitor (the capacitor 336 (Cs) in the example of FIG. 12), a second series circuit having a second auxiliary capacitor (the capacitor 333 (Cs) in the example of FIG. 12) and a second rectifying element (the diode 334 ($Ds_1'$) in the example of FIG. 12), a third series circuit having a third rectifying element (the diode 341 ($Ds_1'$) in the example of FIG. 12), a third auxiliary capacitor (the capacitor 340 (Cs) in the example of FIG. 12), and a fourth rectifying element (the diode 339 ($Ds_1'$) in the example of FIG. 12), a fourth series circuit having a secondary winding (Ns) of the coupled inductor and an auxiliary switch element ($Q_{sub}$) and connected in parallel to the first series circuit, the second series circuit, and the third series circuit, a fifth rectifying element (the diode 337 ($Ds_2'$) in the example of FIG. 12) arranged between an anode of the first rectifying element and a cathode of the fourth rectifying element, and a sixth rectifying element (the diode 335 ($Ds_2'$) in the example of FIG. 12) arranged between a cathode of the second rectifying element and an anode of the third rectifying element.

As an example of the configuration (an example of FIG. 14), a power conversion device includes a converter including a main switch element ($Q_{main}$), a main rectifying element (Dm), an output capacitor (Co), and a primary winding (Np) of a coupled inductor, the polarity of a current of the primary winding switching between positive and negative states; and a resonance assist circuit (a ZVS assist circuit) based on a closed-loop circuit, wherein the closed-loop circuit includes a first series circuit having a secondary winding (Ns) of the coupled inductor, a first rectifying element ($Ds_{1+}$), and a first auxiliary switch ($Q_{sub+}$) that is driven when the polarity of the current of the primary winding is positive; a second series circuit having a tertiary winding (Nt) of the coupled inductor and a second rectifying element ($Ds_{2+}$); and a first auxiliary capacitor (Cs+) connected to the first series circuit and the second series circuit, and wherein the closed-loop circuit further includes a third series circuit having a third rectifying element ($Ds_{1-}$), a second auxiliary switch ($Q_{sub-}$) that is driven when the polarity of the current of the primary winding is negative, and the secondary winding (Ns); a fourth series circuit having the tertiary winding (Nt) and a fourth rectifying element ($Ds_{2-}$); and a second auxiliary capacitor (Cs−) connected to the third series circuit and the fourth series circuit and connected to the first auxiliary capacitor (Cs+).

The secondary winding and the tertiary winding are separate bodies and the first series circuit and the second series circuit are connected in parallel to the first auxiliary capacitor or the tertiary winding is integrated with the secondary winding.

Likewise, the secondary winding and the tertiary winding are separate bodies, the third series circuit and the fourth series circuit are connected in parallel to the second auxiliary capacitor, or the tertiary winding is integrated with the secondary winding.

Here, an example of a configuration in which the tertiary winding is integrated with the secondary winding is shown in the example of FIG. 14, but a configuration in which the secondary winding and the tertiary winding are separate bodies may be used as another example of the configuration.

As an example of the configuration (an example of FIG. 42), a power conversion device is applied to a dual-boost PFC circuit connected to a single-phase AC input and includes two boost circuits including the main switch element ($Q_{main}$) and the main rectifying element (Dm), wherein a resonance assist circuit corresponds to the two boost circuits, and wherein an auxiliary switch element ($Q_{sub+/-}$) is shared in the resonance assist circuit.

Examples of Configuration of Quasi-ZVS Assist Circuit

As an example of the configuration (examples of FIGS. 21 and 24), a power conversion device includes a converter including a main switch element ($Q_{main}$), a main rectifying element (Dm), an output capacitor (Co), and a primary winding (Np) of a coupled inductor; and a resonance assist circuit (a ZVS assist circuit) based on a closed-loop circuit including a series circuit having a secondary winding (Ns) of the coupled inductor, a first rectifying element ($Ds_1$), and an auxiliary switch element ($Q_{sub}$).

As an example of the configuration (an example of FIG. 25), the power conversion device further includes a controller (for example, the control circuit), wherein the controller turns on the main switch element ($Q_{main}$) after turning on the auxiliary switch element ($Q_{sub}$) and then turns off the main switch element ($Q_{main}$) after turning off the auxiliary switch element ($Q_{sub}$) or simultaneously when turning off the auxiliary switch element ($Q_{sub}$).

As an example of the configuration (modified examples of FIGS. 21 to 24 and FIG. 25), the power conversion device further includes a second controller (for example, a control circuit), wherein the second controller causes the main rectifying element (Dm), which is a switch element responsible for a reflux operation of an exciting current of the primary winding (Np), to perform a pair of ON/OFF operations for which a short-circuit prevention period associated with the main switch element ($Q_{main}$) is set and turns off the main rectifying element (Dm) when a current of the main rectifying element (Dm) reaches any negative current value after the auxiliary switch element ($Q_{sub}$) is turned on.

Here, in the examples of FIGS. 21 to 24, the main rectifying element (Dm) is a diode, but the main rectifying element (Dm) can be used as a switch element for the above control as a modified example.

The second controller may be the same as the controller related to the example of FIG. 25 described above or may be another controller.

As an example of the configuration (examples of FIGS. 22, 23, and 24), in the power conversion device, the converter is any one of a boost-buck converter, a flyback converter, and a buck converter, and the converter obtains a constant voltage source (Vcc) from a voltage of the secondary winding via a rectifier diode (the diodes 1155, 1181, and 1221 in examples of FIGS. 22, 23, and 24).

As an example of the configuration (an example of FIG. 26), a power conversion device includes a converter including a main switch element ($Q_{main}$), a main rectifying element (Dm), an output capacitor (Co), and a primary winding (Np) of a coupled inductor, the polarity of a current of the primary winding switching between positive and negative states; and a resonance assist circuit (a ZVS assist circuit) based on a first closed-loop circuit including a positive-side secondary winding (Ns+) of the coupled inductor, a first rectifying element ($Ds_{1+}$), and a first auxiliary switch ($Q_{sub+}$) that is driven when the polarity of a current of the primary winding (Np) is positive and a second closed-loop circuit including a negative-side secondary winding (Ns−) of the coupled inductor, a second rectifying element ($Ds_{1-}$), and a second auxiliary switch ($Q_{sub-}$) that is driven when the polarity of the current of the primary winding (Np) is negative.

As an example of the configuration (an example of FIG. 27), a power conversion device includes a converter including a main switch element ($Q_{main}$), a main rectifying element (Dm), an output capacitor (Co), and a primary winding (Np) of a coupled inductor, the polarity of a current of the primary winding (Np) switching between positive and negative states; and a resonance assist circuit based on a closed-loop circuit including a secondary winding (Ns) of the coupled inductor, a first rectifying element connected in parallel to a first auxiliary switch ($Q_{sub+}$) that is driven when the polarity of the current of the primary winding (Np) is positive, and a second rectifying element connected in parallel to a second auxiliary switch ($Q_{sub-}$) that is driven when the polarity of the current of the primary winding (Np) is negative.

As an example of the configuration (examples of FIGS. 28 and 29), the power conversion device further includes a controller (for example, a control circuit), wherein the controller causes the main rectifying element ($Q_{SR}$), which is a switch element responsible for a reflux operation of an exciting current of the primary winding (Np), to perform a pair of ON/OFF operations for which a short-circuit prevention period associated with the main switch element ($Q_{main}$) is set and turns off the main rectifying element ($Q_{SR}$) when a current of the main rectifying element ($Q_{SR}$) reaches any negative current value after any one of the first auxiliary switch ($Q_{sub+}$) and the second auxiliary switch ($Q_{sub-}$) is turned on.

As an example of the configuration (examples of FIG. 34 and FIG. 35), a power conversion device includes a converter including a main switch element ($Q_{main}$), a main rectifying element (Dm), an output capacitor (Co), and a primary winding (Np) of a coupled inductor; a resonance assist circuit (a ZVS assist circuit) based on a closed-loop circuit including a series circuit having a secondary winding (Ns) of the coupled inductor, a first rectifying element ($Ds_1$), and an auxiliary switch element ($Q_{sub}$); and a controller configured to determine an ON timing of the main switch element ($Q_{main}$) using a voltage of an auxiliary winding (Nt').

As an example of the configuration (examples of FIG. 34 and FIG. 35), in the power conversion device, the controller turns on the main switch element ($Q_{main}$) according to a voltage of the auxiliary winding (Nt') after turning on the auxiliary switch element ($Q_{sub}$) and then turns off the main switch element ($Q_{main}$) after turning off the auxiliary switch element ($Q_{sub}$) or simultaneously when turning off the auxiliary switch element ($Q_{sub}$).

Furthermore, as an example of the configuration (examples of FIG. 34 and FIG. 35), the power conversion device further includes a second controller, wherein the second controller causes the main rectifying element (Dm), which is a switch element responsible for a reflux operation of an exciting current of the primary winding (Np), to perform a pair of ON/OFF operations for which a short-circuit prevention period associated with the main switch element ($Q_{main}$) is set and turns off the main rectifying element (Dm) when a current of the main rectifying element (Dm) reaches any negative current value after the auxiliary switch element ($Q_{sub}$) is turned on.

As an example of the configuration (examples of FIGS. 37 and 39), a power conversion device includes a converter including a main switch element ($Q_{main+}$), a main rectifying element ($Q_{main-}$), an output capacitor (Co), and a primary winding (Np) of a coupled inductor, the polarity of a current of the primary winding (Np) switching between positive and negative states; a resonance assist circuit (a ZVS assist circuit) based on a first closed-loop circuit including a positive-side secondary winding (Ns+) of the coupled inductor, a first rectifying element ($Ds_{1+}$), and a first auxiliary switch ($Q_{sub+}$) that is driven when the polarity of a current of the primary winding (Np) is positive and a second closed-loop circuit including a negative-side secondary winding (Ns−) of the coupled inductor, a second rectifying element ($Ds_{1-}$), and a second auxiliary switch ($Q_{sub-}$) that is driven when the polarity of the current of the primary winding (Np) is negative; and a controller configured to determine an ON timing of the main switch element ($Q_{main+}$) using a voltage of an auxiliary winding (Nt':$N_{ZCD}$).

As an example of the configuration (examples of FIGS. 38 and 39), a power conversion device includes a converter including a main switch element ($Q_{main+}$), a main rectifying element ($Q_{main-}$), an output capacitor (Co), and a primary winding (Np) of a coupled inductor, the polarity of a current of the primary winding (Np) switching between positive and negative states; a resonance assist circuit (a ZVS assist circuit) based on a closed-loop circuit including a secondary winding (Ns) of the coupled inductor, a first rectifying element connected in parallel to a first auxiliary switch ($Q_{sub+}$) that is driven when the polarity of the current of the primary winding (Np) is positive, and a second rectifying element connected in parallel to a second auxiliary switch ($Q_{sub-}$) that is driven when the polarity of the current of the primary winding (Np) is negative; and a controller configured to determine an ON timing of the main switch element ($Q_{main+}$) using a voltage of an auxiliary winding (Nt':$N_{ZCD}$).

Furthermore, as an example of the configuration (examples of FIGS. 38 and 39), in the power conversion device, the controller causes the main rectifying element ($Q_{main-}$), which is a switch element responsible for a reflux operation of an exciting current of the primary winding (Np), to perform a pair of ON/OFF operations for which a short-circuit prevention period associated with the main switch element ($Q_{main+}$) is set and turns off the main rectifying element ($Q_{main-}$) when a current of the main rectifying element ($Q_{main+}$) reaches any negative current value after any one of the first auxiliary switch ($Q_{sub+}$) and the second auxiliary switch ($Q_{sub-}$) is turned on.

As an example of the configuration (an example of FIG. 40), a power conversion device includes a converter including a main switch element ($Q_{main}$), a main rectifying element (Dm), an output capacitor (Co), and a primary winding (Np) of a coupled inductor, the polarity of a current of the primary winding (Np) switching between positive and negative states; and a resonance assist circuit (a ZVS assist circuit) based on a first closed-loop circuit including a secondary winding (Ns) of the coupled inductor, a first rectifying element ($D_{sub+}$), and a first auxiliary switch ($Q_{sub+}$) that is driven when the polarity of the current of the primary winding (Np) is positive and a second closed-loop circuit including a secondary winding (Ns) of the coupled inductor, a second rectifying element ($D_{sub-}$), and a second auxiliary switch ($Q_{sub-}$) that is driven when the polarity of the current of the primary winding (Np) is negative.

As an example of the configuration (an example of FIG. 41), the power conversion device is applied to a totem-pole PFC circuit, a positive-side alternating current (AC) diode ($BD_+$) of the totem-pole PFC circuit associated with a series circuit based on the secondary winding (Ns), the first rectifying element ($D_{sub+}$), and the first auxiliary switch ($Q_{sub+}$) is connected, and a negative-side AC diode ($BD_-$) of the totem-pole PFC circuit associated with a series circuit based on the secondary winding (Ns), the second rectifying element ($D_{sub-}$), and the second auxiliary switch ($Q_{sub-}$) is connected.

As an example of the configuration (an example of FIG. 43), a power conversion device including a converter including a main switch element (Qmain), a main rectifying element (Dm), an output capacitor (Co), and a primary winding (Np) of a coupled inductor and a resonance assist circuit (a ZVS assist circuit) based on a closed-loop circuit including a series circuit having a secondary winding (Ns) of the coupled inductor, a first rectifying element, and an auxiliary switch element includes two boost circuits including the main switch element ($Q_{main}$) and the main rectifying element (Dm) applied to a dual-boost PFC circuit connected to a single-phase AC input, wherein the resonance assist circuit corresponds to the two boost circuits, and wherein the auxiliary switch element ($Q_{sub+/-}$) is shared in the resonance assist circuit (a ZVS assist circuit).

Furthermore, as an example of the configuration (an example of FIG. 43), the power conversion device includes a controller configured to determine an ON timing of the main switch element ($Q_{main}$) using a voltage of an auxiliary winding (Nt') of the coupled inductor.

Although embodiments of the present disclosure have been described above with reference to the drawings, specific configurations are not limited to the embodiments and other designs and the like may also be included without departing from the scope of the present disclosure.

Aspects of the present disclosure are shown below (1) to (21).

(1). A power conversion device comprising:
a converter including a main switch element, a main rectifying element, an output capacitor, and a primary winding of a coupled inductor; and
a resonance assist circuit based on a closed-loop circuit including a first series circuit having a secondary winding of the coupled inductor, a first rectifying element, and an auxiliary switch element, a second series circuit having a tertiary winding of the coupled inductor and a second rectifying element, and an auxiliary capacitor to which the first series circuit and the second series circuit are connected,
wherein the secondary winding and the tertiary winding are separate bodies and the first series circuit and the second series circuit are connected in parallel to the auxiliary capacitor, or the tertiary winding is integrated with the secondary winding.

(2). The power conversion device according to (1), further comprising a controller,
wherein the controller is configured to turn on the main switch element after turning on the auxiliary switch element and then to turn off the main switch element after turning off the auxiliary switch element or simultaneously when turning off the auxiliary switch element.

(3). The power conversion device according to (2), wherein the controller is configured to determine an ON timing of the main switch element using a voltage of the tertiary winding or an auxiliary winding of the coupled inductor and a voltage of the auxiliary capacitor.

(4). The power conversion device according to any one of (1) to (3),
wherein the converter is a boost converter or a buck converter, and
wherein the converter is configured to obtain a constant voltage source from a voltage of a second rectifying element via a rectifier diode.

(5). The power conversion device according to anyone of (1) to (4),
wherein a multiphase system including the main switch element and the main rectifying element is provided, and
wherein the resonance assist circuit is a multiphase resonance assist circuit corresponding to multiple phases.

(6). The power conversion device according to (5), wherein, in the multiphase resonance assist circuit, one or both of the auxiliary capacitor and the second rectifying element are shared between at least two phases.

(7). A power conversion device comprising:
a converter including a main switch element, a main rectifying element, an output capacitor, and a primary winding of a coupled inductor; and
a resonance assist circuit based on a closed-loop circuit including a first series circuit having a first rectifying element and a first auxiliary capacitor, a second series circuit having a second auxiliary capacitor and a second rectifying element, a third series circuit having a secondary winding of the coupled inductor and an auxiliary switch element and connected in parallel to the first series circuit and the second series circuit, and a third rectifying element arranged between an anode of the first rectifying element and a cathode of the second rectifying element.

(8). A power conversion device comprising:
a converter including a main switch element, a main rectifying element, an output capacitor, and a primary winding of a coupled inductor; and
a resonance assist circuit based on a closed-loop circuit including a first series circuit having a first rectifying element and a first auxiliary capacitor, a second series circuit having a second auxiliary capacitor and a second rectifying element, a third series circuit having a third rectifying element, a third auxiliary capacitor, and a fourth rectifying element, a fourth series circuit having a secondary winding of the coupled inductor and an auxiliary switch element and connected in parallel to the first series circuit, the second series circuit, and the third series circuit, a fifth rectifying element arranged between an anode of the first rectifying element and a cathode of the fourth rectifying element, and a sixth rectifying element arranged between a cathode of the second rectifying element and an anode of the third rectifying element.

(9). A power conversion device comprising:
a converter including a main switch element, a main rectifying element, an output capacitor, and a primary winding of a coupled inductor, the polarity of a current of the primary winding switching between positive and negative states; and
a resonance assist circuit based on a closed-loop circuit,
wherein the closed-loop circuit includes
a first series circuit having a secondary winding of the coupled inductor, a first rectifying element, and a first auxiliary switch that is driven when the polarity of the current of the primary winding is positive;
a second series circuit having a tertiary winding of the coupled inductor and a second rectifying element; and
a first auxiliary capacitor connected to the first series circuit and the second series circuit,
wherein the secondary winding and the tertiary winding are separate bodies and the first series circuit and the second series circuit are connected in parallel to the first auxiliary capacitor or the tertiary winding is integrated with the secondary winding,
wherein the closed-loop circuit further includes
a third series circuit having a third rectifying element, a second auxiliary switch that is driven when the polarity of the current of the primary winding is negative, and the secondary winding;
a fourth series circuit having the tertiary winding and a fourth rectifying element; and
a second auxiliary capacitor connected to the third series circuit and the fourth series circuit and connected to the first auxiliary capacitor, and wherein the secondary winding and the tertiary winding are separate bodies and the third series circuit and the fourth series circuit are connected in parallel to the second auxiliary capacitor or the tertiary winding is integrated with the secondary winding.

(10). A power conversion device comprising:
a converter including a main switch element, a main rectifying element, an output capacitor, and a primary winding of a coupled inductor;
a resonance assist circuit based on a closed-loop circuit including a series circuit having a secondary winding of the coupled inductor, a first rectifying element, and an auxiliary switch element; and
a controller configured to determine an ON timing of the main switch element using a voltage of an auxiliary winding of the coupled inductor.

(11). The power conversion device according to (10), wherein the controller is configured to turn on the main switch element according to a voltage of the auxiliary winding after turning on the auxiliary switch element and then to turn off the main switch element after turning off the auxiliary switch element or simultaneously when turning off the auxiliary switch element.

(12). The power conversion device according to (11), further comprising a second controller,
wherein the second controller is configured to cause the main rectifying element, which is a switch element responsible for a reflux operation of an exciting current of the primary winding, to perform a pair of ON/OFF operations for which a short-circuit prevention period associated with the main switch element is set and to turn off the main rectifying element when a current of the main rectifying element reaches any negative current value after the auxiliary switch element is turned on.

(13). A power conversion device comprising:
a converter including a main switch element, a main rectifying element, an output capacitor, and a primary winding of a coupled inductor; and
a resonance assist circuit based on a closed-loop circuit including a series circuit having a secondary winding of the coupled inductor, a first rectifying element, and an auxiliary switch element,
wherein the converter is any one of a boost-buck converter, a flyback converter, and a buck converter, and
wherein the converter is configured to obtain a constant voltage source from a voltage of the secondary winding via a rectifier diode.

(14). A power conversion device comprising:
a converter including a main switch element, a main rectifying element, an output capacitor, and a primary winding of a coupled inductor, the polarity of a current of the primary winding switching between positive and negative states;
a resonance assist circuit based on a first closed-loop circuit including a positive-side secondary winding of the coupled inductor, a first rectifying element, and a first auxiliary switch that is driven when the polarity of a current of the primary winding is positive and a second closed-loop circuit including a negative-side secondary winding of the coupled inductor, a second rectifying element, and a second auxiliary switch that is driven when the polarity of the current of the primary winding is negative; and
a controller configured to determine an ON timing of the main switch element using a voltage of an auxiliary winding of the coupled inductor.

(15). A power conversion device comprising:
a converter including a main switch element, a main rectifying element, an output capacitor, and a primary winding of a coupled inductor, the polarity of a current of the primary winding switching between positive and negative states;
a resonance assist circuit based on a closed-loop circuit including a secondary winding of the coupled inductor, a first rectifying element connected in parallel to a first auxiliary switch that is driven when the polarity of the current of the primary winding is positive, and a second rectifying element connected in parallel to a second auxiliary switch that is driven when the polarity of the current of the primary winding is negative; and
a controller configured to determine an ON timing of the main switch element using a voltage of an auxiliary winding of the coupled inductor.

(16). The power conversion device according to (15), wherein the controller is configured to cause the main rectifying element, which is a switch element responsible for a reflux operation of an exciting current of the primary winding, to perform a pair of ON/OFF operations for which a short-circuit prevention period associated with the main switch element is set and to turn off the main rectifying element when a current of the main rectifying element reaches any negative current value after any one of the first auxiliary switch and the second auxiliary switch is turned on.

(17). A power conversion device comprising:
a converter including a main switch element, a main rectifying element, an output capacitor, and a primary winding of a coupled inductor, the polarity of a current of the primary winding switching between positive and negative states; and
a resonance assist circuit based on a first closed-loop circuit including a secondary winding of the coupled inductor, a first rectifying element, and a first auxiliary switch that is driven when the polarity of the current of the primary winding is positive and a second closed-loop circuit including a secondary winding of the coupled inductor, a second rectifying element, and a second auxiliary switch that is driven when the polarity of the current of the primary winding is negative.

(18). The power conversion device according to (17), wherein the power conversion device is applied to a totem-pole power factor correction (PFC) circuit,
wherein a positive-side alternating current (AC) diode of the totem-pole PFC circuit associated with a series circuit based on the secondary winding, the first rectifying element, and the first auxiliary switch is connected, and
wherein a negative-side AC diode of the totem-pole PFC circuit associated with a series circuit based on the secondary winding, the second rectifying element, and the second auxiliary switch is connected.

(19). The power conversion device according to (1), wherein the power conversion device is applied to a dual-boost PFC circuit connected to a single-phase AC input,
wherein two boost circuits including the main switch element and the main rectifying element are provided,
wherein the resonance assist circuit corresponds to the two boost circuits, and
wherein the auxiliary switch element is shared in the resonance assist circuit.

(20). A power conversion device including a converter including a main switch element, a main rectifying element, an output capacitor, and a primary winding of a coupled inductor and a resonance assist circuit based on a closed-loop circuit including a series circuit having a secondary winding of the coupled inductor, a first rectifying element, and an auxiliary switch element, the power conversion device comprising:
two boost circuits including the main switch element and the main rectifying element applied to a dual-boost PFC circuit connected to a single-phase AC input,
wherein the resonance assist circuit corresponds to the two boost circuits, and
wherein the auxiliary switch element is shared in the resonance assist circuit.

(21). The power conversion device according to (20), comprising a controller configured to determine an ON timing of the main switch element using a voltage of an auxiliary winding of the coupled inductor.

EXPLANATION OF REFERENCES 1 to 4, 101 to 104, 401, 501 to 503, 601 to 603, 1001 to 1004, 1301, 1501, 1601, 1701, 4001, 4201, 4301, 4501, 5001, 5301, 6001, 6301, 6501, 7001, 7301 Power conversion device
11, 35, 115, 132, 155, 183, 215, 245, 264, 312, 332, 411, 413, 446, 454, 511, 512, 545, 549, 575, 581, 591, 1134, 1134a, 1134b, 1154, 1174, 1213, 1314, 1316, 1333, 1334, 1411, 1412, 1423, 1424, 1511 to 1514, 1516, 1517, 1543, 1544, 1611 to 1614, 1643, 1644, 1711 to 1714, 1743, 1744, 4035, 4234, 4334, 5111, 5112, 5154, 5156, 5333, 5334, 6013, 6346, 6533, 7035, 7334 Switch element
12, 34, 36, 42, 53, 114, 116, 118, 133, 154, 156, 158, 182, 214, 216, 242, 263, 265, 314, 315, 317, 334, 335, 337, 338, 339, 341, 421, 414, 445, 447, 453, 461, 544, 546, 548, 550, 576, 580, 592, 593, 621, 651, 661, 691, 1133, 1133a, 1133b, 1153, 1155, 1173, 1181, 1212, 1221, 1313, 1315, 4034, 4053, 4233, 4333, 5153, 5155, 5212, 5213, 6012, 6014, 6345, 6347, 6353, 6361, 6391, 6392, 6532, 6552, 7053, 7333, 7411, 7412 Diode
13, 37, 117, 131, 157, 181, 217, 241 266, 313, 316, 333, 336, 340, 415, 448, 515, 547, 551, 579, 652, 1413, 1515, 1672, 1715, 4037, 5113, 6348, 6381, 7037 Capacitor
21, 23, 121, 171, 251, 423, 523, 1523, 1623, 1631, 1731, 5123, 6423 Power supply
31, 111, 151, 211, 244, 431, 432, 541, 1131, 1131a, 1131b, 1151, 1171, 1331, 1541, 1641, 1741, 4231, 4331, 5131, 6051, 7031, 7331 Primary winding
32, 311, 331, 1132, 1132a, 1132b, 1152, 1172, 1211, 1311, 1312, 1332, 1542, 1642, 1742, 4232, 4332, 5151, 5152, 5332, 6011, 6531, 6551, 7332 Secondary winding
33, 41, 52, 113, 153, 213, 262, 442, 452, 543, 573, 575, 4052, 6342, 6352, 7052 Tertiary winding
51, 112, 152, 212, 243, 261, 441, 451, 542, 572, 574, 4051, 6341, 6351, 7051 Winding
71, 72, 1422 Inductor
578, 582 Thyristor
611, 4111, 5211 Auxiliary winding
612, 642, 682, 4112 Arithmetic unit
613, 643, 683, 4113, 5513, 5613 Comparator
614, 615, 644, 645, 684, 685, 5514, 5519, 5614, 5619 AND gate
616, 646, 686, 4116, 4615, 5515, 5615 On-delay circuit
617, 647, 687, 4117, 5516, 5616 OR gate
1401 Equivalent circuit
1421 Exciting inductor
513, 514, 1431 Half-wave rectifier diode
1671 Resistor
2011 to 2018, 2111 to 2117, 3011 to 3018, 3111 to 3119 Waveform
4118 OFF-delay circuit
4119 D-type flip flop
4251, 4351, 5512, 5612 Offset power supply
4711 PWM controller
4731, 5231 Circuit unit
5221 Detection unit
5517, 5617 NOT gate
4618, 5518, 5618 ON-delay circuit (SR)
A1 to A4, 301, 302 ZVS assist circuit
B1 to B3 Point
G1 Ground terminal
P1 Direction
T1, T12, T22, T32, T52, T62, T102, T121, T231 First output terminal
T2, T11, T21, T31, T51, T61, T101, T122, 232 Second output terminal

What is claimed is:

1. A power conversion device comprising:
a converter including a main switch element, a main rectifying element, an output capacitor, and a primary winding of a coupled inductor; and
a resonance assist circuit based on a closed-loop circuit including a first series circuit having a secondary winding of the coupled inductor, a first rectifying element, and an auxiliary switch element, a second series circuit having a tertiary winding of the coupled inductor and a second rectifying element, and an auxiliary capacitor to which the first series circuit and the second series circuit are connected,
wherein the secondary winding and the tertiary winding are separate bodies and the first series circuit and the second series circuit are connected in parallel to the auxiliary capacitor, or the tertiary winding is integrated with the secondary winding.

2. The power conversion device according to claim 1, further comprising a controller,
wherein the controller is configured to turn on the main switch element after turning on the auxiliary switch element and then to turn off the main switch element after turning off the auxiliary switch element or simultaneously when turning off the auxiliary switch element.

3. The power conversion device according to claim 2, wherein the controller is configured to determine an ON timing of the main switch element using a voltage of the tertiary winding or an auxiliary winding of the coupled inductor and a voltage of the auxiliary capacitor.

4. The power conversion device according to claim 1,
wherein the converter is a boost converter or a buck converter, and
wherein the converter is configured to obtain a constant voltage source from a voltage of a second rectifying element via a rectifier diode.

5. The power conversion device according to claim 1,
wherein a multiphase system including the main switch element and the main rectifying element is provided, and
wherein the resonance assist circuit is a multiphase resonance assist circuit corresponding to multiple phases.

6. The power conversion device according to claim 5, wherein, in the multiphase resonance assist circuit, one or both of the auxiliary capacitor and the second rectifying element are shared between at least two phases.

7. The power conversion device according to claim 1,
wherein the power conversion device is applied to a dual-boost PFC circuit connected to a single-phase AC input,
wherein two boost circuits including the main switch element and the main rectifying element are provided,
wherein the resonance assist circuit corresponds to the two boost circuits, and
wherein the auxiliary switch element is shared in the resonance assist circuit.

8. A power conversion device comprising:
a converter including a main switch element, a main rectifying element, an output capacitor, and a primary winding of a coupled inductor; and
a resonance assist circuit based on a closed-loop circuit including a first series circuit having a first rectifying element and a first auxiliary capacitor, a second series circuit having a second auxiliary capacitor and a second rectifying element, a third series circuit having a secondary winding of the coupled inductor and an auxiliary switch element and connected in parallel to the first series circuit and the second series circuit, and a third rectifying element arranged between an anode of the first rectifying element and a cathode of the second rectifying element.

9. A power conversion device comprising:
a converter including a main switch element, a main rectifying element, an output capacitor, and a primary winding of a coupled inductor; and
a resonance assist circuit based on a closed-loop circuit including a first series circuit having a first rectifying element and a first auxiliary capacitor, a second series circuit having a second auxiliary capacitor and a second rectifying element, a third series circuit having a third rectifying element, a third auxiliary capacitor, and a fourth rectifying element, a fourth series circuit having a secondary winding of the coupled inductor and an auxiliary switch element and connected in parallel to the first series circuit, the second series circuit, and the third series circuit, a fifth rectifying element arranged between an anode of the first rectifying element and a cathode of the fourth rectifying element, and a sixth rectifying element arranged between a cathode of the second rectifying element and an anode of the third rectifying element.

10. A power conversion device comprising:
a converter including a main switch element, a main rectifying element, an output capacitor, and a primary winding of a coupled inductor, the polarity of a current of the primary winding switching between positive and negative states; and
a resonance assist circuit based on a closed-loop circuit,
wherein the closed-loop circuit includes
a first series circuit having a secondary winding of the coupled inductor, a first rectifying element, and a first auxiliary switch that is driven when the polarity of the current of the primary winding is positive;
a second series circuit having a tertiary winding of the coupled inductor and a second rectifying element; and
a first auxiliary capacitor connected to the first series circuit and the second series circuit,
wherein the secondary winding and the tertiary winding are separate bodies and the first series circuit and the second series circuit are connected in parallel to the first auxiliary capacitor or the tertiary winding is integrated with the secondary winding,
wherein the closed-loop circuit further includes
a third series circuit having a third rectifying element, a second auxiliary switch that is driven when the polarity of the current of the primary winding is negative, and the secondary winding;
a fourth series circuit having the tertiary winding and a fourth rectifying element; and
a second auxiliary capacitor connected to the third series circuit and the fourth series circuit and connected to the first auxiliary capacitor, and
wherein the secondary winding and the tertiary winding are separate bodies and the third series circuit and the fourth series circuit are connected in parallel to the second auxiliary capacitor or the tertiary winding is integrated with the secondary winding.

11. A power conversion device comprising:
a converter including a main switch element, a main rectifying element, an output capacitor, and a primary winding of a coupled inductor;
a resonance assist circuit based on a closed-loop circuit including a series circuit having a secondary winding of the coupled inductor, a first rectifying element, and an auxiliary switch element; and
a controller configured to determine an ON timing of the main switch element using a voltage of an auxiliary winding of the coupled inductor.

12. The power conversion device according to claim 11, wherein the controller is configured to turn on the main switch element according to a voltage of the auxiliary winding after turning on the auxiliary switch element and then to turn off the main switch element after turning off the auxiliary switch element or simultaneously when turning off the auxiliary switch element.

13. The power conversion device according to claim 12, further comprising a second controller,
wherein the second controller is configured to cause the main rectifying element, which is a switch element responsible for a reflux operation of an exciting current of the primary winding, to perform a pair of ON/OFF operations for which a short-circuit prevention period associated with the main switch element is set and to turn off the main rectifying element when a current of the main rectifying element reaches any negative current value after the auxiliary switch element is turned on.

14. A power conversion device comprising:
a converter including a main switch element, a main rectifying element, an output capacitor, and a primary winding of a coupled inductor; and
a resonance assist circuit based on a closed-loop circuit including a series circuit having a secondary winding of the coupled inductor, a first rectifying element, and an auxiliary switch element,
wherein the converter is any one of a boost-buck converter, a flyback converter, and a buck converter, and
wherein the converter is configured to obtain a constant voltage source from a voltage of the secondary winding via a rectifier diode.

15. A power conversion device comprising:
a converter including a main switch element, a main rectifying element, an output capacitor, and a primary winding of a coupled inductor, the polarity of a current of the primary winding switching between positive and negative states;
a resonance assist circuit based on a first closed-loop circuit including a positive-side secondary winding of the coupled inductor, a first rectifying element, and a first auxiliary switch that is driven when the polarity of a current of the primary winding is positive and a second closed-loop circuit including a negative-side secondary winding of the coupled inductor, a second rectifying element, and a second auxiliary switch that is driven when the polarity of the current of the primary winding is negative; and a controller configured to determine an ON timing of the main switch element using a voltage of an auxiliary winding of the coupled inductor.

16. A power conversion device comprising:

a converter including a main switch element, a main rectifying element, an output capacitor, and a primary winding of a coupled inductor, the polarity of a current of the primary winding switching between positive and negative states;

a resonance assist circuit based on a closed-loop circuit including a secondary winding of the coupled inductor, a first rectifying element connected in parallel to a first auxiliary switch that is driven when the polarity of the current of the primary winding is positive, and a second rectifying element connected in parallel to a second auxiliary switch that is driven when the polarity of the current of the primary winding is negative; and a controller configured to determine an ON timing of the main switch element using a voltage of an auxiliary winding of the coupled inductor.

17. The power conversion device according to claim 16, wherein the controller is configured to cause the main rectifying element, which is a switch element responsible for a reflux operation of an exciting current of the primary winding, to perform a pair of ON/OFF operations for which a short-circuit prevention period associated with the main switch element is set and to turn off the main rectifying element when a current of the main rectifying element reaches any negative current value after any one of the first auxiliary switch and the second auxiliary switch is turned on.

18. A power conversion device comprising:

a converter including a main switch element, a main rectifying element, an output capacitor, and a primary winding of a coupled inductor, the polarity of a current of the primary winding switching between positive and negative states; and a resonance assist circuit based on a first closed-loop circuit including a secondary winding of the coupled inductor, a first rectifying element, and a first auxiliary switch that is driven when the polarity of the current of the primary winding is positive and a second closed-loop circuit including a secondary winding of the coupled inductor, a second rectifying element, and a second auxiliary switch that is driven when the polarity of the current of the primary winding is negative.

19. The power conversion device according to claim 18, wherein the power conversion device is applied to a totem-pole power factor correction (PFC) circuit, wherein a positive-side alternating current (AC) diode of the totem-pole PFC circuit associated with a series circuit based on the secondary winding, the first rectifying element, and the first auxiliary switch is connected, and wherein a negative-side AC diode of the totem-pole PFC circuit associated with a series circuit based on the secondary winding, the second rectifying element, and the second auxiliary switch is connected.

20. A power conversion device including a converter including a main switch element, a main rectifying element, an output capacitor, and a primary winding of a coupled inductor and a resonance assist circuit based on a closed-loop circuit including a series circuit having a secondary winding of the coupled inductor, a first rectifying element, and an auxiliary switch element, the power conversion device comprising:

two boost circuits including the main switch element and the main rectifying element applied to a dual-boost PFC circuit connected to a single-phase AC input, wherein the resonance assist circuit corresponds to the two boost circuits, and wherein the auxiliary switch element is shared in the resonance assist circuit.

21. The power conversion device according to claim 20, comprising a controller configured to determine an ON timing of the main switch element using a voltage of an auxiliary winding of the coupled inductor.

* * * * *